(12) United States Patent
Nishioka et al.

(10) Patent No.: US 7,260,047 B2
(45) Date of Patent: Aug. 21, 2007

(54) OPTICAL PICKUP THAT USES LIGHT SOURCES WITH DIFFERENT WAVELENGTHS FOR EACH OF MULTIPLE RECORDING MEDIUMS

(75) Inventors: Sumito Nishioka, Ikoma-gun (JP); Nobuo Ogata, Nara (JP); Ikuo Nakano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 568 days.

(21) Appl. No.: 10/625,709

(22) Filed: Jul. 22, 2003

(65) Prior Publication Data

US 2004/0022164 A1    Feb. 5, 2004

(30) Foreign Application Priority Data

| Jul. 26, 2002 | (JP) | ............................. 2002-218811 |
| Oct. 16, 2002 | (JP) | ............................. 2002-302235 |
| Nov. 20, 2002 | (JP) | ............................. 2002-336882 |
| Nov. 22, 2002 | (JP) | ............................. 2002-340074 |
| Mar. 3, 2003 | (JP) | ............................. 2003-056343 |
| Jun. 30, 2003 | (JP) | ............................. 2003-188778 |

(51) Int. Cl.
*G11B 7/00* (2006.01)
(52) U.S. Cl. .................... 369/112.05; 369/118
(58) Field of Classification Search ............... None
See application file for complete search history.

(56) References Cited

U.S. PATENT DOCUMENTS 5,696,750 A * 12/1997 Katayama .............. 369/112.06

(Continued)

FOREIGN PATENT DOCUMENTS

| JP | 306261/2000 | 11/2000 |
| JP | 93179/2001 | 4/2001 |

(Continued)

OTHER PUBLICATIONS

"DVD/CD Compatibility Using Blu-ray Disc Pick Up" (Naoki Kaiho et al., Proceedings of the 63rd Annual Meeting of Applied Physics, Sep. 2002, No. 3, p. 1008, Lecture No. 27p-YD-5).

*Primary Examiner*—William Korzuch
*Assistant Examiner*—Christopher Lamb
(74) *Attorney, Agent, or Firm*—Peter J. Manus; David C. Conlin; Edwards Angell Palmer & Dodge LLP

(57) ABSTRACT

An optical pickup includes: a first projector for projecting a first light beam of a first wavelength so as to record and reproduce information with respect to an optical disk having a first light transmissive layer; a second projector for projecting a second light beam of a second wavelength longer than the first wavelength so as to record and reproduce information with respect to an optical disk having a second light transmissive layer; an objective lens common to the first and second light beams; and a diffraction optical element made of a lens with a diffraction grating and a refracting face and disposed in an optical path between the first and second projectors and the objective lens. The diffraction optical element is set to satisfy a predetermined equation. As a result, an optical pickup is realized that uses a single focusing means to focus light beams of different wavelengths, so as to record and reproduce information with respect to different kinds of optical disks (recording media) respectively having light transmissive layers of different thicknesses and respectively using different optimum wavelengths of light for reproducing.

13 Claims, 46 Drawing Sheets

U.S. PATENT DOCUMENTS

| | | | |
|---|---|---|---|
| 6,449,095 B1 * | 9/2002 | Ohtaki et al. | 359/566 |
| 6,870,805 B1 * | 3/2005 | Arai et al. | 369/112.07 |
| RE38,943 E * | 1/2006 | Komma et al. | 359/19 |
| 6,987,615 B2 * | 1/2006 | Shiono et al. | 359/569 |

FOREIGN PATENT DOCUMENTS

| | | |
|---|---|---|
| JP | 197717/2002 | 7/2002 |
| JP | 209966/2001 | 8/2003 |

* cited by examiner

LIGHT BEAM OF 405nm WAVELENGTH

LIGHT BEAM OF 650nm WAVELENGTH

LIGHT BEAM OF 780nm WAVELENGTH

LIGHT BEAM OF 405nm WAVELENGTH (FIRST BEAM)

111c, 111, 111a, 112, 14a, 113'

LIGHT BEAM OF 650nm WAVELENGTH (SECOND BEAM)

111c, 111, 111a, 112, 14a, 113'

OPTICAL PICKUP THAT USES LIGHT SOURCES WITH DIFFERENT WAVELENGTHS FOR EACH OF MULTIPLE RECORDING MEDIUMS

FIELD OF THE INVENTION

The present invention relates to an optical pickup for recording and reproducing information with respect to a recording medium, and particularly to an optical pickup for recording and reproducing information with respect to different types of recording media whose light transmissive layers, from a light incident face to an information recording face, have different thicknesses, and whose optimum light beam wavelengths are different.

BACKGROUND OF THE INVENTION

Conventionally available are optical disk players (optical recording and reproducing apparatus) that can read recorded information from optical disks (optical recording medium), for example, such as DVD (Digital Video Disc) and CD (Compact Disc). DVDs currently available in the market have the capacity as high as 4.7 GB, yet demand for higher density optical disks has been strong and there has been ongoing study for realizing such optical disks. It is well known that recording density can be effectively improved by using light of a shorter wavelength for the reproducing light, and/or by increasing the NA (Numerical Aperture) of the objective lens.

In one optical pickup currently available for reproducing information from a next-generation high-density optical disk, the numerical aperture (NA) of the objective lens has been increased from the conventional DVD's 0.6 to 0.85, and a wavelength of 405 nm, shorter than the conventional DVD's 650 nm, has been selected for the reproducing light, so as to reduce the size of an aperture spot and thereby increase recording density.

However, a problem of increasing the NA of the objective lens is that it drastically increases the coma aberration that is caused when the optical disk tilts, with the result that the focusing characteristic of the aperture spot may be impaired. Note that, as used herein, the term "coma aberration" refers to an aberration that is caused when the light is focused on an axis other than the optical axis. The coma aberration caused by a tilt of the optical disk is proportional to the thickness of the light transmissive layer, from the light incident face to the information recording face, of the optical disk. Accordingly, a proportional increase of coma aberration with an increased NA of the objective lens can be suppressed by reducing the thickness of the light transmissive layer of the optical disk. Based on this principle, it has been proposed to reduce the thickness of the light transmissive layer of the next-generation high-density optical disk to 0.1 mm from the conventional DVD's 0.6 mm.

At the same time, the next-generation high-density optical disk needs to provide compatibility with conventional DVDs and CDs, which are now widespread. That is, the optical disk player for reproducing the next-generation high-density optical disk is required to reproduce conventional DVDs and CDs as well.

However, this is faced with one problem; namely, compatibility with different kinds of optical disks is difficult to achieve when the wavelengths of light or thicknesses of the light transmissive layers are different between different kinds of optical disks. As a rule, the objective lens is designed for a specific thickness of the light transmissive layer of a particular type of optical disk, and a specific wavelength of light used therefor. Accordingly, in the event where the light transmissive layers of the optical disks have greatly different thicknesses or the optical disks use greatly different wavelengths, spherical aberration is caused on the aperture spot, impairing focusing characteristic of the aperture spot. Note that, as used herein, the term "spherical aberration" refers to the difference between a focal point for a paraxial ray near the center of the light beam and a focal point for a marginal ray distanced from the center of the light beam.

In view of this problem, there have been proposed optical pickups with a plurality of laser beam sources of different wavelengths and with a single objective lens, whereby a laser beam is converged on an information recording face with a required numerical aperture.

For example, Japanese Publication for Unexamined Patent Application No. 197717/2002 (published on Jul. 12, 2002) (Publication 1) discloses a technique using an optical system in which the objective lens is made with a diffracting face on a curved face of the objective lens, so as to record and reproduce information with respect to three kinds of optical disks having light transmissive layers of 0.6 mm, 0.6 mm, and 1.2 mm, for which the wavelengths of 400 nm, 650 nm, and 780 nm are used, respectively. The objective lens with the diffracting face is designed such that the first order component of the diffracted light is used for the light beam of each wavelength.

Another example is Japanese Publication for Unexamined Patent Application No. 306261/2000 (published on Nov. 2, 2000) (Publication 2), which discloses an optical pickup device including a first light source, a second light source, a focusing optical system, and a compensating optical system. In this optical pickup device, the first light source emits a light beam with a wavelength of 650 nm. The second light source emits a light beam with a wavelength of 780 nm. The converging optical system is configured to cause the light beam from the first light source to converge on an information recording face of a DVD without causing serious spherical aberration. The compensating optical system is disposed between the second light source and the focusing optical system. The compensating optical system is provided to suppress the spherical aberration that is caused when the focusing optical system focuses the light beam from the second light source focuses on an information recording face of a CD.

Yet another example is Japanese Publication for Unexamined Patent Application No. 93179/2001 (published on Apr. 6, 2001) (Publication 3), which discloses a technique concerning an optical pickup for reproducing optical disks having light transmissive layers of the same thickness, using different wavelengths of light. This technique uses two light sources for respectively emitting a light beam (blue light) of 405 nm wavelength and a light beam (red light) of 650 nm wavelength. A diffraction optical element and an objective lens that can focus the blue light on an optical disk having a light transmissive layer of 0.6 mm thick are also used. In this technique, the light of either wavelength is incident on the diffraction optical element as a parallel ray, and the second order component of the light diffracted by the diffraction optical element is used for the blue light, and the first order component of the light diffracted by the diffraction optical element is used for the red light, so as to attain sufficient diffraction efficiency for both of these different wavelengths of light, and, at the same time, compensate for spherical aberration generated in the red light.

Proceedings of the 63rd Annual Meeting of Applied Physics on "*DVD/CD Compatibility Technique in Blue-ray Disc*", Naoki Kaiho et al., Fall, 2002, No.3, P.1008, Lecture Number (27p-YD-5) (Publication 4) discloses a technique using an optical system including an objective lens and a hologram (diffraction element) that serves as a concave lens only for a light beam of 785 nm wavelength, the optical system recording and reproducing information with respect to three kinds of optical disks having light transmissive layers of 0.1 mm, 0.6 mm, and 1.2 mm, for which the wavelengths of 405 nm, 655 nm, and 785 nm are used, respectively.

The following describes the problems that are caused when the technique disclosed in Publication 1 is used for optical disks with light transmissive layers of different thicknesses, including a next-generation high-density optical disk ($\lambda$=400 nm, light transmissive layer=0.1 mm), a DVD ($\lambda$=650 nm, light transmissive layer=0.6 mm), and a CD ($\lambda$=780 nm, light transmissive layer=1.2 mm).

As a rule, an optical pickup (compatible optical pickup) compatible with optical disks of different recording densities uses an objective lens for which aberration is compensated for with respect to the optical disk with the largest recording density. Therefore, the compatible optical pickup for the next-generation high-density optical disk, the conventional DVD, and the conventional CD uses an objective lens for which aberration is compensated for with respect to the next-generation high-density optical disk. The objective lens cannot be used directly for the DVD or CD whose light transmissive layers have different thicknesses from that of the next-generation high-density optical disk, because in this case spherical aberration increases to the level where recording or reproducing cannot be carried out.

One way to solve this problem when recording or reproducing DVD is to compensate for the spherical aberration caused by the thickness difference of the light transmissive layers, by generating aberration in the opposite direction. This can be carried out by causing the light beam to enter the objective lens as a diverging ray.

That is, in order to record or reproduce optical disks with light transmissive layers of different thicknesses, the light beams of the respective wavelengths are incident on the objective lens by varying the degree of convergence and/or divergence of each light beam.

When a parallel ray of blue light ($\lambda$=400 nm) is incident on an objective lens with an effective diameter of 3 mm to be focused on the next-generation optical disk with a light transmissive layer of 0.1 mm thick, the degree of divergence for the red light ($\lambda$=650 nm) needs to be about −0.03 in order to compensate for the spherical aberration caused by the thicker light transmissive layer of the DVD. Similarly, in this case, the degree of divergence for the infrared light ($\lambda$=780 nm) needs to be about −0.07 in order to compensate for the spherical aberration caused by the yet thicker light transmissive layer of the CD. Here, the degree of convergence or divergence is an inverse of a focal length, and the negative value indicates a diverging ray, and the positive value indicates a converging ray.

Here, the red light and infrared light, with their large degrees of divergence of incident ray on the objective lens, greatly impair the focusing characteristic of the light by causing coma aberration on the aperture spot on the optical disk when the objective lens shifts in the radial direction (direction substantially orthogonal to the optical axis of the incident light on the objective lens) during tracking or other operations. The impairment of focusing characteristic caused by radial shifting of the objective lens is more severe in CD because the degree of divergence for the incident light on the objective lens is greater in CD.

With the objective lens having the diffracting face as disclosed in Publication 1, attaining diffraction efficiency of 100% for the first order component of one wavelength limits the diffraction efficiency for the first order component of the diffracted light of the other wavelengths, with the result that a desired level of high diffraction efficiency cannot be obtained. This brings about the problem of poor light efficiency by a loss of light quantity. The loss of light quantity necessitates a laser beam of higher power for the recording of information in particular. Further, the diffracted rays of unnecessary orders may enter the detector as stray light when reproducing information, with the result that the signal may be impaired.

When the technique disclosed in Publication 2 is used for the optical pickup device for reproducing information from the next-generation high-density optical disk and the DVD, the optical pickup is provided with an objective lens with a large numerical aperture. The objective lens is made of glass of a high refractive index, and therefore has strong wavelength dependency. The strong wavelength dependency of the objective lens poses a problem in that a focal point deviates greatly in the presence of wavelength fluctuations caused by mode hopping or high-frequency superimposition, which cannot be followed by an actuator.

When the technique disclosed in Publication 3 is used for the optical disks with light transmissive layers of different thicknesses (next-generation high-density optical disk with a 0.1 mm thick light transmissive layer, and conventional DVD with a 0.6 mm thick light transmissive layer), and when the respective light beams of blue and red are incident on the diffraction optical element as parallel rays, the angle difference between the diffraction angle for the blue light and the diffraction angle for the red light, which is required to compensate for the spherical aberration caused by the large difference in thickness of the light transmissive layers, must be increased to about 2° to 3°. The angle difference is related to the pitch of the diffraction grating of the diffraction optical element, as shown by the graph of FIG. 35. It can be seen from FIG. 35 that the pitch of the diffraction grating needs to be as narrow as 3.5 μm to 4.5 μm in order to achieve the angle difference of about 2° to 3°.

Further, since the objective lens (infinite objective lens) is generally optimized for the blue light approaching from a point of infinity, the emergent ray from the diffraction optical element needs to be a parallel ray. That is, a ray of blue light that is bent on the diffracting face of the diffraction optical element needs to be refracted to a parallel ray on entering the refracting face (face of the diffraction optical element on the side of the objective lens). This is also effective in preventing aberration caused by misalignment of the diffraction optical element with the objective lens.

FIG. 36 represents a relationship between pitch of the diffraction grating and curvature of the refracting face of the diffraction optical element, when a parallel ray of blue light incident on the diffraction optical element emerges from the diffraction optical element as a parallel ray. Note that, the relationship represented in FIG. 36 is based on a diffraction optical element in an optical pickup using an objective lens with an effective radius of 2 mm. The refracting face of the diffraction optical element is spherical. It can be seen from FIG. 36 that the curvature radius of the refracting face of the diffraction optical element needs to be no greater than 2.2 mm in order to confine the pitch of the diffraction grating from 3.5 μm to 4.5 μm.

However, given the fact that the effective radius of the objective lens is 2 mm, and that the effective diameter of the diffraction optical element is also 2 mm, the refracting face with a curvature radius of no greater than 2.2 mm is substantially hemispherical, which is impossible to fabricate or practically useless. The refracting face may be made aspherical, but in this case the exceedingly small curvature makes fabrication of the diffraction optical element difficult. Even if it is possible to fabricate, the on-axis focusing characteristic is undesirably increased to 0.018λ(rms) for all of the optical disks.

As a rule, the diffraction efficiency of a hologram (diffraction element) for a given wavelength is determined by the depth of the diffraction grating. FIG. 2 is a graph representing a relationship between depth of a diffraction grating and diffraction efficiency for different wavelengths of light of different diffraction orders. In FIG. 2, indicated by B0, B1, B2 are respectively diffraction efficiencies for the zeroth order, first order, and second order components of the diffracted light of a light beam of 400 nm wavelength for the next-generation high-density optical disk. Indicated by R0, R1 are respectively diffraction efficiencies for the zeroth order and first order components of the diffracted light of a light beam of 650 nm wavelength for DVD. Ir0 and Ir1 are respectively diffraction efficiencies for the zeroth order and first order components of the diffracted light of a light beam of a 780 nm wavelength for CD.

FIG. 2 represents one application of the technique of Publication 1 in the foregoing optical disk. As can be seen from the graph of FIG. 2 according to one embodiment of the present invention, when the depth of the diffraction grating is set such that the first order component of the diffracted light of 780 nm wavelength yields higher efficiency than the other diffraction orders of the light of this wavelength, the diffraction efficiency for the diffracted light of a predetermined diffraction order of the other wavelengths (zeroth order component of the diffracted light for the light beams of wavelength 405 nm and 650 nm) falls below about 10%. Conversely, when the depth of the diffraction grating is set such that the zeroth order component of the diffracted light for the light beams of wavelength 405 nm and 650 nm yield higher efficiency than the other diffraction orders of the respective wavelengths, the diffraction efficiency for the first order component of the diffracted light of 785 nm wavelength falls below about 10%. It is therefore practically impossible to set such a depth for the grating that the efficiency of light is increased for the all wavelengths of light.

More specifically, when the depth of the diffraction grating is set for the light beam of 405 nm wavelength, for which fabrication of a high power laser is difficult, so as to increase the diffraction efficiency, i.e., the efficiency of using light, to, for example, 80% or greater, the efficiency of using the first order component of the diffracted light of 780 nm wavelength decreases to 5% or less. In this case, the optical pickup is unable to produce sufficient light quantity for the recording or reproducing of information with respect to CD.

SUMMARY OF THE INVENTION

An object of the present invention is to provide an optical pickup that can (a) record or reproduce information with respect to recording media respectively having light transmissive layers of different thicknesses and respectively using optimum light beams of different wavelengths, (b) prevent light focusing characteristics from being severely impaired by radial shifting of an objective lens, and (c) suppress displacement of a focal point caused by wavelength fluctuations.

In order to achieve the foregoing object, an optical pickup of the present invention includes: a first light source that emits a first light beam of a first wavelength $\lambda 1$; a second light source that emits a second light beam of a second wavelength $\lambda 2$ longer than the first wavelength $\lambda 1$; an objective lens that focuses the first light beam on an information recording face of a first recording medium having a first light transmissive layer, and focuses the second light beam on an information recording face of a second recording medium having a second light transmissive layer thicker than the first light transmissive layer; and a diffraction optical element disposed in an optical path between the first and second light sources and the objective lens, and including a diffraction grating and a lens with a refractive index n, wherein, when a distance between a diffracting face of the diffraction grating and a peak of a lens face of the lens is a, a radius of the second light beam is R, and a pitch of the diffraction grating confined by outermost rays of the second light beam passing through the diffraction grating is d, said diffraction optical element is set so that m1 and m2, which are diffraction orders of the first and second light beams, respectively, satisfy $$f(d,m_1)=f(d,m_2),$$

where $f(d, m_x)$, x being 1 or 2, is a function given by $$f(d, m_X) = \frac{(R - a\tan\alpha_X)\sqrt{C_X^2 + S_X^2}}{S_X - C_X\tan\alpha_X - \sqrt{C_X^2 - S_X^2}\tan\alpha_X}$$

$$C_X = n\cos\alpha_X - \cos\beta_X$$

$$S_X = n\sin\alpha_X - \sin\beta_X$$

$$\sin\alpha_X = \frac{m_X \lambda_X}{d},$$

where $\alpha 1$ is an diffraction angle for m1-th order diffracted light for the first light beam through the diffraction grating, $\beta 1$ is an angle made by a refracted ray of the m1-th order diffracted light through the lens with respect to an optical axis of the first light beam, $\alpha 2$ is an diffraction angle for m2-th order diffracted light for the second light beam through the diffraction grating, $\beta 2$ is an angle made by a refracted ray of the m2-th order diffracted light through the lens with respect to the optical axis.

With this configuration, the first light beam is used for the first recording medium, and the second light beam is used for the second recording medium. The first light transmissive layer of the first recording medium is thicker than the second light transmissive layer of the second recording medium, and therefore the thickness of the second light transmissive layer causes aberration. The aberration can be compensated for by satisfying the foregoing equations. The present invention thus provides an optical pickup that can accurately focus light beams on the light transmissive layers of the recording media, so as to record and reproduce information.

That is, by using the diffraction optical element that includes the diffraction grating and the lens so as to use light of diffraction orders satisfying the condition given by the foregoing equation, focused light spots can be formed to their diffraction limits on the recording media respectively having light transmissive layers of different thicknesses, even though the light sources with greatly different wavelengths and the objective lens having a large numerical aperture are used. As a result, an optical pickup is provided that can record or reproduce information with respect to recording media respectively having light transmissive layers of different thicknesses and respectively using different optimum wavelengths of light.

The described effect can also be obtained when the optical pickup with the foregoing configuration is additionally provided with a collimator lens that is provided between the first light source and the diffraction optical element and between the second light source and the diffraction optical element, and that causes the respective first and second light beams of the first and second light sources to be incident on the diffraction optical element as parallel rays.

It is preferable in the optical pickup of the present invention that the diffraction optical element includes the diffracting grating and the lens as an integral unit.

With this configuration, the number of components in the optical pickup can be reduced.

It is preferable in the optical pickup of the present invention that $\beta 1=0$, and $\beta 2>0$.

With this configuration, when $\beta 1=0$, the first beam is a parallel ray, which helps to improve shifting characteristics of the objective lens. Here, spherical aberration is caused in the second light transmissive layer of the second recording medium. The spherical aberration, however, can be suppressed by making the second light beam a diverging ray with $\beta 2>0$.

It is preferable in the present invention that the diffraction order of the m2-th order diffracted light is equal to or lower than the diffraction order of the m1-th order diffracted light.

With this configuration, the m1-th order diffracted light and the m2-th order diffracted light do not focus to a single point on the information recording face of the recording medium, so that the diffracted light does not cause adverse effects in reading or recording.

It is preferable in the optical pickup of the present invention that the diffraction optical element satisfies m1=1, and m2=1. It is also preferable that the lens is a planoconvex lens with a spherical convex face, and the diffraction grating is formed on a plane face of the planoconvex lens.

It is preferable in the optical pickup of the present invention that the diffraction optical element satisfies m1=1, and m2=0. It is also preferable that the lens is a planoconcave lens with an aspherical concave face, and the diffraction grating is formed on a plane face of the planoconcave lens. Further, the diffraction grating should preferably be provided on the side of the objective lens.

By satisfying these conditions, the optical pickup can be more suitably realized.

It is preferable in the optical pickup of the present invention that, when the diffraction order of first diffracted light is m1, the diffraction order of second diffracted light is m2, the pitch of grooved rings is d, and the sign of an angle created when a normal line of the diffracting face of the diffraction grating tilts toward the optical axis is positive, the diffracting face of the diffraction grating of the diffraction optical element satisfies $$\sin^{-1}\left(\frac{m_1 \lambda_1}{d}\right) - \sin^{-1}\left(\frac{m_2 \lambda_2}{d}\right) > 0$$

with the diffraction order m1 of +1 for the first diffracted light, and with the diffraction order m2 of 0 for the second diffracted light.

With this configuration, the diffraction order m1 of the first diffracted light is +1, and the diffraction order m2 of the second diffracted light is 0. Among different diffraction orders of the diffracted rays that satisfy the foregoing equation, the smallest value of the diffraction order m1 is used for the first diffracted light and the smallest value of the diffraction order m2 is used for the second diffracted light. In this way, diffraction efficiency can easily be improved for both the first diffracted light and the second diffracted light.

It is preferable in the optical pickup of the present invention that the diffracting face of the diffraction grating of the diffraction optical element has such a diffraction characteristic that the first and second light beams are diffracted toward the optical axis.

With this configuration, the diffraction characteristic of the diffracting face of the diffraction grating is such that the first and second light beams are diffracted toward the optical axis. This improves diffraction efficiency for the first diffracted light.

It is preferable in the optical axis of the present invention that the diffraction optical element has the diffracting face on an incident side of the first and second light beams, and has a concave face on an emergent side of the first and second diffracted light, the diffracting face and the concave face having a common optical axis.

With this configuration, the diffraction optical element is made with the diffracting face and the concave face. The concave face is provided to reduce on-axis chromatic aberration of the objective lens. Thus, by having the concave face in addition to the diffracting face, displacement of a focal point caused by wavelength fluctuations can be suppressed more effectively for the first diffracted light, as well as for the second diffracted light.

It is preferable in the optical pickup of the present invention that the concave face is aspherical.

With this configuration, the concave face of the diffraction optical element is made aspherical. By suitably shaping the concave face to have an aspherical shape, it is possible to reduce, more effectively than the spherical concave face, to reduce spherical aberration and form more desirable light spots on the respective information recording faces of the two recording media respectively having light transmissive layers of different thicknesses.

The optical pickup of the present invention is suitably used in optical recording and reproducing apparatuses such as a DVD recording apparatus and a CD recording apparatus.

For a fuller understanding of the nature and advantages of the invention, reference should be made to the ensuing detailed description taken in conjunction with the accompanying drawings.

BRIEF DESCRIPTION OF THE DRAWINGS

FIG. 10(a) and FIG. 10(b) are cross sectional views of an objective lens unit according to one Example of the embodiment of the present invention, showing how light beams are focused on optical disks with the objective lens unit, in which FIG. 10(a) shows how the first light beam is focused on the first optical disk, and FIG. 10(b) shows how the second light beam is focused on the second optical disk.

FIG. 11(a) and FIG. 11(b) are graphs representing a relationship between shift amount of the objective lens unit and wavefront aberration when light beams are focused by the objective lens unit of FIG. 1, in which FIG. 11(a) represents the first light beam being focused, and FIG. 11(b) represents the second light beam being focused.

FIG. 13(a) and FIG. 13(b) are cross sectional views of an objective lens unit according to one Example of the embodiment of the present invention, showing how light beams are focused on optical disks with the objective lens unit, in which FIG. 13(a) shows how the first light beam is focused on the first optical disk, and FIG. 13(b) shows how the second light beam is focused on the second optical disk.

FIG. 14(a) and FIG. 14(b) are graphs representing a relationship between shift amount of the objective lens unit and wavefront aberration when light beams are focused by the objective lens unit of FIG. 13(a) and FIG. 13(b), in which FIG. 14(a) represents the first light beam being focused, and FIG. 14(b) represents the second light beam being focused.

FIG. 15(a) and FIG. 15(b) are cross sectional views of an objective lens unit according to Example 3 of the embodiment of the present invention, showing how light beams are focused on optical disks with the objective lens unit, in which FIG. 15(a) shows how the first light beam is focused on the first optical disk, and FIG. 15(b) shows how the second light beam is focused on the second optical disk.

FIG. 16(a) and FIG. 16(b) are graphs representing a relationship between shift amount of the objective lens unit and wavefront aberration when light beams are focused by the objective lens unit of FIG. 15(a) and FIG. 15(b), in which FIG. 16(a) represents the first light beam being focused, and FIG. 16(b) represents the second light beam being focused.

FIG. 22(a) through FIG. 22(c) are cross sectional views showing one example of degrees of convergence and/or divergence of light beams in an optical pickup according to one embodiment of the present invention, in which FIG. 22(a) represents blue light, FIG. 22(b) represents red light, and FIG. 22(c) represents infrared light.

FIG. 25(a) through FIG. 25(c) are cross sectional views showing another example of degrees of convergence and/or divergence of light beams in the optical pickup according to the embodiment of the present invention, in which FIG. 25(a) represents blue light, FIG. 25(b) represents red light, and FIG. 25(c) represents infrared light.

FIG. 30(a) through FIG. 30(c) are cross sectional views showing one example of degrees of convergence and/or divergence of light beams in an optical pickup according to one embodiment of the present invention, in which FIG. 30(a) represents blue light, FIG. 30(b) represents red light, and FIG. 30(c) represents infrared light.

FIG. 33(a) through FIG. 33(c) are cross sectional views showing another example of degrees of convergence and/or divergence of light beams in the optical pickup according to the embodiment of the present invention, in which FIG. 33(a) represents blue light, FIG. 33(b) represents red light, and FIG. 33(c) represents infrared light.

FIG. 37(a) through FIG. 37(c) are cross sectional views showing another example of degrees of convergence and/or divergence of light beams in the optical pickup according to the embodiment of the present invention, in which FIG. 37(a) represents blue light, FIG. 37(b) represents red light, and FIG. 37(c) represents infrared light.

DESCRIPTION OF THE EMBODIMENTS

First Embodiment

Figure 1:
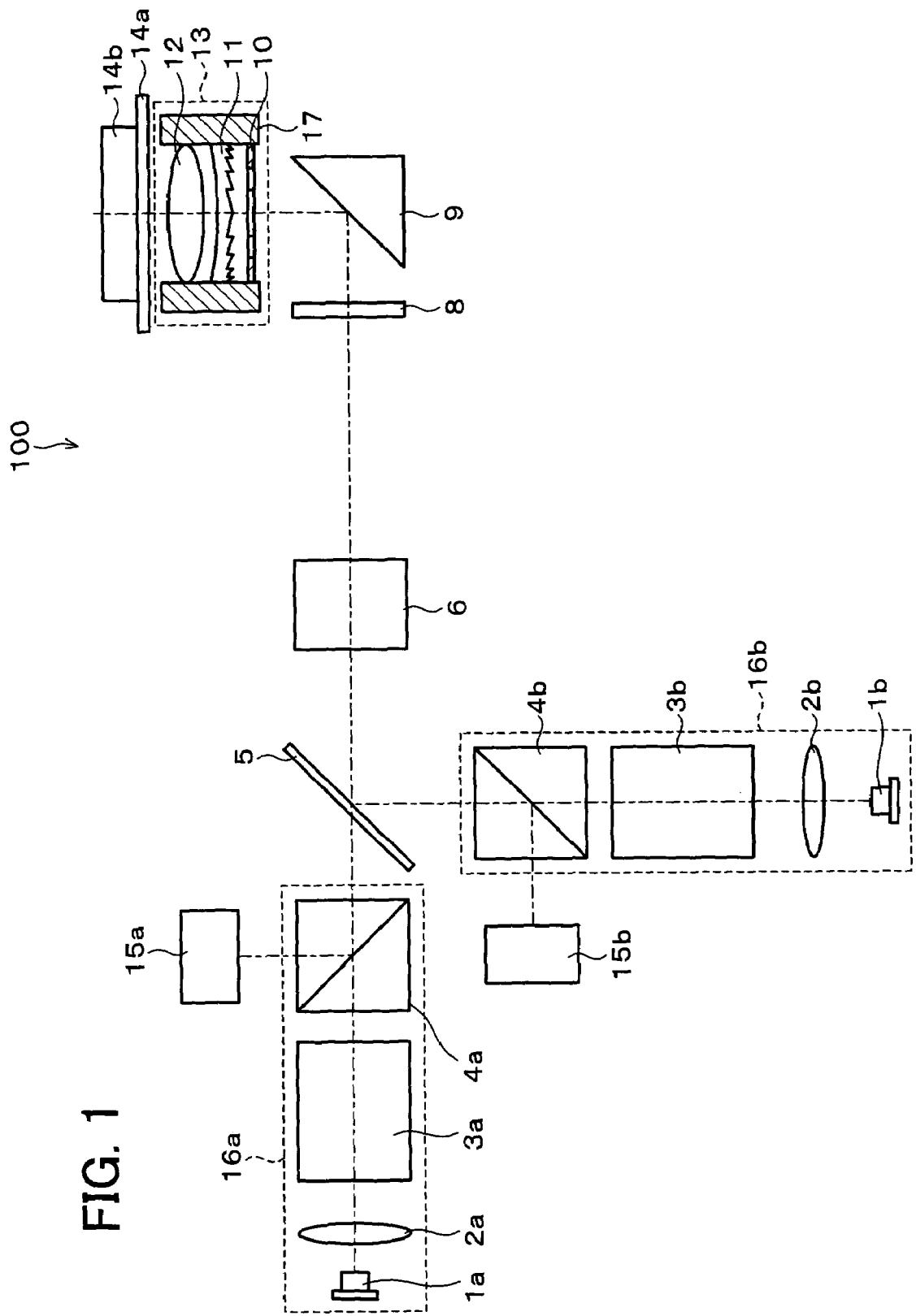
FIG. 1 is a block diagram showing an optical system in an optical pickup according to one embodiment of the present invention.

FIG. 1 illustrates a schematic structure of an optical pickup 100 of the present embodiment. The description of the present embodiment will be given based on the optical pickup 1 that is compatible with a next-generation high-density optical disk 14a (first optical disk, first recording medium) and a conventional DVD 14b (second optical disk, second recording medium).

The first optical disk uses blue light (first light beam) of a short wavelength in the vicinity of 405 nm (first wavelength $\lambda 1$ ), and has a light transmissive layer with a thickness t1=0.1 mm. The second optical disk uses red light (second light beam) of a long wavelength in the vicinity of 650 nm (second wavelength $\lambda 2$), and has a light transmissive layer with a thickness t2=0.6 mm.

The optical pickup 100 includes a semiconductor laser 1a that emits a first light beam 1 of the first wavelength $\lambda 1$, and a semiconductor laser 1b that emits a second light beam 2 of the second wavelength $\lambda 2$ longer than $\lambda 1$. The semiconductor laser 1a and semiconductor laser 1b are switched (turned on) according to the type of target optical disk.

The optical pickup 100 further includes collimator lenses 2a and 2b, shaping optical systems 3a and 3b, and beam splitters 4a and 4b. Through the collimator lenses 2a and 2b, the first and second light beams respectively emerged from the semiconductor lasers 1a and 1b become parallel rays. The shaping optical systems 3a and 3b, such as a shaping prism, shape an ellipsoidal intensity distribution of the first and second light beams into a substantially circular intensity distribution. The beam splitters 4a and 4b pass the first and second light beams from the shaping optical systems 3a and 3b.

The shaping optical systems 3a and 3b are realized by a known optical system, which may be a single triangular prism, a combined triangular prism, or two discrete triangular prisms. It should be noted that the shaping optical systems 3a and 3b are optional in the optical pickup 100.

The semiconductor laser 1a, the collimator lens 2a, the shaping optical system 3a, and the beam splitter 4a make up a first optical system 16a. The semiconductor laser 1b, the collimator lens 2b, the shaping optical system 3b, and the beam splitter 4b make up a second optical system 16b.

The first and second light beams respectively emerged from the first and second optical systems 16a and 16b enter a dichroic prism 5 where their optical axes merge. Leaving the dichroic prism 5, the first and second light beams travel through a common optical system.

In the common optical system, the first and second light beams pass through a spherical aberration compensation system 6 and a ¼-wavelength plate 8, and are reflected by a mirror 9 into an objective lens unit 13.

Entering the objective lens unit 13, the first and second light beams travel through a wavelength-selective aperture filter 10, a diffraction optical element 11, and an objective lens 12 in this order, and form a small light spot on an information recording face of the first optical disk 14a or second optical disk 14b.

The spherical aberration compensation system 6, which is realized, for example, by a beam expander or liquid crystal compensation element, is provided to compensate for the spherical aberration caused by uneven thickness or other properties of the light transmissive layers of the first and second optical disks 14a and 14b.

In a configuration where the optical pickup 100 does not include the shaping optical systems 3a and 3b, the spherical aberration compensation system 6 may not be provided. The wavelength-selective aperture filter 10 controls aperture so that a numerical aperture NA1 (0.85 to be specific) and a numerical aperture NA2 (0.6 to be specific) are obtained for the light beams of the first and second wavelengths λ1 and λ2, respectively. Note that, the wavelength-selective aperture filter 10, which is provided between the mirror 9 and the diffraction optical element 11 in this embodiment, may be disposed in any other position, provided that the wavelength-selective aperture filter 10 is operative as an integral unit with the diffraction optical element 11 and the objective lens 12. Further, the wavelength-selective aperture filter 10 may be realized by any other member, provided that it serves to control aperture.

Note that, the diffraction optical element 11 and the objective lens 12 are held in place by a holder 17 (support member). The support member supporting the diffraction optical element 11 and the objective lens 12 prevents the diffraction optical element 11 and the objective lens 12 from shifting relative to one another. In this way, impairment of the light focusing characteristic caused by misalignment of the diffraction optical element 11 with the objective lens 12 can be prevented.

The objective lens unit 13 includes a driving unit (driving means; not shown), so as to adjust a focal point of projected light on the optical disks 14a and 14b. That is, the driving unit is used to track oscillations or rotation eccentricity of the optical disks 14a and 14b.

The wavelength-selective aperture filter 10, the diffraction optical element 11, and the objective lens 12 are integrally provided as the objective lens unit 13.

In addition to the foregoing light projecting optical system, the optical pickup 100 further includes reproduced signal detecting optical systems 15a and 15b. The reproduced signal detecting optical systems 15a and 15b are realized by a known optical system, and serve to reproduce a light spot control signal for auto focusing or tracking, or an information signal recorded in the optical disk.

The diffraction optical element 11 is made of glass or plastic, for example. The diffraction optical element 11 has a diffraction grating having concentrically grooved rings around the optical axis, or raised orbicular bands formed by photolithography around the optical axis. The diffraction grating is formed so that the cross section that cuts across the plane including the optical axis is blazed (serrated) or stepped. The diffraction grating with the serrated or stepped cross section (serrated one in particular) is advantageous over other types of diffraction gratings because it offers higher diffraction efficiency.

The diffraction efficiency $\eta m$ of the blazed diffraction grating can be given by Equation (7) below.

$$\eta_m = \left| \frac{1}{T} \int_o^T A(x) \exp\{i\phi(x)\} \exp\left(-i\frac{2\pi mx}{T}\right) dx \right|^2, \tag{7}$$

where $A(x)$ is the transmitted amplitude distribution, $\phi(x)$ is the phase distribution, and T is the pitch of the grating.

Figure 2:
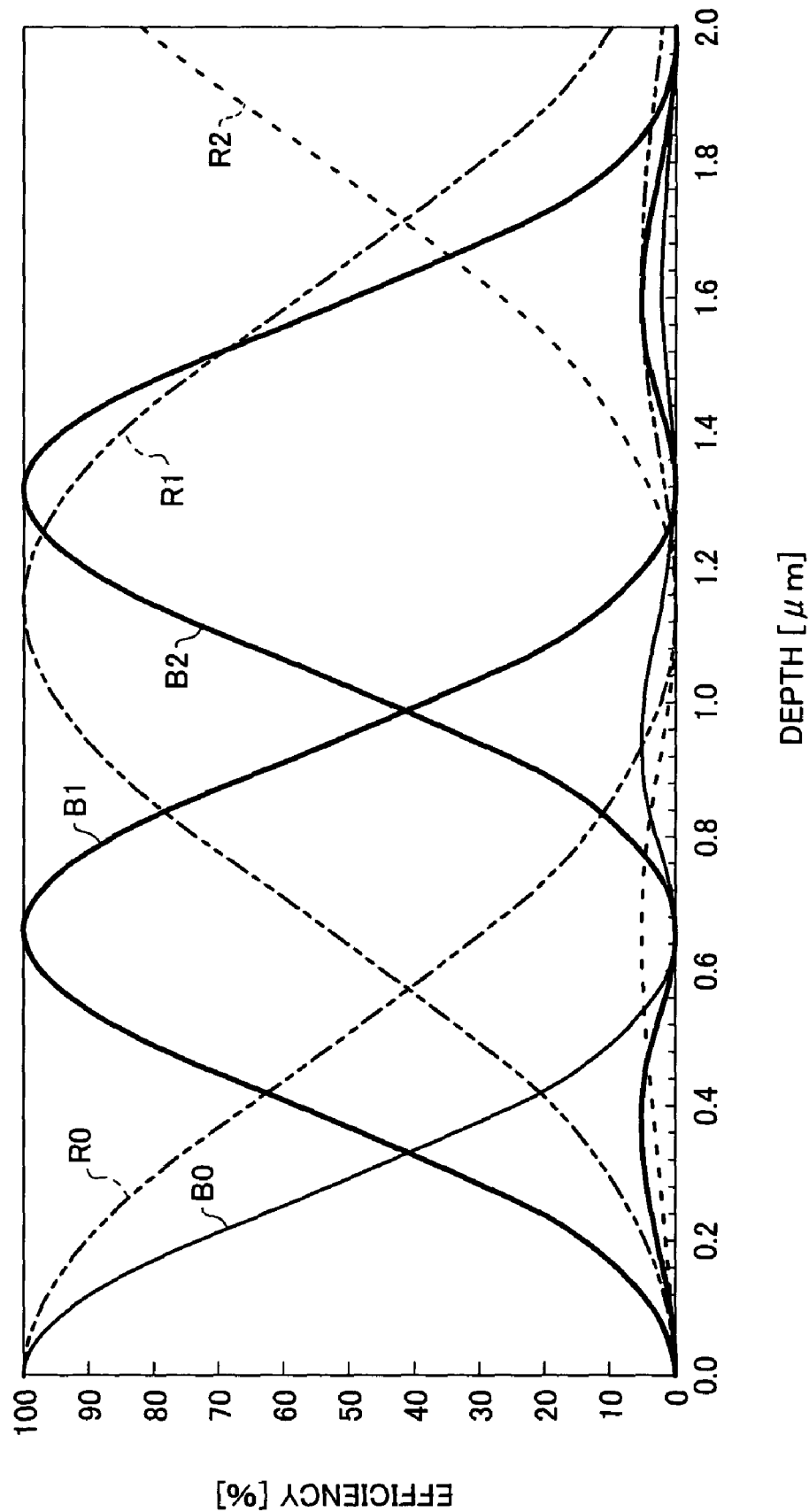
FIG. 2 is a graph representing a relationship between depth and diffraction efficiency of a diffraction optical element according to one embodiment of the present invention.

Specifically, FIG. 2 represents diffraction efficiency of a diffraction optical element when the diffraction grating is formed using a PC (polycarbonate) base. In FIG. 2, B0, B1, B2 respectively indicate diffraction efficiencies for the zeroth order, first order, and second order components of the diffracted light for the first light beam. Likewise, R0, R1, and R2 respectively indicate diffraction efficiencies for the zeroth order and first order components of the diffracted light for the second light beam.

The efficiency of each diffraction order is determined by the depth of the diffraction grating. Accordingly, a sufficient recording or reproducing light beam can be obtained by suitably setting the diffraction order and the depth of the grating. In this way, an optical pickup that can record and erase information requiring high power can be realized. In addition, the laser power can be reduced to suppress power consumption.

Further, the spherical aberration due to the thickness difference of the light transmissive layers of the optical disks 14a and 14b is inversely related to the spherical aberration that is caused when a diverging ray is incident on the objective lens 12. Thus, in order to focus a light beam on the recording layers of both the next-generation high-density optical disk and the DVD disk using the objective lens 12, the light beam of blue should preferably be incident on the objective lens 12 as a parallel ray, and the light beam of red should preferably be incident on the objective lens 12 as a diverging ray.

Therefore, it is preferable in the optical pickup 100 of the present invention that the diffraction optical element 11 is so designed that the first light beam of blue with a wavelength of 405 nm emerges from the diffraction optical element 11 as a parallel ray, and the second light beam of red with a wavelength of 650 nm emerges from the diffraction optical element 111 as a diverging ray.

Figure 3:
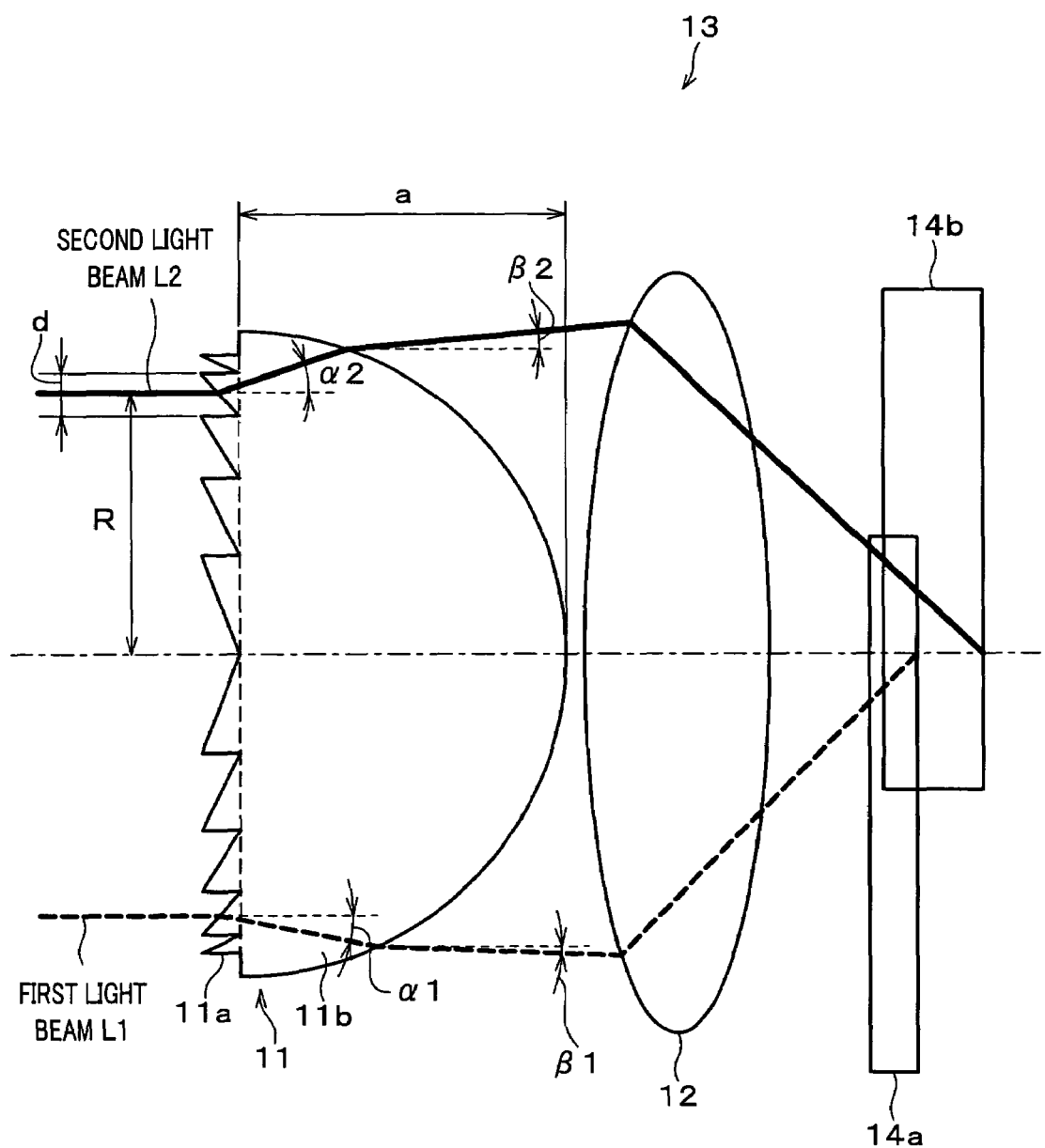
FIG. 3 is an explanatory drawing showing action of the diffraction optical element in the optical pickup.

Referring to FIG. 3, the following more specifically describes the objective lens unit 13 of the optical pickup 100 to which the foregoing conditions apply. The objective lens unit is designed such that the light beam that passes through the diffraction optical element 11 having the diffraction grating 11a on a diffracting face of a lens portion 11b of a refractive index n is focused on the recording layer of the optical disk 14 through the objective lens 12. The distance between the peak of the lens portion 11b and the diffracting face along the optical axis is denoted as a.

Note that, in FIG. 3, the broken line that focuses on the optical disk 14a via the diffraction grating 11a and the objective lens 12 denotes the first light beam, and the solid line that focuses on the optical disk 14b via the diffraction grating 11a and the objective lens 12 denotes the second light beam.

Here, when the numerical aperture of the objective lens 12 is NA2 (0.6 to be specific), the corresponding light beam (second light beam) of 650 nm wavelength has an outermost radius R (radius R of the second light beam) when it passes through the diffracting face of the diffraction optical element 11. In this case, when the first and second light beams of the respective wavelengths pass through the diffraction optical element 11 within radius R, the beam angles created by the optical axis and the first and second light beams emerging from the diffraction optical element 11 should respectively be set so that the first and second light beams are desirably focused on the recording layers of the respective optical disks. Specifically, when the diffraction order of the light beam of 405 nm wavelength is m1, and when that of the light beam of 650 nm wavelength is m2, the diffraction orders m1 and m2 allow for the foregoing design when they satisfy Equation (8) below.

$$r = f(d, m_1) = f(d, m_2) \tag{8}$$

where r is the curvature radius, and $f(d, m_x)$ is a function given by Equation (9) below.

$$r = f(d, m_X) = \frac{(R - a\tan\alpha_X)\sqrt{C_X^2 + S_X^2}}{S_X - C_X\tan\alpha_X - \sqrt{C_X^2 - S_X^2}\tan\alpha_X} \tag{9}$$

$$C_X = n\cos\alpha_X - \cos\beta_X$$

$$S_X = n\sin\alpha_X - \sin\beta_X$$

$$\sin\alpha_X = \frac{m_X \lambda_X}{d},$$

where X is 1 or 2, and R is the radius of the second light beam on the diffracting face, corresponding to the numerical aperture NA2 of the objective lens 12. In the diffraction grating 11a of the diffraction optical element 11, the diffraction orders of the first and second light beams are m1 and m2, respectively, and their diffraction angles are α1 and α2, respectively. Further, the angles created by the optical axis and the first and second light beams emerging from the lens portion 11b when the light beams desirably focus to form light spots on the optical disks (recording medium) is β1 and β2, respectively. The pitch of diffraction grating 11a within radius R is d.

Figure 4:
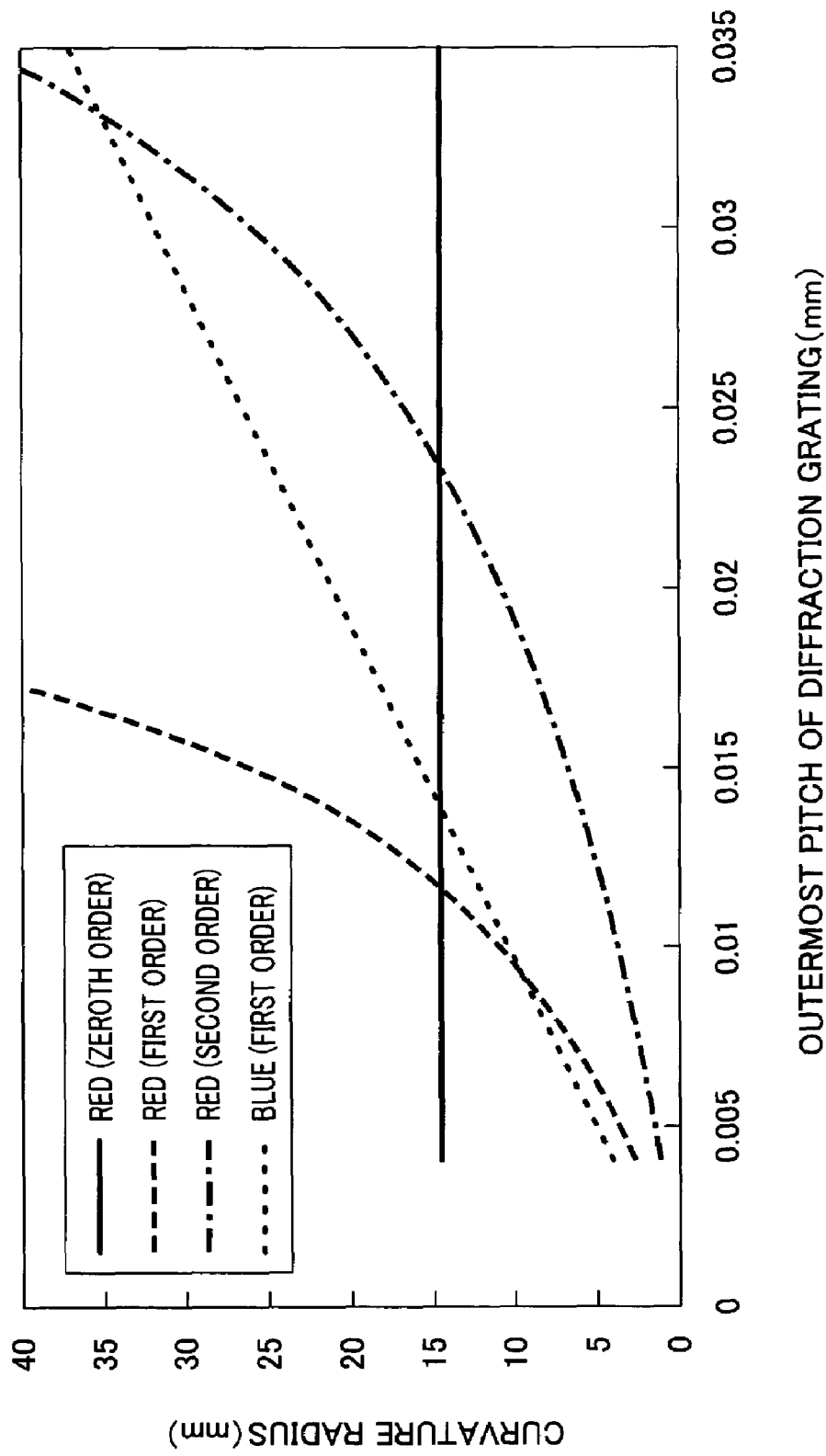
FIG. 4 is a graph representing a relationship between first order diffracted light of a light beam of a first wavelength and diffracted light of a light beam of a second wavelength, determining a curvature radius in the diffraction optical element according to one embodiment of the present invention.
Figure 5:
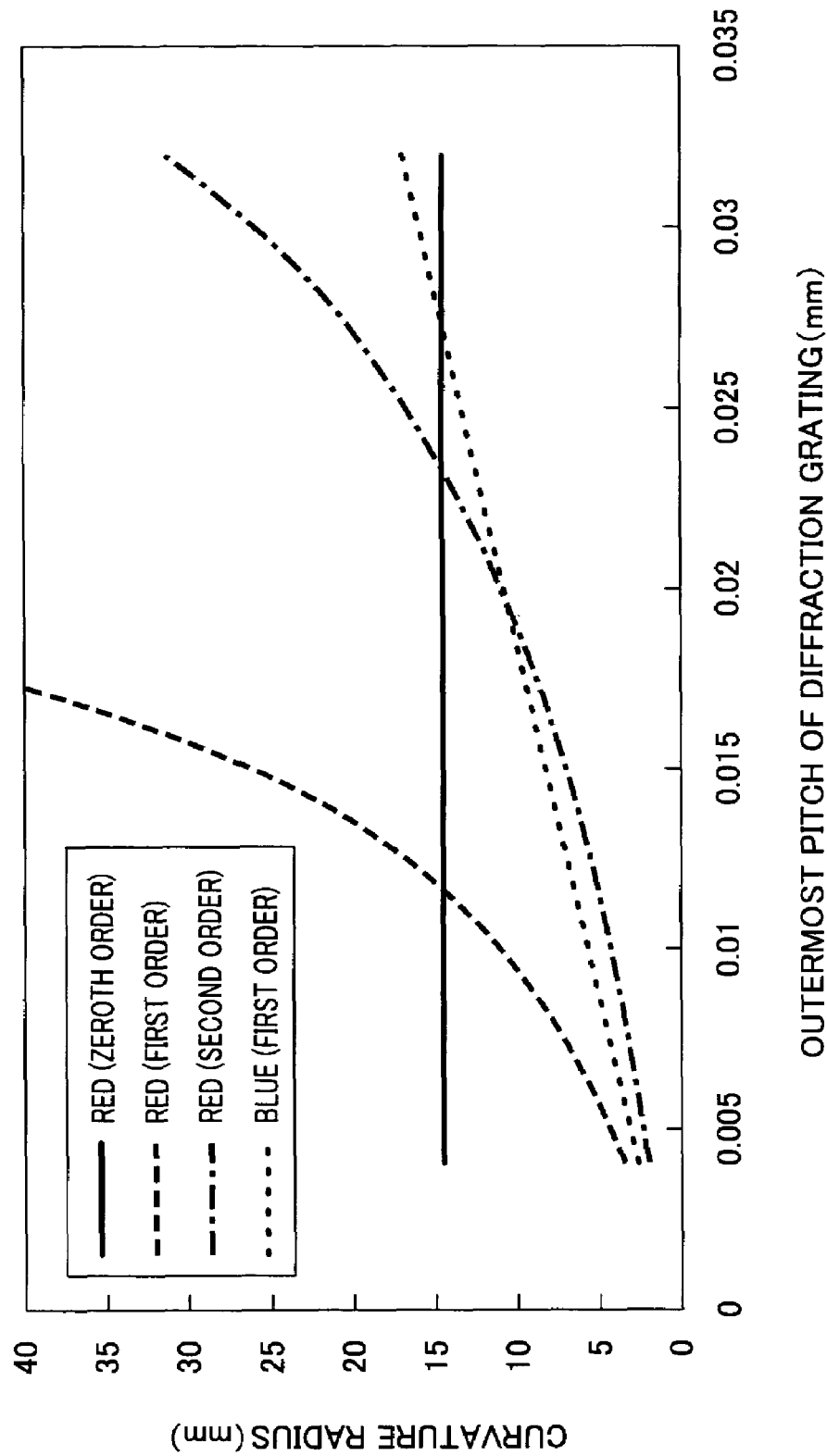
FIG. 5 is a graph representing a relationship between first order diffracted light of a light beam of a first wavelength and diffracted light of a light beam of a second wavelength, determining a curvature radius in the diffraction optical element according to another embodiment of the present invention.

Specifically, the divergence angles β1 and β2 for canceling spherical aberration vary depending on the shape of the objective lens 12. In the case of the next-generation high-density optical disk and the DVD disk, β1 and β2 are approximately 0° and 2.5°, respectively, when the lens portion 11b (base) of the diffraction optical element 11 is made of polycarbonate (PC) and when such a lens shape is selected, as will be described later, that a parallel ray of blue light (first light beam) entering the objective lens 12 does not cause aberration on the next-generation high-density optical disk. FIG. 4 and FIG. 5 represent a relationship between curvature radius r of the sphere and pitch d of the diffraction grating 11a when radius R=1.1. FIG. 4 indicates the result of calculation when the diffraction order of the blue light (405 nm) is the first order, and FIG. 5 indicates the result of calculation when the diffraction order of the blue light (405 nm) is the second order. Here, a combination of diffraction orders that does not create a point of intersection is unable to make diffraction optical element 11 that enables the light beams to focus on both the next-generation high-density optical disk and the DVD disk. Table 1 below shows combinations of possible diffraction orders.

TABLE 1

| DIFFRACTION ORDER | | PC | COMBINATION OF |
|---|---|---|---|
| RED LIGHT | BLUE LIGHT | DIFFRACTION EFFICIENCY (%) | BLUE: PARALLEL AND RED: DIVERGENT |
| 0 | 0 | 100 | x |
| 1 | 0 | 20 | o |
| 2 | 0 | 5 | o |
| 0 | 1 | 65 | o |
| 1 | 1 | 78 | o |
| 2 | 1 | 0 | o |
| 0 | 2 | 10 | o |
| 1 | 2 | 98 | x |
| 2 | 2 | 35 | o |

The divergence angle β2 for canceling spherical aberration is set to 2.5° in the foregoing example. However, the combinations of diffraction orders realizing diffraction optical element 11 that enables the light beams to focus on both the next-generation high-density optical disk and the DVD disk are effective as long as the angle of incidence is from 1° to 5°.

The following describes Examples of the optical pickup according to the present embodiment.

EXAMPLE 1

Figure 6:
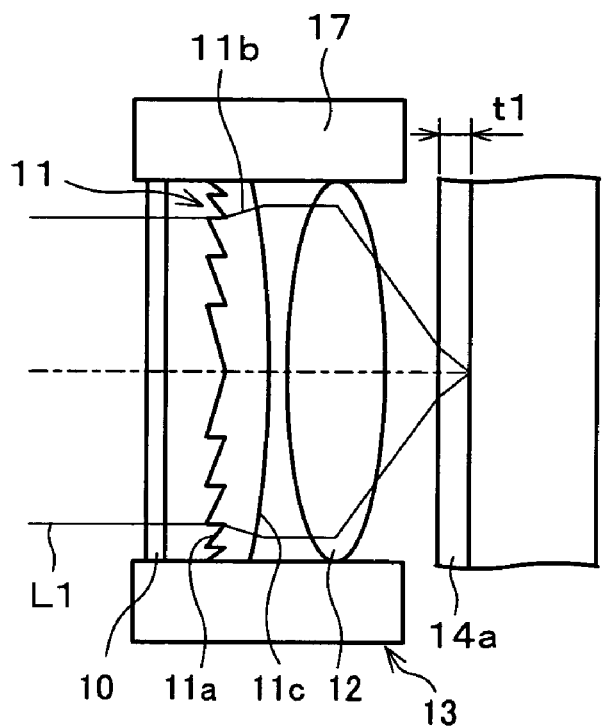
FIG. 6(a) is a partial cross sectional view of an objective lens unit, explaining action of the diffraction optical element according to another embodiment of the present invention when the first light beam is incident on the diffraction optical element.
FIG. 6(b) is a partial cross sectional view of an objective lens unit, explaining action of the diffraction optical element according to another embodiment of the present invention when the second light beam is incident on the diffraction optical element.
Figure 6:
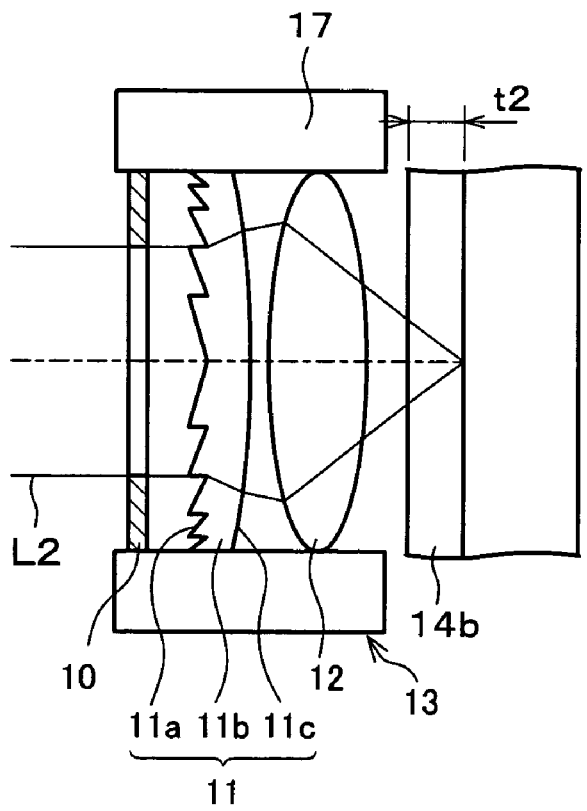

In this Example, the optical pickup 100 described in the foregoing First Embodiment includes a diffraction optical element 11 which is realized by a lens 116 that contains a diffraction grating 11a and a convex face 11c, as shown in FIG. 6(a) and FIG. 6(b), the diffraction grating 11a being disposed on the side of a light source. It is assumed in the following description that the base material (lens) of the diffraction optical element 11 is polycarbonate (PC), and the diffracted rays of the first light beam (λ=405 nm) and the second light beam (λ=650 nm) used are of the first order.

As shown in FIG. 6(a), a parallel ray of the laser beam (first light beam) of 405 nm wavelength incident on the diffraction optical element 11 diffracts on the face of the diffraction grating 11a in a direction of the first order diffraction (diverging direction). The first light beam then refracts as it passes through the convex face 11c and emerges from the diffraction optical element 11c as a parallel ray. Through the objective lens 12, the parallel ray focuses on the recording layer of the optical disk (next-generation high-density optical disk) 14a having a 0.1 mm thick light transmissive layer. In this way, the optical pickup 100 attains desirable light focusing characteristics.

As shown in FIG. 6(b), a parallel ray of the laser beam (second light beam) of 650 nm wavelength incident on the diffraction optical element 11c diffracts on the face of the diffraction grating 11a in a direction of the first order diffraction (diverging direction). The second light beam then refracts as it passes through the convex face 11c and emerges from the diffraction optical element 11c as a diverging ray. Through the objective lens 12, the diverging ray focuses on the recording layer of the optical disk (DVD disk) 14b having a 0.6 mm thick light transmissive layer. In this way, the optical pickup 100 attains desirable light focusing characteristics.

Here, the spherical aberration caused by the thickness of the light transmissive layer of the optical disk 14b (DVD disk) can be suppressed when the diverging ray is incident on the objective lens 12. Spherical aberration that cannot be compensated for this way can be compensated for by the aspherical portion of the diffraction grating 11a. Evidently, the convex face 11c may be aspherical by design, so as to more effectively suppress aberration.

In order to prevent outer rays of the light other than those corresponding to the numerical aperture of 0.6 from focusing on the optical disk 14b having the light transmissive layer of 0.6 mm thick, the numerical aperture of the objective lens 12 is switched using the wavelength-selective filter 10 that passes light with a wavelength of 405 nm but does not pass light with a wavelength of 650 nm.

In this Example, with the laser beam (first light beam L1; blue light) of 405 nm wavelength on the optical disk having the light transmissive layer of 0.1 mm thick, the RMS wavefront aberration is only 0.002λ, which is sufficiently small. A sufficiently small RMS wavefront aberration (0.002λ) is also obtained when the laser beam (second light beam L2; red light) of 650 nm wavelength is used for the optical disk having the light transmissive layer of 0.6 mm thick. This enables the optical pickup 100 to sufficiently read out information signals from the optical disks 14a and 14b.

In this Example, the diffraction optical element 11 has the diffraction grating 11a on the side of the light source and the convex face 11c is on the side of the objective lens 12. However, the configuration of the diffraction optical element is not limited thereto. For example, the diffraction optical element may have the convex face on the side of the light source, with the diffraction grating facing the objective lens.

Table 2 through Table 4 below show data that were obtained when the shape of the diffraction grating 11a and the curvature radius of the refracting face of the diffraction optical element 11 were designed by an automated process. Specifically, the values in Tables 1 through Table 4 below are the result of calculation on spherical aberration in the next-generation high-density optical disk (wavelength of 405 nm, light transmissive layer of 0.1 mm thick) and DVD (wavelength of 650 nm, light transmissive layer of 0.6 mm thick). The objective lens used in Table 2 through Table 4 below is so designed that blue light is optimally focused on the optical disk with the light transmissive layer of 0.1 mm thick.

TABLE 2

| FACE NUMBER | CURVATURE RADIUS | FACE PITCH | MATERIAL |
|---|---|---|---|
| Next-Generation High-Density Optical Disk (First Optical Disk) | | | |
| DIFFRACTION OPTICAL ELEMENT 1 | INFINITY | 0.5 | PC |
| 2 | -8.81 | 0.05 | |
| OBJECTIVE LENS 3 | 1.41 | 2.4 | LAH67_OHARA |
| 4 | 16.37 | 0.1 | |
| DISK 5 | INFINITY | 0.1 | PC |
| 6 | INFINITY | 0.252482 | |
| DVD (Second Optical Disk) | | | |
| DIFFRACTION OPTICAL ELEMENT 1 | INFINITY | 0.5 | PC |
| 2 | -8.81 | 0.05 | |
| OBJECTIVE LENS 3 | 1.41 | 2.4 | LAH67_OHARA |
| 4 | 16.37 | 0.1 | |
| DISK 5 | INFINITY | 0.6 | PC |
| 6 | INFINITY | 0.099382 | |

TABLE 3

| | | FACE NUMBER 5 | FACE NUMBER 6 |
|---|---|---|---|
| CONE FACTOR (K) | | -6.69E-01 | -1.01E+01 |
| ASPHERICAL FACTOR | A | 1.38E-02 | 4.95E-01 |
| | B | 4.04E-03 | -9.12E-01 |
| | C | 3.55E-04 | 5.38E-01 |
| | D | 2.98E-04 | -7.94E-02 |
| | E | 9.33E-05 | 4.95E-01 |

TABLE 4

| | SECOND FACE |
|---|---|
| DF 1 | 4.99E-02 |
| DF 2 | 2.06E-04 |
| DF 3 | -5.13E-06 |
| DF 4 | 0.00E+00 |
| DF 5 | 0.00E+00 |

In Table 2 through Table 4, the face numbers 1 and 2 are the light incident face and light emerging face of the diffraction optical element 11, respectively. The face numbers 3 and 4 are the light incident face and light emerging face of the objective lens 23, respectively. The face numbers 5 and 6 are the surface and the information recording face of the optical disk. Note that, the face pitch in each row of the face number is the distance between the face of a given face number and the face of the next face number on the optical axis.

The phase function Φ(r) is given by Equation (10) below.

$$\Phi(r) = m\frac{2\pi}{\lambda}(DF1r^2 + DF2r^4 + DF3r^6 + DF4r^8 + DF5r^{10}), \quad (10)$$

where m is the diffraction order, λ is the wavelength, r is the radius with respect to the optical axis, and DF1 through DF5 are factors.

In this Example (using the diffraction optical element 11 of Table 2 through Table 4), with the laser beam (blue light) of 405 nm wavelength on the optical disk having the light transmissive layer of 0.1 mm thick, the RMS wavefront aberration is only 0.002λ, which is sufficiently small. A sufficiently small RMS wavefront aberration (0.002λ) is also obtained when the laser beam (red light) of 650 nm wavelength is used for the optical disk having the light transmissive layer of 0.6 mm thick. This enables the optical pickup to sufficiently read out information signals from the optical disks 14a and 14b.

EXAMPLE 2

Figure 7:
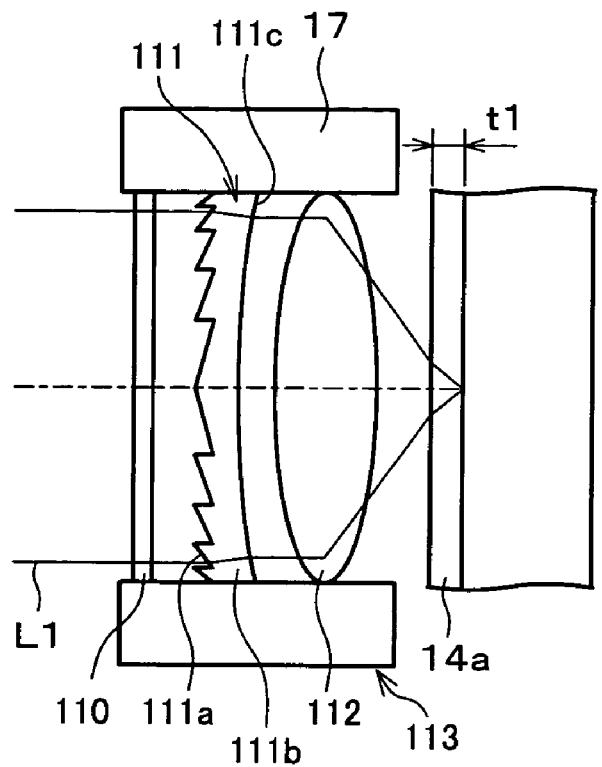
FIG. 7(a) is a partial cross sectional view of an objective lens unit, explaining action of a diffraction optical element according to yet another embodiment of the present invention when the first light beam is incident on the diffraction optical element.
FIG. 7(b) is a partial cross sectional view of an objective lens unit, explaining action of the diffraction optical element according to yet another embodiment of the present invention when the second light beam is incident on the diffraction optical element.
Figure 7:
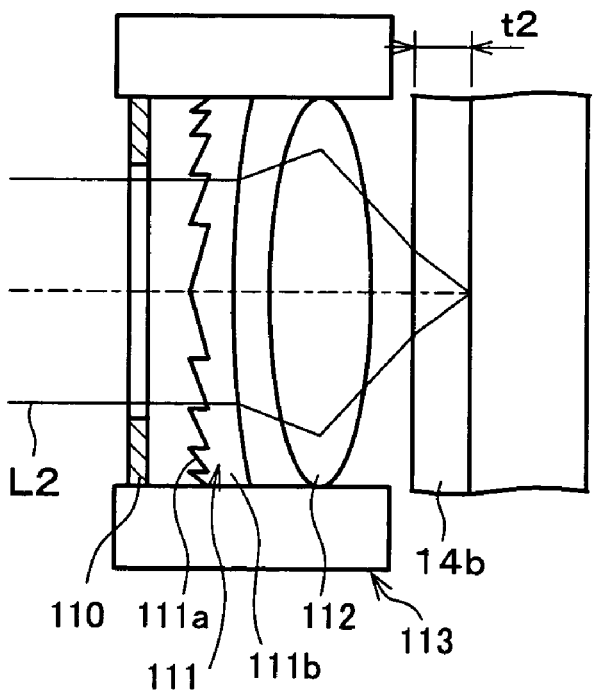

In this Example, the optical pickup 100 described in the foregoing First Embodiment includes, as shown in FIG. 7(a) and FIG. 7(b), an objective lens unit 113, instead of the objective lens unit 13 of the foregoing Example 1. That is, the optical pickup includes a diffraction optical element 111 which is realized by a lens 111b made with a concave face 111c and a diffraction grating 111a, the diffraction grating 111a being disposed on the side of a light source. The base material (lens) of the diffraction optical element 111 is polycarbonate (PC), and the face of the diffraction grating 111a of the diffraction optical element 111 satisfies Equation (11) below.

$$\sin^{-1}\left(\frac{m_1\lambda_1}{d}\right) - \sin^{-1}\left(\frac{m_2\lambda_2}{d}\right) > 0, \qquad (11)$$

where m1 is the diffraction order of the first diffracted light, m2 is the diffraction order of the second diffracted light, and d is the groove separation of the diffraction grating. It is assumed in the following description that the diffraction order m1 of the first diffracted light M1 is +1, and the diffraction order m2 of the second diffracted light M2 is 0. That is, the first order component of the diffracted light is used for the first light beam ($\lambda$=405 nm), and the zeroth order component of the diffracted light is used for the second light beam ($\lambda$=650 nm).

As shown in FIG. 7(a), a parallel ray of the laser beam (first light beam L1) of 405 nm wavelength incident on the diffraction optical element 111 diffracts on the face of the diffraction grating 111a in a direction of the first order diffraction (converging direction), and then refracts in a diverging direction as it passes through the concave face 111c, and emerges from the diffraction optical element 111 as a parallel ray. Through the objective lens 12, the parallel ray focuses on the recording layer of the optical disk 14a having a 0.1 mm thick light transmissive layer. In this way, the optical pickup 100 attains desirable light focusing characteristics.

As shown in FIG. 7(b), a parallel ray of the laser beam (second light beam L2) of 650 nm wavelength incident on the diffraction optical element 111 refracts in the diverging direction as it passes through the concave face 111c, without being diffracted on the face of the diffraction grating 111a (zeroth order diffraction). The diffracted light then emerges from the diffraction optical element 111 as a diverging ray. Through the objective lens 12, the diverging ray focuses on the recording layer of the optical disk 14b having a 0.6 mm thick light transmissive layer. In this way, the optical pickup 100 attains desirable light focusing characteristics.

Here, the spherical aberration caused by the thickness of the light transmissive layer of the optical disk 14b can be suppressed when the diverging ray is incident on the objective lens 12. Spherical aberration that cannot be compensated for this way can be compensated for by the aspherical portion of the diffraction grating. Evidently, the convex face may be aspherical by design, so as to more effectively suppress aberration.

In order to prevent an outer rays other than those corresponding to the numerical aperture of 0.6 from focusing on the optical disk 14b having the light transmissive layer of 0.6 mm thick, the numerical aperture of the objective lens 12 is switched using the wavelength-selective filter that passes a wavelength of 405 nm but does not pass a wavelength of 650 nm.

In this Example, with the laser beam (first light beam L1; blue light) of 405 nm wavelength on the optical disk having the light transmissive layer of 0.1 mm thick, the RMS wavefront aberration is only 0.002$\lambda$, which is sufficiently small. A sufficiently small RMS wavefront aberration (0.002$\lambda$) is also obtained when the laser beam (second light beam L2; red light) of 650 nm wavelength is used for the optical disk having the light transmissive layer of 0.6 mm thick. This enables the optical pickup 100 to sufficiently read out information signals from the optical disks 14a and 14b.

The foregoing described the case where the diffraction grating 111a of the diffraction optical element is disposed to face the light source. However, the described effect can also be obtained according to this Example when the concave face 111c faces the light source. For example, the concave face 111c of the diffraction optical element 111 may be provided on the side of the diffraction optical element 111, as shown in FIG. 41(a) and FIG. 41(b).

Figure 41:
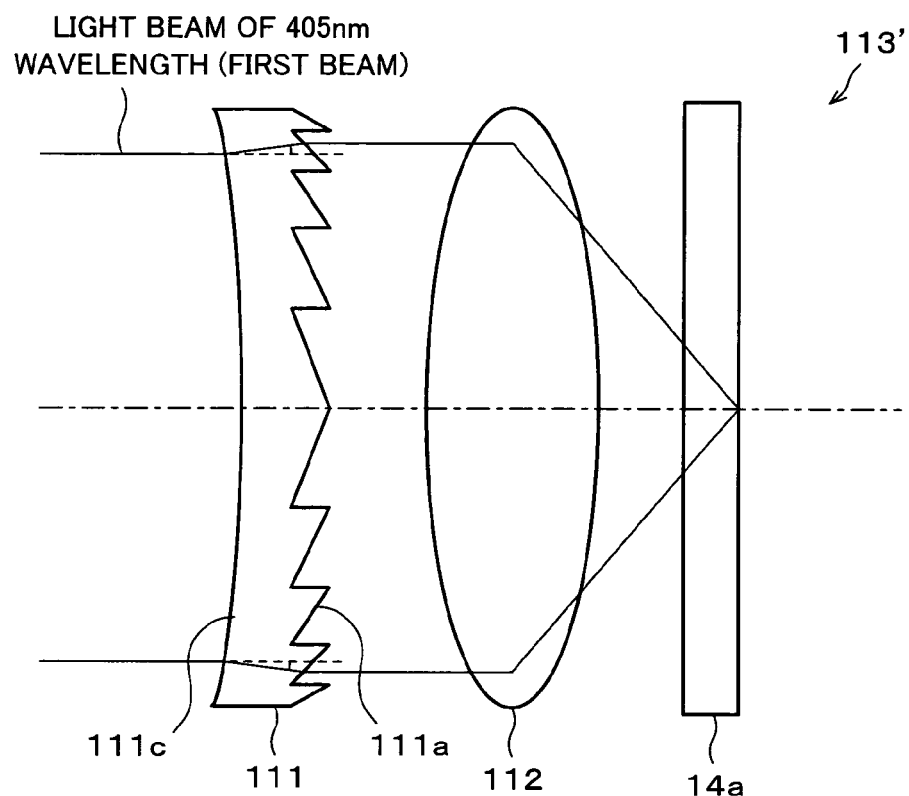
FIG. 41(a) is an explanatory drawing showing action of an objective lens unit with a diffraction optical element having a concave face on the side of a light source, when a first light beam is incident on the objective lens unit in the optical pickup of the present invention.
FIG. 41(b) is an explanatory drawing showing action of the objective lens unit in the optical pickup of FIG. 41(a), when a second light beam is incident on the objective lens unit.
Figure 41:
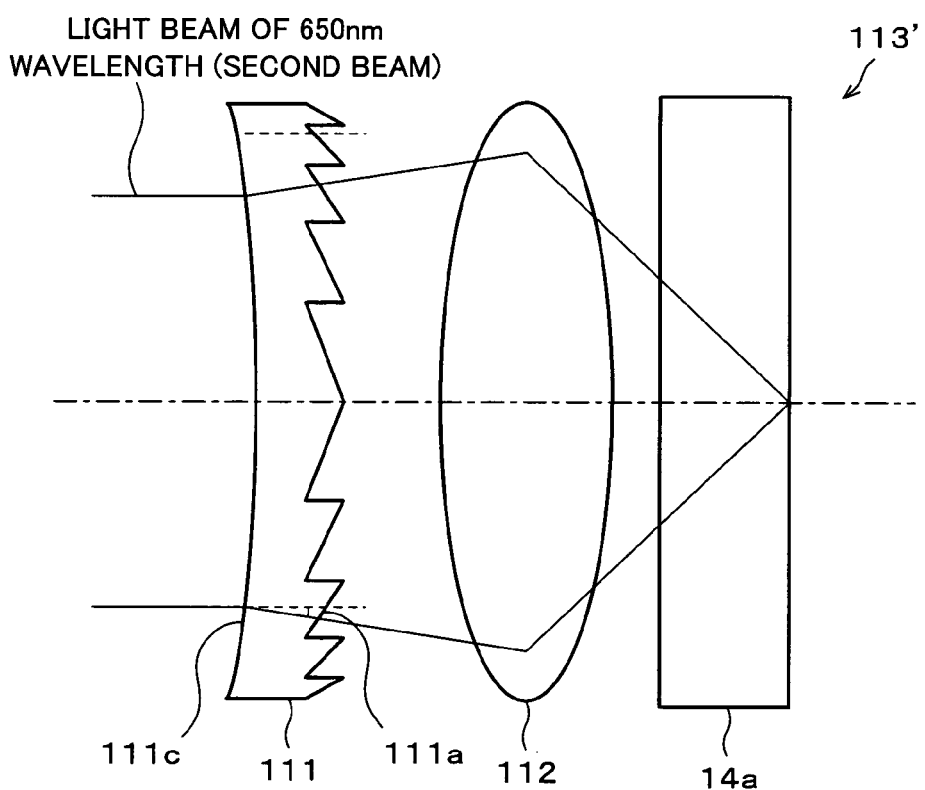

In this case, as shown in FIG. 41(a), a parallel ray of the laser beam (first light beam) of 405 nm wavelength incident on the diffraction optical element 111 diffracts on the face of the diffraction grating 111a in a direction of the first order diffraction (converging direction), and then refracts in a diverging direction as it passes through the concave face 111c, and emerges from the diffraction optical element 111 as a parallel ray. Through the objective lens 112, the parallel ray focuses on the recording layer of the optical disk 14a having a 0.1 mm thick light transmissive layer. In this way, the optical pickup 100 attains desirable light focusing characteristics.

As shown in FIG. 41(b), a parallel ray of the laser beam (second light beam) of 650 nm wavelength incident on the diffraction optical element 111 refracts in the diverging direction as it passes through the concave face 111c, without being diffracted on the face of the diffraction grating 111a (zeroth order diffraction). The second light beam then emerges from the diffraction optical element 111 as a diverging ray. Through the objective lens 112, the diverging ray focuses on the recording layer of the optical disk 14b having a 0.6 mm thick light transmissive layer. In this way, the optical pickup 100 attains desirable light focusing characteristics.

Here, the spherical aberration caused by the thickness of the light transmissive layer of the optical disk 14b can be suppressed to some extent when the diverging ray is incident on the objective lens 12. Spherical aberration that cannot be compensated for this way can be compensated for by the aspherical portion of the diffraction grating. Evidently, the convex face may be aspherical by design, so as to more effectively suppress aberration.

In order to prevent an outer rays other than those corresponding to the numerical aperture of 0.6 from focusing on the optical disk 14b having the light transmissive layer of 0.6 mm thick, the numerical aperture of the objective lens 112 is switched using the wavelength-selective filter that passes a wavelength of 405 nm but does not pass a wavelength of 650 nm.

Table 5 through Table 7 below show data that were obtained when the shape of the diffracting face of the diffraction optical element 111 and the curvature radius and aspherical portion of the refracting face of the diffraction optical element 11 were designed by an automated process. Specifically, the values in Tables 5 through Table 7 below are the result of calculation on spherical aberration in the next-generation high-density optical disk (wavelength of 405 nm, light transmissive layer of 0.1 mm thick) and DVD (wavelength of 650 nm, light transmissive layer of 0.6 mm thick). The objective lens used in Table 5 through Table 7 below is so designed that blue light is optimally focused on the optical disk with the light transmissive layer of 0.1 mm thick. Further, the concave face is made aspherical in order to compensate for the aberration that is caused when the light of 650 nm wavelength is incident on the light transmissive layer of the optical disk.

TABLE 5

| FACE NUMBER | CURVATURE RADIUS | FACE PITCH | MATERIAL |
|---|---|---|---|
| Next-Generation High-Density Optical Disk (First Optical Disk) | | | |
| DIFFRACTION OPTICAL ELEMENT 1 | INFINITY | 0.5 | BK7__ |
| 2 | 10.9 | 0.05 | SCHOTT |
| OBJECTIVE LENS 3 | 1.46 | 2.5 | LAH67__ |
| 4 | 20.52 | 0.23 | OHARA |
| DISK 5 | INFINITY | 0.1 | PC |
| 6 | INFINITY | 0.15 | |
| DVD (Second Optical Disk) | | | |
| DIFFRACTION OPTICAL ELEMENT 1 | INFINITY | 0.5 | BK7__ |
| 2 | 10.9 | 0.05 | SCHOTT |
| OBJECTIVE LENS 3 | 1.46 | 2.4 | LAH67__ |
| 4 | 20.52 | 0.23 | OHARA |
| DISK 5 | INFINITY | 0.6 | PC |
| 6 | INFINITY | 0.1 | |

TABLE 6

| | | SECOND FACE | FIFTH FACE | SIXTH FACE |
|---|---|---|---|---|
| CONE FACTOR (K) | | 2.68E+01 | −6.69E−01 | −1.01E+01 |
| ASPHERICAL FACTOR | A | −4.63E−03 | 1.38E−02 | 4.95E−01 |
| | B | 2.31E−03 | 4.04E−03 | −9.12E−01 |
| | C | −8.22E−04 | 3.55E−04 | 5.38E−01 |
| | D | 1.22E−05 | 2.98E−04 | −7.94E−02 |
| | E | 0.00E+00 | 9.33E−05 | 4.95E−01 |

TABLE 7

| | FIRST FACE |
|---|---|
| DF 1 | −3.56E−02 |
| DF 2 | 2.15E−03 |
| DF 3 | −2.38E−03 |
| DF 4 | 7.89E−04 |
| DF 5 | −5.17E−05 |

In Table 5 through Table 7, the face numbers 1 and 2 are the light incident face and light emerging face of the diffraction optical element 111, respectively. The face numbers 3 and 4 are the light incident face and light emerging face of the objective lens 23, respectively. The face numbers 5 and 6 are the surface and the information recording face of the optical disk. Note that, the face pitch in each row of the face number is the distance between the face of a given face number and the face of the next face number on the optical axis.

Indicated in Table 6 are aspherical factors for the respective faces.

In this Example (using the diffraction optical element 111 of Table 5 through Table 7), with the laser beam (blue light) of 405 nm wavelength on the optical disk having the light transmissive layer of 0.1 mm thick, the RMS wavefront aberration is only 0.002λ, which is sufficiently small. A sufficiently small RMS wavefront aberration (0.002λ) is also obtained when the laser beam (red light) of 650 nm wavelength is used for the optical disk having the light transmissive layer of 0.6 mm thick. This enables the optical pickup to sufficiently read out information signals from the optical disks 14a and 14b.

The diffraction optical element of the present Example includes the concave face on the side of the light source and the diffraction grating on the side of the objective lens. However, the effect of the present invention can still be obtained when the diffraction grating is provided on the side of the light source and the concave face is provided on the side of the objective lens.

The foregoing description in the Examples of the present invention was made based primarily on particular types of optical disks; namely, the next-generation high-density optical disk (light transmissive layer of 0.1 mm thick; using blue light (λ=405 nm)) and DVD (light transmissive layer of 0.6 mm thick; using red light (λ=650 nm)). However, the present invention is not just limited to these particular types of optical disks with particular thicknesses of the light transmissive layers, or particular wavelengths of light used therefor. The present invention is applicable to a wide variety of optical disks with light transmissive layers of different thicknesses or using different wavelengths of light.

As described, in one aspect of the invention, the present invention is a compatible optical pickup that uses a common objective lens to form a focused light spot on a first recording medium and a second recording medium, the first recording medium having a light transmissive layer of thickness t1 across the light incident face and the information recording face, and the first recording medium recording or reproducing information with a focused light spot that is formed using a first light source emitting a first light beam of a first wavelength and an objective lens with a numerical aperture NA1, the second recording medium having a light transmissive layer of thickness t2 (t2>t1) across the light incident face and the information recording face, and the second recording layer recording or reproducing information with a focused light spot that is formed using a second light source emitting a second light beam of a second wavelength longer than the first wavelength and using a portion of the objective lens corresponding to a numerical aperture NA2 (NA2<NA1). The optical pickup includes a diffraction element and a lens with a refractive index n, the diffraction element being disposed in an optical path between the first and second light sources and the objective lens, and the optical pickup uses such a combination of m1 and m2 that satisfy Equation (12) below.

$$f(d, m_1) = f(d, m_2) \tag{12}$$

where X is 1 or 2, and f(d, m) Equation (12) is a function given by Equation (13) below.

$$f(d, m_X) = \frac{(R - a\tan\alpha_X)\sqrt{C_X^2 + S_X^2}}{S_X - C_X \tan\alpha_X - \sqrt{C_X^2 - S_X^2} \tan\alpha_X} \tag{13}$$

$$C_X = n\cos\alpha_X - \cos\beta_X$$

$$S_X = n\sin\alpha_X - \sin\beta_X$$

$$\sin\alpha_X = \frac{m_X \lambda_X}{d},$$

where a is the distance between a face of the diffraction element and a peak of a lens face, R is the radius of the second light beam on a portion of the diffracting face corresponding to the numerical aperture NA2 of the objective lens, m1 is the diffraction order of the first light beam diffracted on the diffraction element, m2 is the diffraction order of the second light beam diffracted on the diffraction element, α1 and α2 are diffraction angles, β1 and β2 are the angle made by the optical axis and the light beam through the objective lens when the light beam forms a desirable focused light spot on the recording medium, and d is the pitch of the diffraction element within radius R.

In this way, by using the diffraction optical element that includes the diffraction grating and the lens so as to use diffraction orders satisfying the condition given by the foregoing equation, focused light spots can be formed to their diffraction limits on the recording media respectively having light transmissive layers of different thicknesses, even though the light sources with greatly different wavelengths, and the objective lens having a large numerical aperture are used. As a result, an optical pickup is provided that can record or reproduce information with respect to recording media respectively having light transmissive layers of different thicknesses and respectively using different optimum wavelengths of light.

Figure 8:
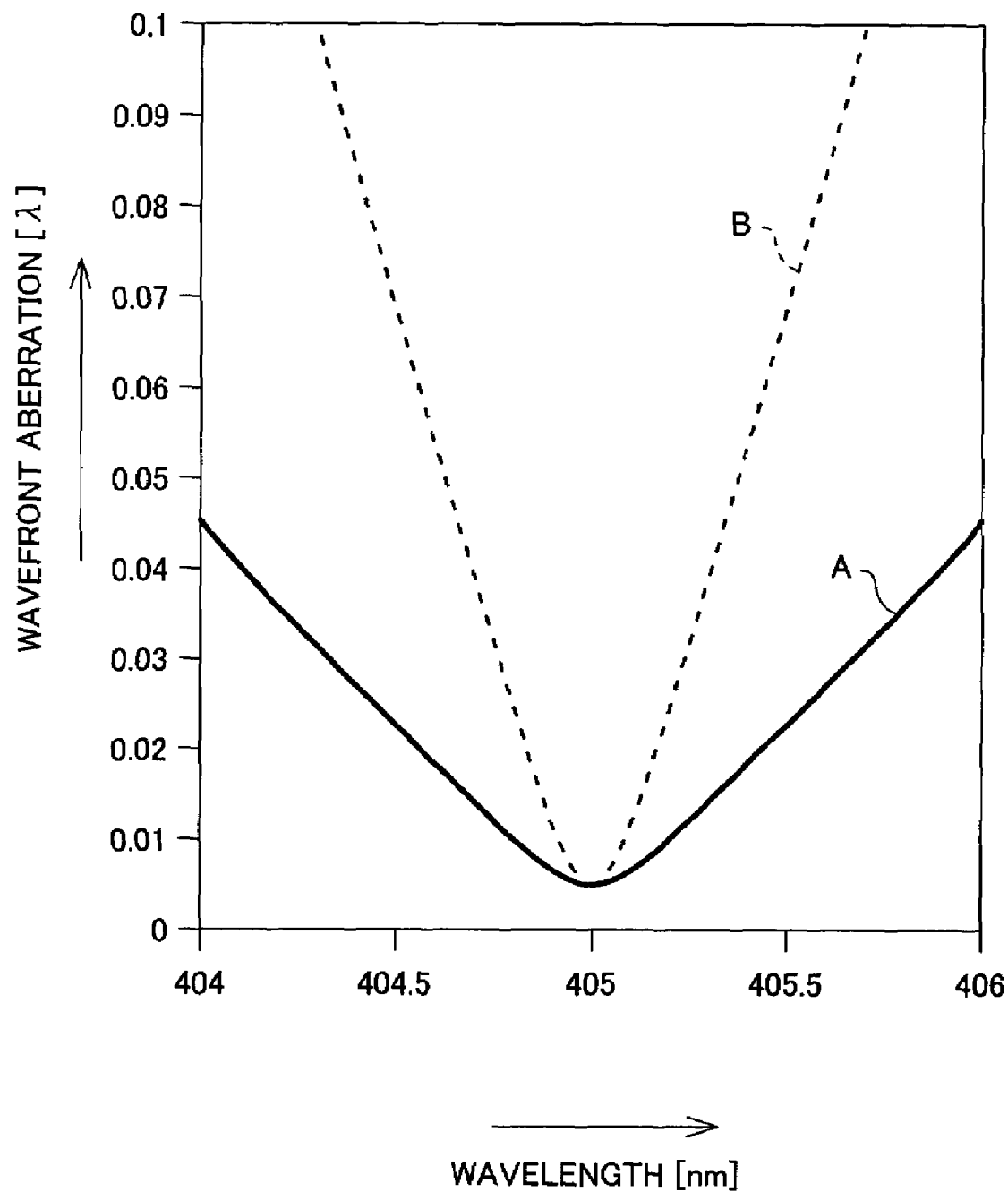
FIG. 8 is a graph representing wavelength dependency of wavelength aberration λrms, when the optical pickup of the embodiment is used to form a light spot on the information recording face of one of the recording media.

FIG. 8 represents wavelength dependency of wavefront aberration λrms in the optical pickup 100 of the described embodiment and in the optical pickup device of the foregoing conventional example, where the former is indicated by solid line A and the latter is indicated by broken line B. It should be noted here that the wavefront aberration λrms for each wavelength is the smallest wavefront aberration λrms that provides the best focusing with a given wavelength.

The wavefront aberration λrms gradually increases as the first wavelength λ1 of the first light beam increases or decreases from 405 nm. It can be seen from FIG. 8 that the rate of increase of the wavefront aberration λrms is smaller in the optical pickup 100 of the present embodiment than that in the optical pickup device of the conventional example. In can be seen from this that the optical pickup 100 of the present embodiment has lower wavelength dependency.

The first and second light sources 1a and 1b are realized by a semiconductor laser device as described above, and therefore cause wavelength fluctuations by mode hopping for example. Wavelength fluctuations also occur when there is high-frequency superimposition. Such wavelength fluctuations cause displacement of a focal point which cannot be tracked by the actuator driving the objective lens 12. The optical pickup 100 of the present embodiment generates less wavefront aberration than the optical pickup device of the conventional example in response to wavelength fluctuations caused by mode hopping or high-frequency superimposition. This suppresses displacement of a focal point due to wavelength fluctuations, thus desirably forming a light spot even in the presence of wavelength fluctuations.

Further, in the present Embodiment, displacement of a focal point due to wavelength fluctuations in the first light beam can also be suppressed even when the optical pickup is specifically designated for the next-generation high-density optical disk. That is, the foregoing effect is still effective even when the optical pickup is made with components that are designated only for the first light beam.

The first light beam that is emitted from the first optical system 16a as a parallel ray can emerge from the diffraction optical element 11 also as a parallel ray when the power Φ of the diffraction optical element 11 satisfies the following equation $$\Phi=\Phi_D+\Phi_L=0$$

where $\Phi_D$ is the power of the diffracting face of the diffraction grating 11a, and $\Phi_L$ is the power of the refracting face of the diffraction grating 11a. In this way, the aberration caused by misalignment with the objective lens 12 can be suppressed. In this case, the diffraction optical element 11 may be disposed anywhere between the first optical system 16a and the objective lens 12.

The present Embodiment adopts the diffraction optical element with the concave face on the side of the light source and the diffraction grating on the side of the objective lens. This is advantageous in terms of manufacture in increasing the pitch of the diffraction grating and the curvature of the concave face. However, not limiting thereto, the effects of the present invention remains the same even when the diffraction optical element has the diffraction grating on the side of the light source and the concave face on the side of the objective lens.

Figure 40:
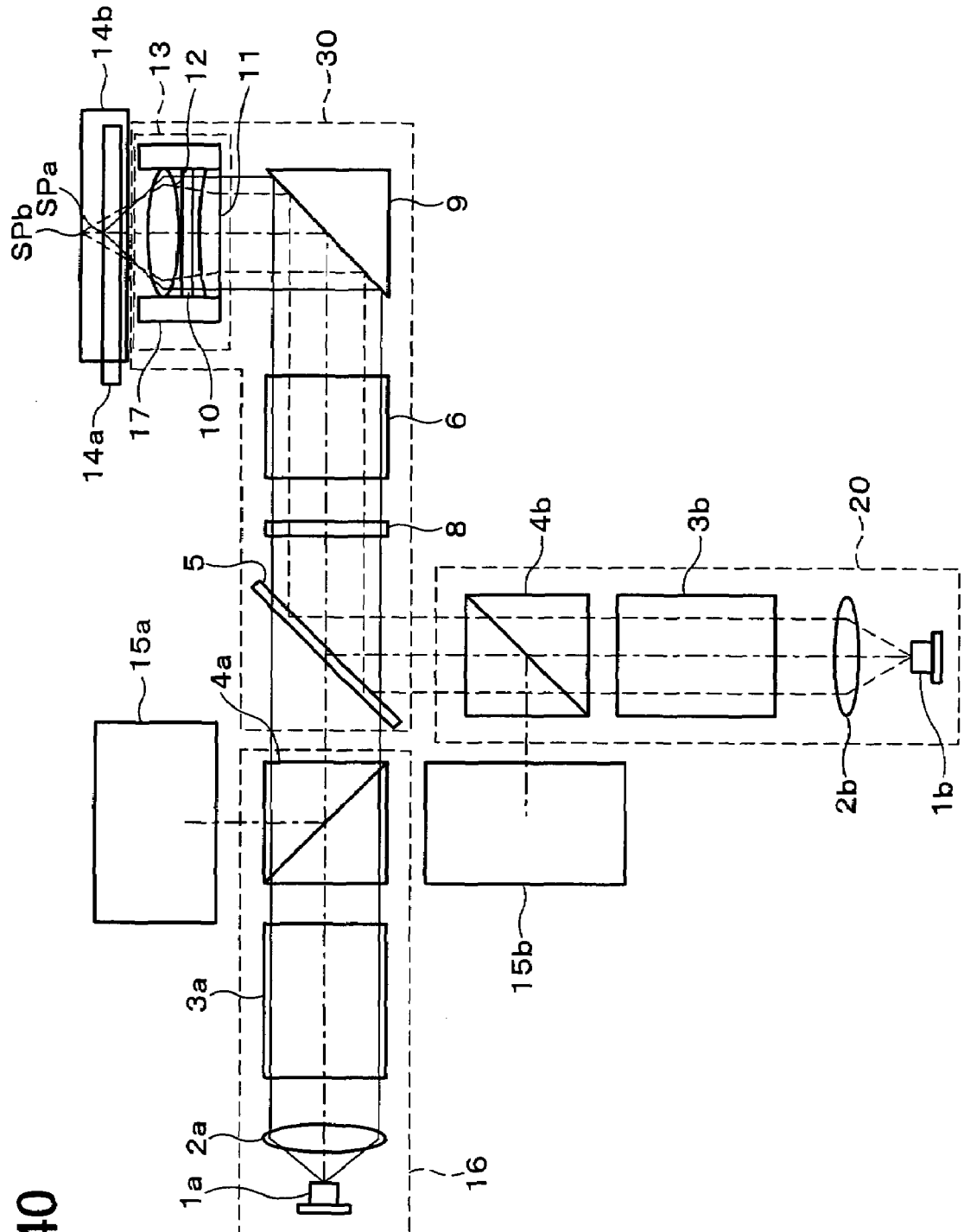
FIG. 40 is a schematic drawing showing another Example of the optical pickup of the present invention.

The optical pickup of the present embodiment as shown in FIG. 1 may be modified to provide an optical pickup as illustrated in FIG. 40. The optical pickup shown in FIG. 40 has the same structure as the optical pickup of FIG. 1, except that the ¼ wavelength plate 8 and the spherical aberration compensation system 6 are switched in position in the optical pickup, and that the diffraction optical element 11 and the wavelength-selective filter 10 are switched in position in the objective lens unit 13.

Second Embodiment

Figure 9:
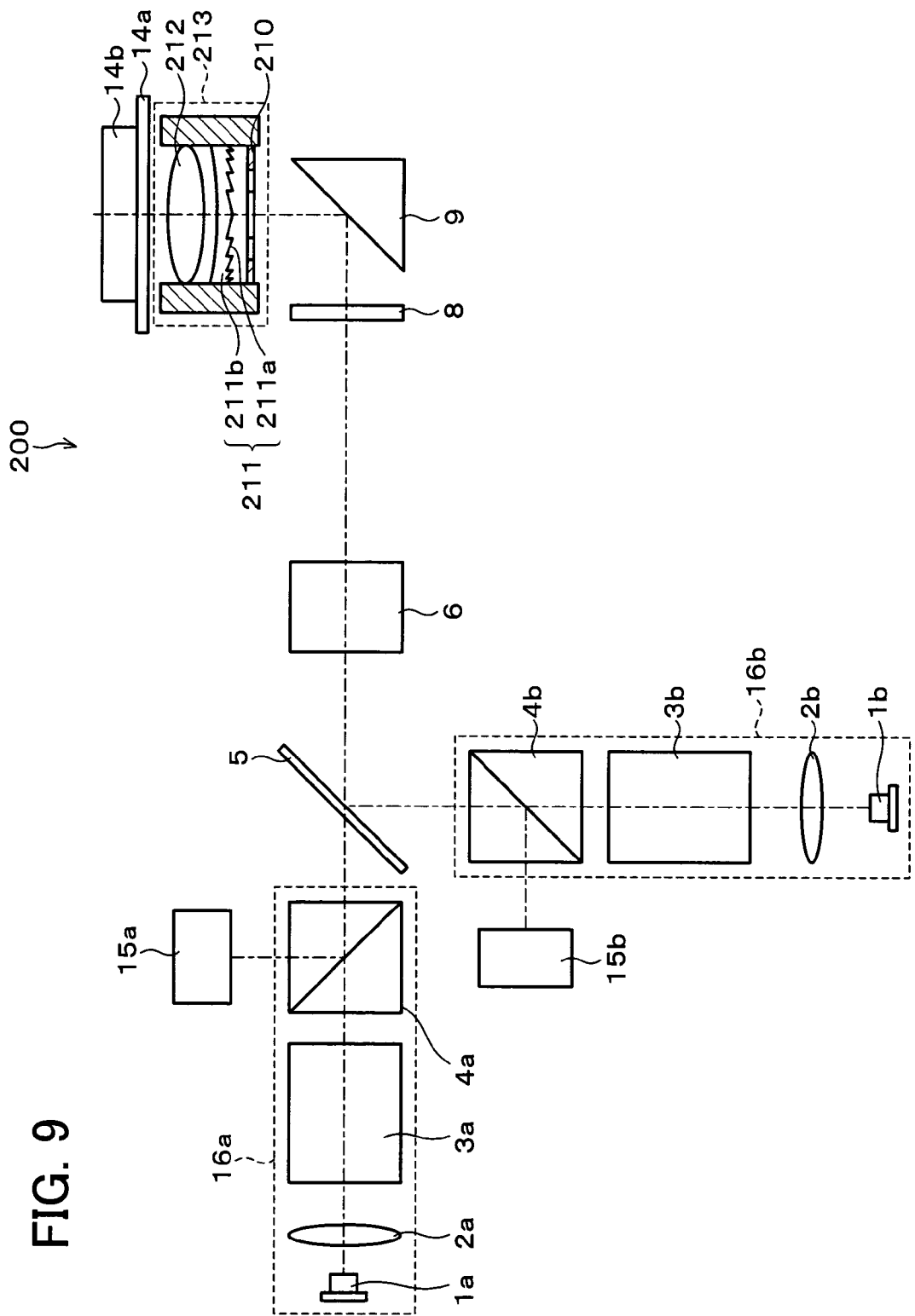
FIG. 9 is a schematic drawing showing a structure of an optical pickup according to one embodiment of the present invention.

FIG. 9 illustrates a schematic structure of an optical pickup 200 of the present embodiment. The description of the present embodiment will be given based on the optical pickup 200 that is compatible with a next-generation high-density optical disk 14a (first optical disk, first recording medium) and a conventional DVD 14b (second optical disk, second recording medium). The first optical disk uses blue light (first light beam) of a short wavelength in the vicinity of 405 nm (first wavelength λ1), and has a light transmissive layer with a thickness t1=0.1 mm. The second optical disk uses red light (second light beam) of a long wavelength in the vicinity of 650 nm (second wavelength λ2), and has a light transmissive layer with a thickness t2=0.6 mm. The optical pickup 200 includes a semiconductor laser 1a that emits the first light beam 1 of the first wavelength λ1, and a semiconductor laser 1b that emits the second light beam 2 of the second wavelength λ2 longer than λ1. The semiconductor laser 1a and semiconductor laser 1b are switched (turned on) according to the type of target optical disk.

The optical pickup 200 further includes collimator lenses 2a and 2b, shaping optical systems 3a and 3b, and beam splitters 4a and 4b. Through the collimator lenses 2a and 2b, the first and second light beams respectively emerged from the semiconductor lasers 1a and 1b become parallel rays. The shaping optical systems 3a and 3b, such as a shaping prism, shape an ellipsoidal intensity distribution of the first and second light beams into a substantially circular intensity distribution. The beam splitters 4a and 4b pass the first and second light beams from the shaping optical systems 3a and 3b.

The shaping optical systems 3a and 3b are realized by a known optical system, which may be a single triangular prism, a combined triangular prism, or two discrete triangular prisms. It should be noted that the shaping optical systems 3a and 3b are optional in the optical pickup 2.

The semiconductor laser 1a, the collimator lens 2a, the shaping optical system 3a, and the beam splitter 4a make up a first optical system 16a. The semiconductor laser 1b, the collimator lens 2b, the shaping optical system 3b, and the beam splitter 4b make up a second optical system 16b.

The first and second light beams respectively emerged from the first and second optical systems 16a and 16b enter a dichroic prism 5 where their optical axes merge. Leaving the dichroic prism 5, the first and second light beams travel through a common optical system.

In the common optical system, a spherical aberration compensation system 6 varies the extent to which the first and second light beams converge or diverge, according to the type of light beam (first light beam or second light beam). Then, the first and second light beams pass through a ¼-wavelength plate 8, and are reflected by a mirror 9 into an objective lens unit 213. Namely, the optical pickup 200 of the present embodiment includes the objective lens unit 213, as shown in FIG. 9, instead of the objective lens unit 13 or 113 of the First Embodiment.

Entering the objective lens unit 213, the first and second light beams travel through a wavelength-selective aperture filter 210, a diffraction optical element 211, and an objective lens 212 in this order, and form a small light spot on an information recording face of the first optical disk 14a or second optical disk 14b.

The spherical aberration compensation system 6, which is realized by a beam expander, is provided to compensate for spherical aberration caused by the thickness difference or other properties of the light transmissive layers of the first and second optical disks 14a and 14b. In addition, the spherical aberration compensation system 6 serves as light beam control means for controlling the extent to which the first and second light beams converge or diverge, as noted above.

In a configuration where the optical pickup 2 does not include the shaping optical systems 3a and 3b, the spherical aberration compensation system 6 may not be provided. In this case, the collimator lenses 2a and 2b may be used to vary the extent of convergence or divergence of the first and second light beams. Further, any other element may be used to vary the extent of convergence or divergence of the first and second light beams.

The wavelength-selective aperture filter 210 controls aperture so that a numerical aperture NA1 (0.85 to be specific) and a numerical aperture NA2 (0.6 to be specific) are obtained for the light beams of the first and second wavelengths λ1 and λ2, respectively. Note that, the wavelength-selective aperture filter 210, which is provided between the mirror 9 and the diffraction optical element 211 in this embodiment, may be disposed in any other position, provided that the wavelength-selective aperture filter 210 is operative as an integral unit with the diffraction optical element 211 and the objective lens 212. Further, the wavelength-selective aperture filter 210 may be realized by any other member, provided that it serves to control aperture.

The wavelength-selective aperture filter 210, the diffraction optical element 211, and the objective lens 212 are integrally provided as the objective lens unit 213. The objective lens unit 213 as an integral unit is movable relative to other optical systems of the optical pickup 200. In this way, a focused light spot can accurately follow the oscillations of the information recording face of the first and second optical disks or rotation eccentricity of the information track of the first and second optical disks.

In addition to the foregoing light projecting optical system, the optical pickup 200 further includes reproduced signal detecting optical systems 15a and 15b. The reproduced signal detecting optical systems 15a and 15b are realized by a known optical system, and serve to reproduce a light spot control signal for auto focusing or tracking, or an information signal recorded in the optical disk.

The diffraction optical element 211 is made with a converging diffraction grating 211a and a diverging planoconcave lens 211b, so as to suppress the wavefront aberration caused by wavelength fluctuations and obtain desirable light focusing characteristics against wavelength fluctuations.

The diffraction optical element 211 is made by forming the diffraction grating 211a on a plane face of the planoconcave lens 211b, so that the number of components can be reduced. Alternatively, the diffraction optical element 11 may be composed of two optical elements made up of a diffraction element and a lens.

Further, the objective lens unit 213 may be realized using diffraction optical element 211 that includes a diffraction grating on the refracting face of a translucent lens on the other side of the plane face.

The planoconcave lens 211b of the diffraction optical element 211 is made of glass or plastic. The diffraction grating 211a of the diffraction optical element 211 is formed on the plane face of the planoconcave lens 211b by forming concentrically grooved rings around the optical axis, or by forming raised orbicular bands around the optical axis by photolithography. The diffraction grating 211a is formed so that the cross section that cuts across the plane including the optical axis is blazed (serrated) or stepped. The diffraction grating with the serrated or stepped cross section (serrated one in particular) is advantageous over other types of diffraction gratings because it offers higher diffraction efficiency.

It should be appreciated that the same effect can be obtained when the diffraction optical element 211 has the diffraction grating 211a on the concave face of the planoconcave lens 211b. In this case, alignment of the concave face with the diffraction grating becomes easier, which helps to form the concave face and the diffraction grating more easily.

The diffraction orders of the light diffracted on the diffraction grating 211a of the diffraction optical element 211 are selected for optimum efficiency, such that the optical pickup 200 records and reproduce information using the second order component of the diffracted light for the first light beam (λ=405 nm), and the first order component of the diffracted light for the second light beam (λ=650 nm).

The optical pickup 200 causes at least one of the first and second light beams to enter the diffraction optical element 211 as a converging ray or diverging ray, i.e., a non-parallel ray. That is, the first and second light beams enter the diffraction optical element 211 at different converging or diverging angles. This attains a diffraction angle difference of about 0.5° to about 1.5° between the first and second light beams, which is necessary for the compensation of the spherical aberration caused by the large thickness difference between the respective light transmissive layers. As a result, the pitch of the diffraction grating can be made wider, and the curvature radius of the concave face can be made greater, enabling the diffraction optical element 211 to be fabricated more easily.

As the term is used herein, the "converging or diverging angle" is the angle made by the optical axis and the outermost edge of the light beam on a cross sectional plane including the optical axis of the light beam. The converging or diverging angle is negative for a converging ray, and is positive for a diverging ray.

Incidentally, as shown in FIG. 42(a), an objective lens unit 120' may be realized with a diffraction optical element 122' that includes a diffraction grating 122b' on a refracting face (concave face) S2 of a translucent planoconcave lens 122a' on the other side of a plane face S1.

The planoconcave lens 122a' of the diffraction optical element 122' is made of glass or plastic. The diffraction grating 122b' of the diffraction optical element 122' is formed on the plane face S1 of the planoconcave lens 122a' by forming concentrically grooved rings around the optical axis, or by forming raised orbicular bands around the optical axis by photolithography. The diffraction grating 122b' should preferably be formed, as shown in FIG. 3, that the cross section that cuts across the plane including the optical axis is blazed (serrated). The diffraction grating with the serrated cross section is advantageous over other types of diffraction gratings because it offers higher diffraction efficiency. Alternatively, an objective lens unit 120" may be formed that includes a diffraction grating 122b" so that the cross section that cuts across the plane including the optical axis is stepped, as shown in FIG. 42(b). The diffraction grating 122b" with the stepped cross section is advantageous over other types of diffraction gratings because it offers higher diffraction efficiency next to the diffraction grating 122b' with the serrated cross section.

It should be noted that the effect of the diffraction optical element 122" shown in FIG. 42(b) remains the same even when the diffraction grating 122b" is formed on the concave face S2 of the planoconcave lens 122a" in the manner shown in FIG. 42(a). In this case, the concave face S2 and the diffraction grating 122b" can be aligned more easily, making it easier to form the concave face S2 and the diffraction grating 122b".

The following describes Examples of the optical pickup 200 according to the present embodiment.

EXAMPLE 3

Figure 10:
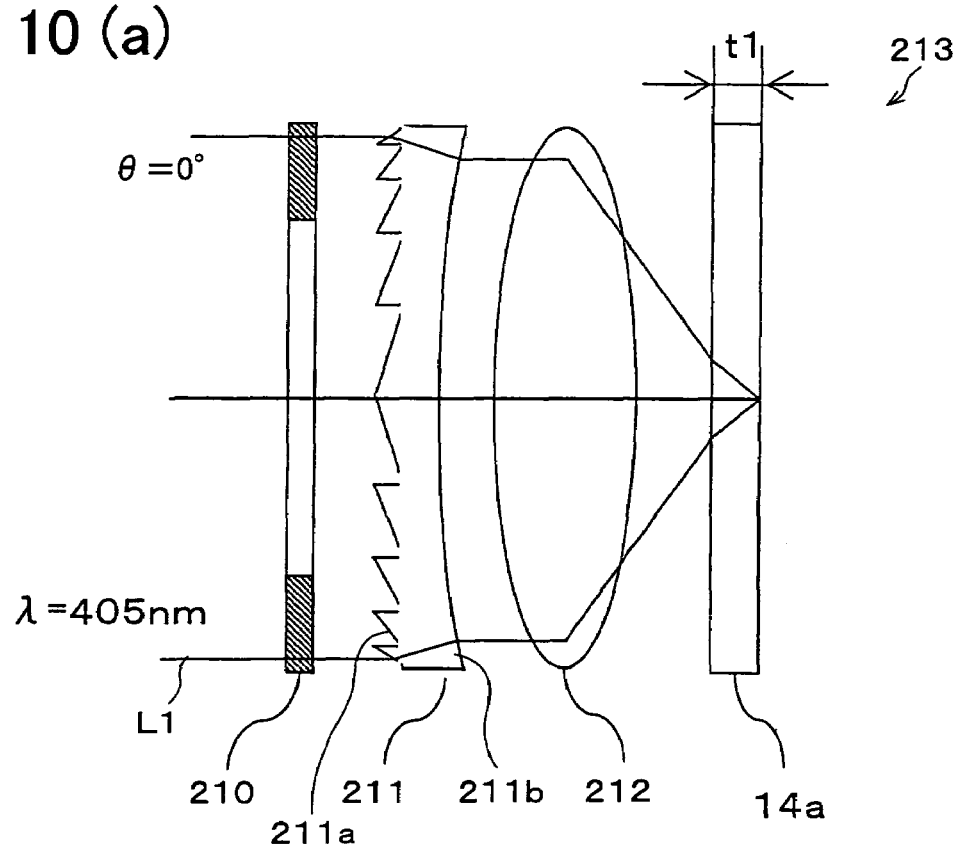
Figure 10:
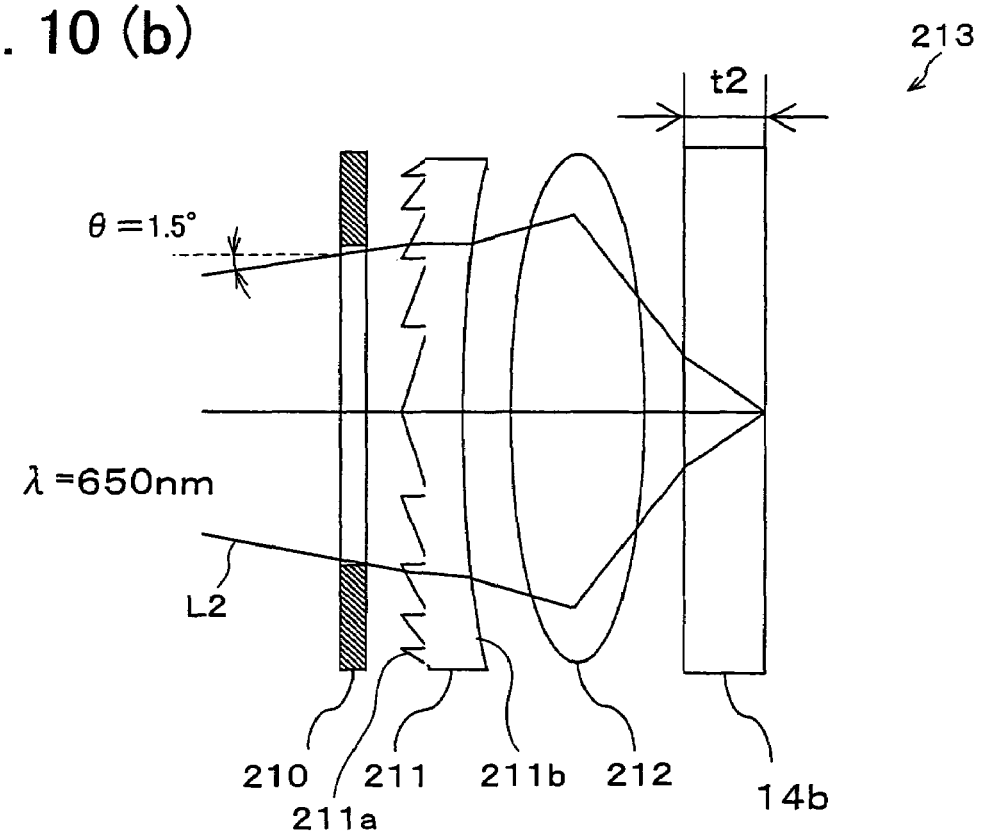

In this example, as shown in FIG. 10(a) and FIG. 10(b), an objective lens unit 213 is prepared so that a first light beam L1 ($\lambda$=405 nm) enters the objective lens unit 213 as a parallel ray (i.e. at a converging or diverging angle $\theta$ of 0°) and the objective lens unit 213 uses the second order component of the light diffracted by a diffraction optical element 211, and that a second light beam L2 ($\lambda$=650 nm) enters the objective lens unit 213 as a diverging ray (i.e., at a converging or diverging angle $\theta$ of 1.5°) and the objective lens unit 213 uses the first order component of the light diffracted by the diffraction optical element 211. An aspherical lens is adopted for an objective lens 12. The diffraction optical element 211 has a concave face that is also aspherical.

When the first light beam enters the diffraction optical element 211 as a parallel ray, the light diffracted in the second order diffraction direction (in the converging direction with respect to the optical axis) by a diffraction grating 211a of the diffraction optical element 211 is refracted in the diverging direction by a planoconcave lens of the diffraction optical element 211 and enters the objective lens 212 as a parallel ray. The diffracted light is then focused by the objective lens 212, passes through a light transmissive layer (thickness of 0.1 mm), and forms a small light spot on an information recording face, thereby obtaining a desirable light focusing characteristic.

When the second light beam L2 enters the diffraction optical element 211 as an diverging ray, the light diffracted in the first order diffraction direction (in the converging direction with respect to the optical axis) by the diffraction grating 211a of the diffraction optical element 211 is refracted in the diverging direction by the planoconcave lens 211b of the diffraction optical element 211 and enters the objective lens 212 as a diverging ray. The diffracted light is then focused by the objective lens 212, passes through a light transmissive layer (thickness of 0.6 mm), and forms a small light spot on the information recording face, thereby obtaining a desirable light focusing characteristic.

By thus causing the first light beam L1 and the second light beam L2 to enter the diffraction optical element 211 as a parallel ray and a diverging ray, respectively, the diffraction grating 211a and the planoconcave lens 211b can be designed to have a pitch and a concave face that satisfy a converging or diverging angle $\theta$ of 0° for the second order component of the diffracted light for the first light beam L1 entering the objective lens 212, and a converging or diverging angle $\theta$ of 2° to 3° for the first order component of the diffracted light for the second light beam L2 entering the objective lens 212 (i.e., a diffraction angle difference of 2° to 3° is achieved between the second order component of the diffracted light for the first light beam L1 and the first order component of the diffracted light for the second light beam L2).

Table 8 through Table 11 below show data concerning the respective faces of the objective lens 212 and diffraction optical element 211 so designed. In the Tables, the face number 0 indicates a virtual light source. The face numbers 1 and 2 are the light incident face and light emerging face of the diffraction optical element 211, respectively. The face numbers 3 and 4 are the light incident face and light emerging face of the objective lens 212, respectively. The face numbers 5 and 6 are the surface and the information recording face of the optical disk. Note that, the face pitch in each row of the face number is the distance between the face of a given face number and the face of the next face number on the optical axis.

Table 10 indicates aspherical factors for the respective faces, and Table 11 indicates the factor for each term of Equation (14) representing a phase difference function $\Phi(r)$ for the diffracting face. In Equation (14), m is the diffraction order, $\lambda$ is the wavelength, r is the distance from the optical axis, and DF1 through DF5 are factors. Further, in Tables 10 and 11, −2.2E-03 denotes $-2.2^{-3}$. The same notation is used throughout the Tables.

TABLE 8

NEXT-GENERATION HIGH-DENSITY OPTICAL DISK (FIRST OPTICAL DISK)

|  | FACE NUMBER | CURVATURE RADIUS | FACE PITCH | MATERIAL |
|---|---|---|---|---|
| VIRTUAL LIGHT SOURCE | 0 | INFINITY | INFINITY |  |
| DIFFRACTION OPTICAL ELEMENT | 1 | INFINITY | 0.5 | BK7_ |
|  | 2 | 8.319 | 0.5 | SCHOTT |
| OBJECTIVE LENS | 3 | 1.465 | 2.5 | LAH67_ |
|  | 4 | 20.516 | 0.1 | OHARA |
| DISK | 5 | INFINITY | 0.1 | PC |
|  | 6 | INFINITY | 0.23 |  |

TABLE 9

DVD (SECOND OPTICAL DISK)

|  | FACE NUMBER | CURVATURE RADIUS | FACE PITCH | MATERIAL |
|---|---|---|---|---|
| VIRTUAL LIGHT SOURCE | 0 | INFINITY | 50 |  |

TABLE 9-continued

DVD (SECOND OPTICAL DISK)

| | FACE NUMBER | CURVATURE RADIUS | FACE PITCH | MATERIAL |
|---|---|---|---|---|
| DIFFRACTION OPTICAL ELEMENT | 1 | INFINITY | 0.5 | BK7_ |
| | 2 | 8.319 | 0.5 | SCHOTT |
| OBJECTIVE LENS | 3 | 1.465 | 2.5 | LAH67_ |
| | 4 | 20.516 | 0.1 | OHARA |
| DISK | 5 | INFINITY | 0.6 | PC |
| | 6 | INFINITY | 0.10 | |

TABLE 10

| | FACE NUMBER | K | A | B | C | D | E |
|---|---|---|---|---|---|---|---|
| ASPHERICAL FACTOR | 2 | 0.0E+00 | −2.2E−03 | −2.3E−03 | −1.4E−04 | 1.4E−04 | 0.0E+00 |
| | 4 | −6.9E−01 | 1.3E−02 | 3.1E−03 | 2.6E−05 | 5.2E−04 | −6.7E−05 |
| | 5 | 7.2E+02 | 4.5E−01 | −1.2E+00 | 1.5E+00 | −9.4E−01 | 5.0E−01 |

TABLE 11

| | FACE NUMBER | DF1 | DF2 | DF3 | DF4 | DF5 |
|---|---|---|---|---|---|---|
| PHASE DIFFERENCE FACTOR | 1 | −3.E−02 | 6.E−04 | 8.E−04 | 6.E−05 | −5.E−05 |

[Equation 14]

$$\Phi(r) = m\frac{2\pi}{\lambda}(DF1r^2 + DF2r^4 + DF3r^6 + DF4r^8 + DF5r^{10}) \quad (14)$$

Figure 11:
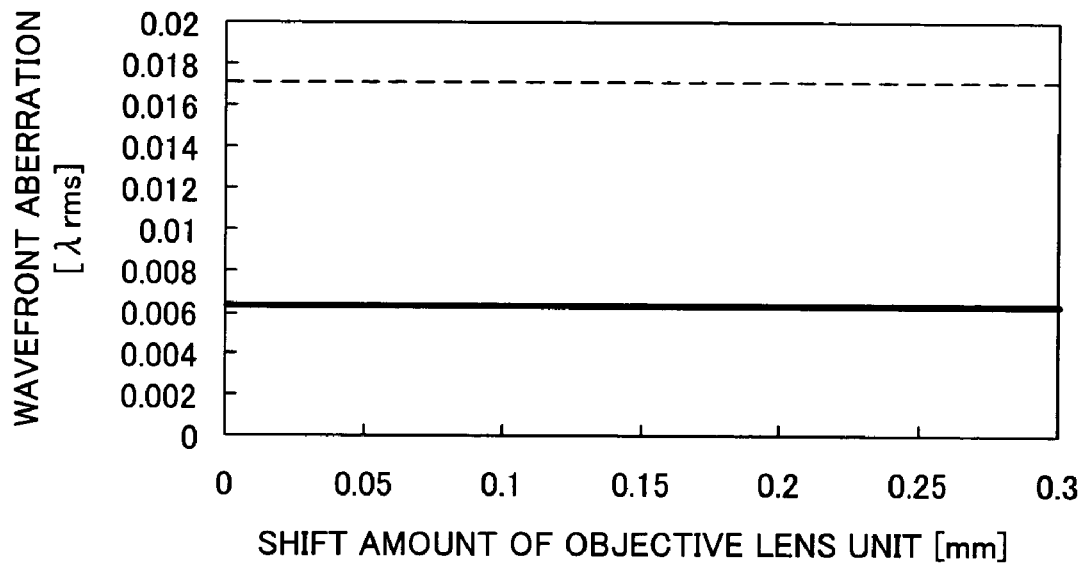
Figure 11:
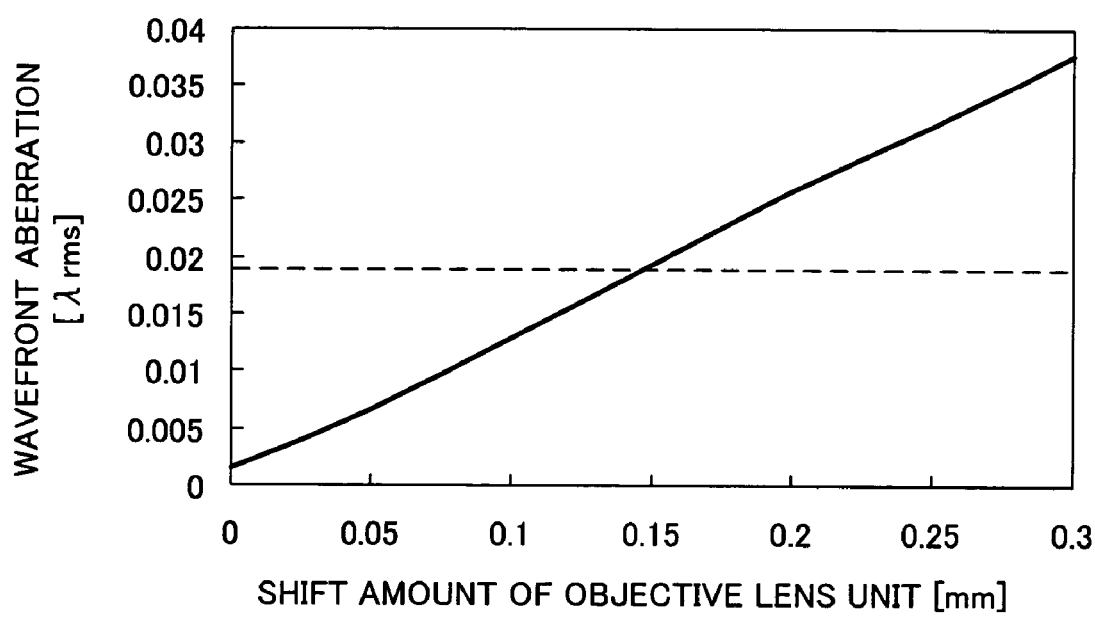

FIG. 11(a) and FIG. 11(b) show changes in wavefront aberration λrms on an image surface with respect to an amount of shift of the objective lens unit 213 in the optical axis direction, as indicated by solid line, when the light is focused on the optical disk using an optical pickup 200 prepared in this Example. In addition, FIG. 11(a) and FIG. 11(b) show changes in wavefront aberration λrms on an image surface with respect to an amount of shift of the objective lens unit 213 in the optical axis direction, as indicated by broken line, when the light is focused on the optical disk using a conventional optical pickup prepared for comparison. Note that, FIG. 11(a) is the result when the light was focused on the first optical disk, and FIG. 11(b) is the result when the light was focused on the second optical disk.

The conventional optical pickup for comparison was prepared so that wavefront aberration is optimized when both the first and second light beams are incident on the objective lens unit as parallel rays, and when the second order component of the diffracted light is used for the first light beam and the first order component of the diffracted light is used for the second light beam.

As can be seen from FIG. 11(a), the optical pickup 200 can reduce the wavefront aberration for the first optical disk more effectively than the conventional optical pickup, thus forming a desirable focused light spot.

As can be seen from FIG. 11(b), if the amount of shift of the objective lens unit 213 is not more than 0.15 mm, the optical pickup 200 can reduce the wavefront aberration that is caused on the second optical disk by the shifting of the objective lens unit 213 when the second light beam L2 is incident on the objective lens unit 213 as a diverging ray, more effectively than the conventional optical pickup.

That is, the optical pickup 200 can reduce wavefront aberration for the first and second optical disks more effectively than the conventional optical pickup.

Figure 12:
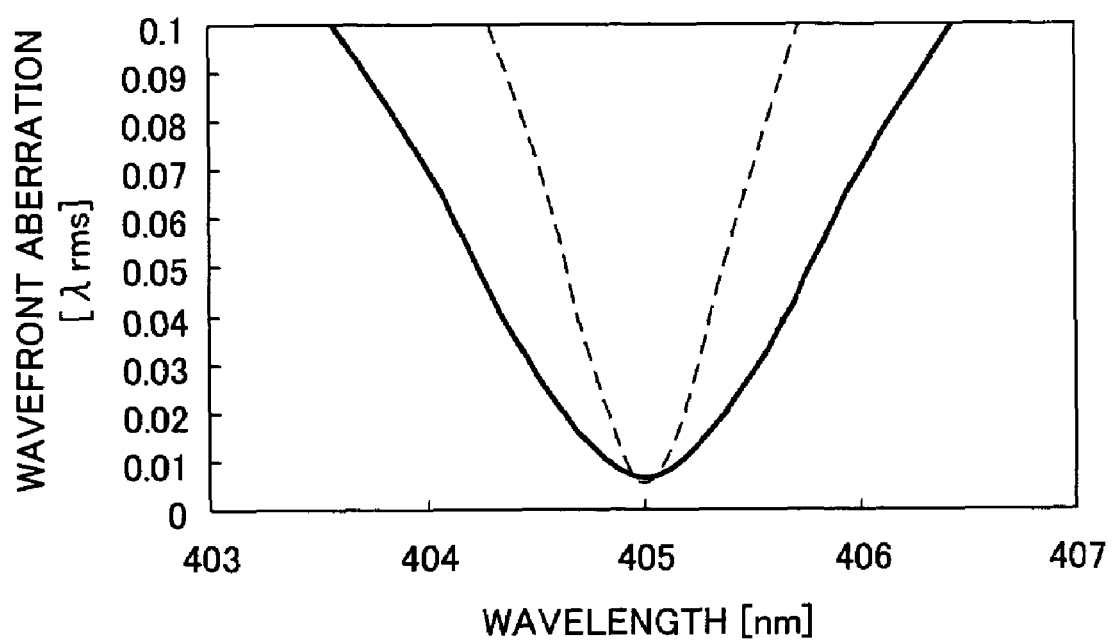
FIG. 12 is a graph representing changes in wavefront aberration as a function of a wavelength of the first light beam when the objective lens unit of FIG. 10(a) and FIG. 10(b) focuses the first light beam on the first optical disk.

Moreover, FIG. 12 shows changes in wavefront aberration λrms with respect to changes in wavelength of the first light beam, as indicated by solid line, when the light was focused on the first optical disk using the optical pickup 200 prepared in this Example. In addition, FIG. 12 shows changes in wavefront aberration λrms with respect to changes in wavelength of the first light beam L1 using a comparative optical pickup specifically designated for the first optical disk.

The comparative optical pickup designated for the first optical disk is realized by an objective lens unit which is solely composed of the objective lens 212 (objective lens designated for the first light beam) used for the optical pickup 200 of this Example.

As can be seen from FIG. 12, the optical pickup 200 has a broader range of available wavelengths than the optical pickup designated for the first optical disk. This is because the diffraction optical element 211 of the optical pickup 200 is realized by the converging diffraction grating and the planoconcave lens. This makes it possible to improve wavelength dependency characteristic, as compared with the case of using the objective lens specifically designated for the first light beam. Therefore, the optical pickup 200 can form a desirable focused light spot even in the presence of wavelength fluctuations caused by mode hopping or the like.

EXAMPLE 4

Figure 13:
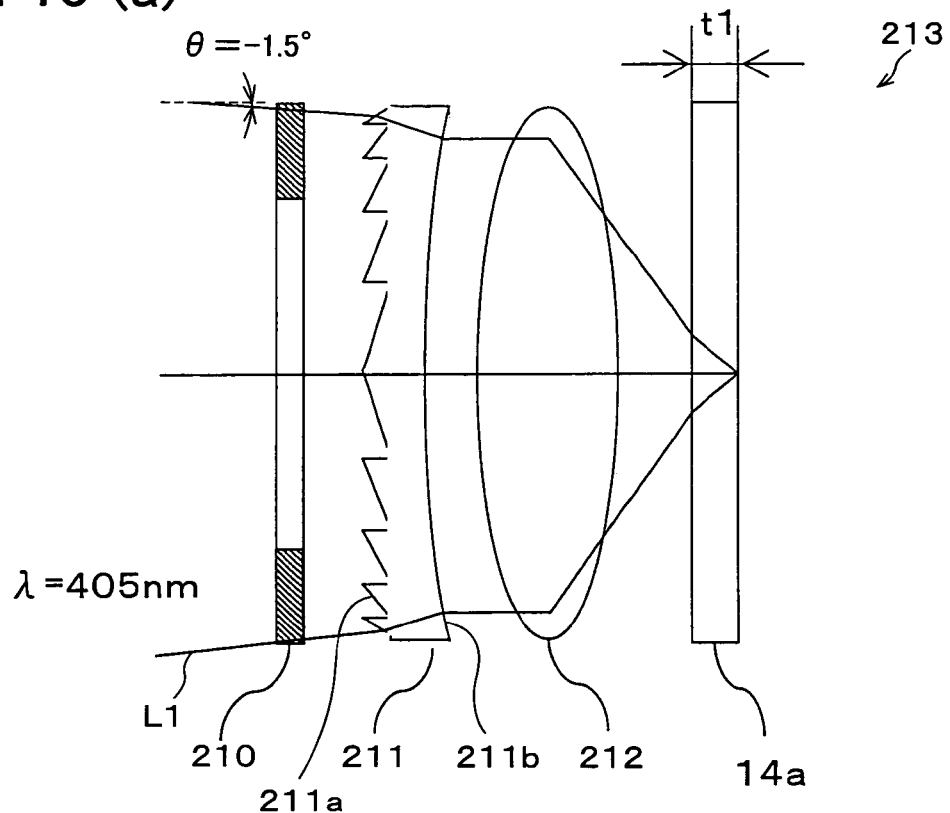
Figure 13:
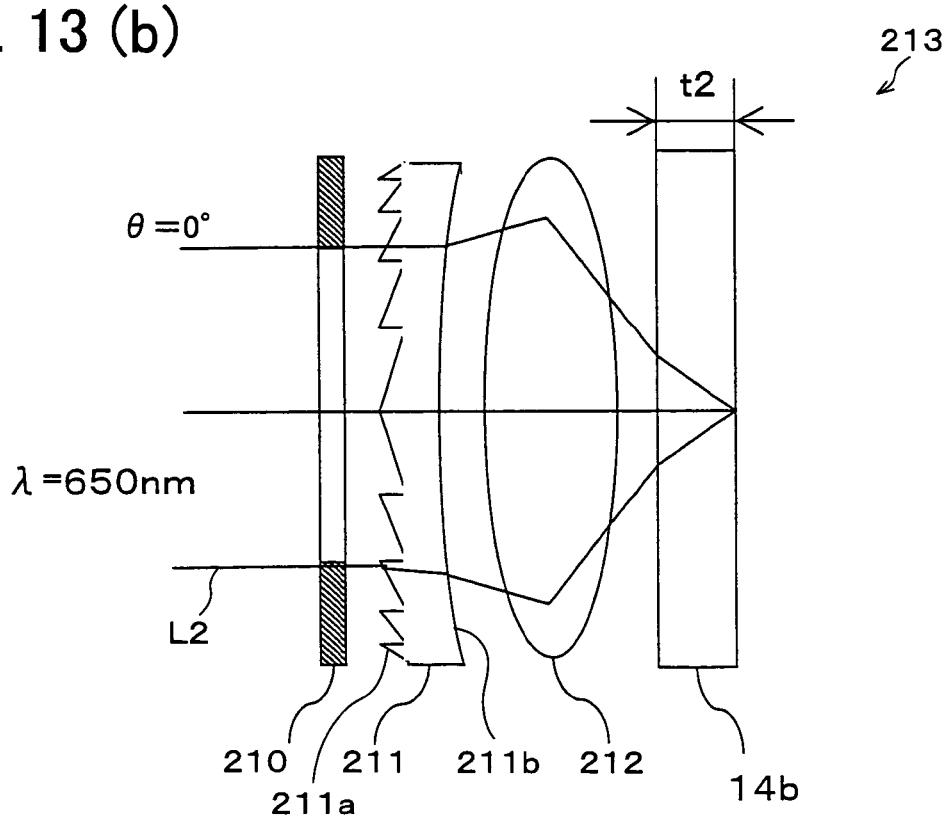

In this example, as shown in FIG. 13(a) and FIG. 13(b), an objective lens unit 213 is prepared so that a first light beam L1 (λ=405 nm) enters the objective lens unit 213 as a converging ray (i.e. at a converging or diverging angle θ of −1.5°) and the objective lens unit 213 uses the second order component of the light diffracted by a diffraction optical element 211, and that a second light beam L2 (λ2=650 nm) enters the objective lens unit 213 as a parallel ray (i.e., at a converging or diverging angle θ of 0°) and the objective lens unit 213 uses the first order component of the light diffracted by the diffraction optical element 211. An aspherical lens is adopted for an objective lens 212. The diffraction optical element 211 has a concave face that is also aspherical.

When the first light beam L1 enters the diffraction optical element 211 as a converging ray, the light diffracted in the second order diffraction direction (in the converging direction with respect to the optical axis) by a diffraction grating 211a of the diffraction optical element 211 refracts in the diverging direction on a planoconcave lens 211b of the diffraction optical element 211 and enters the objective lens 212 as a parallel ray. The diffracted light is then focused by the objective lens 212, passes through a light transmissive layer (thickness of 0.1 mm), and forms a small light spot on an information recording face, thereby obtaining a desirable light focusing characteristic.

When the second light beam L2 enters the diffraction optical element 211 as a parallel ray, the light diffracted in the first order diffraction direction (in the converging direction with respect to the optical axis) by the diffraction grating 211a of the diffraction optical element 211 refracts in the diverging direction on the planoconcave lens 211b of the diffraction optical element 211 and enters the objective lens 212 as a diverging ray. The diffracted light is then focused by the objective lens 212, passes through a light transmissive layer (thickness of 0.6 mm), and forms a small light spot on the information recording face, thereby obtaining a desirable light focusing characteristic.

By thus causing the first light L1 beam and the second light beam L2 to enter the diffraction optical element 211 as a converging ray and a parallel ray, respectively, the diffraction grating 211a and the planoconcave lens 211b can be designed to have a pitch and a concave face that satisfy a converging or diverging angle θ of 0° for the second order component of the diffracted light for the first light beam L1 entering the objective lens 212, and a converging or diverging angle θ of 2° to 3° for the first order component of the diffracted light for the second light beam L2 entering the objective lens 212 (i.e., a diffraction angle difference of 2° to 3° is achieved between the second order component of the diffracted light for the first light beam L1 and the first order component of the diffracted light for the second light beam L2).

Table 12 through Table 15 below show data concerning the respective faces of the objective lens 212 and diffraction optical element 211 so designed. Note that, the same symbols, numbers, and the like are used in Table 12 through Table 15 as in Tables 8 through Table 1.

TABLE 12

NEXT-GENERATION HIGH-DENSITY OPTICAL DISK (FIRST OPTICAL DISK)

| | FACE NUMBER | CURVATURE RADIUS | FACE PITCH | MATERIAL |
|---|---|---|---|---|
| VIRTUAL LIGHT SOURCE | 0 | INFINITY | −50 | |
| DIFFRACTION OPTICAL ELEMENT | 1 | INFINITY | 0.5 | BK7_ |
| | 2 | 3.620 | 0.5 | SCHOTT |
| OBJECTIVE LENS | 3 | 1.465 | 2.5 | LAH67_ |
| | 4 | 20.516 | 0.1 | OHARA |
| DISK | 5 | INFINITY | 0.1 | PC |
| | 6 | INFINITY | 0.23 | |

TABLE 13

DVD (SECOND OPTICAL DISK)

| | FACE NUMBER | CURVATURE RADIUS | FACE PITCH | MATERIAL |
|---|---|---|---|---|
| VIRTUAL LIGHT SOURCE | 0 | INFINITY | INFINITY | |
| DIFFRACTION OPTICAL ELEMENT | 1 | INFINITY | 0.5 | BK7_ |
| | 2 | 3.620 | 0.5 | SCHOTT |
| OBJECTIVE LENS | 3 | 1.465 | 2.5 | LAH67_ |
| | 4 | 20.516 | 0.1 | OHARA |
| DISK | 5 | INFINITY | 0.6 | PC |
| | 6 | INFINITY | 0.10 | |

TABLE 14

| | FACE NUMBER | K | A | B | C | D | E |
|---|---|---|---|---|---|---|---|
| ASPHERICAL FACTOR | 2 | 2.68E+01 | −4.63E−03 | 2.31E−03 | −8.22E−04 | 1.22E−05 | 0.00E+00 |
| | 4 | −6.86E−01 | 1.33E−02 | 3.12E−03 | 2.57E−05 | 5.16E−04 | −6.70E−05 |
| | 5 | 7.22E+02 | 4.51E−01 | −1.23E+00 | 1.51E+00 | −9.37E−01 | 4.95E−01 |

TABLE 15

| | FACE NUMBER | DF1 | DF2 | DF3 | DF4 | DF5 |
|---|---|---|---|---|---|---|
| PHASE DIFFERENCE FACTOR | 1 | −5.30E−03 | −4.02E−04 | −1.17E−05 | 0.00E+00 | 0.00E+00 |

Figure 14:
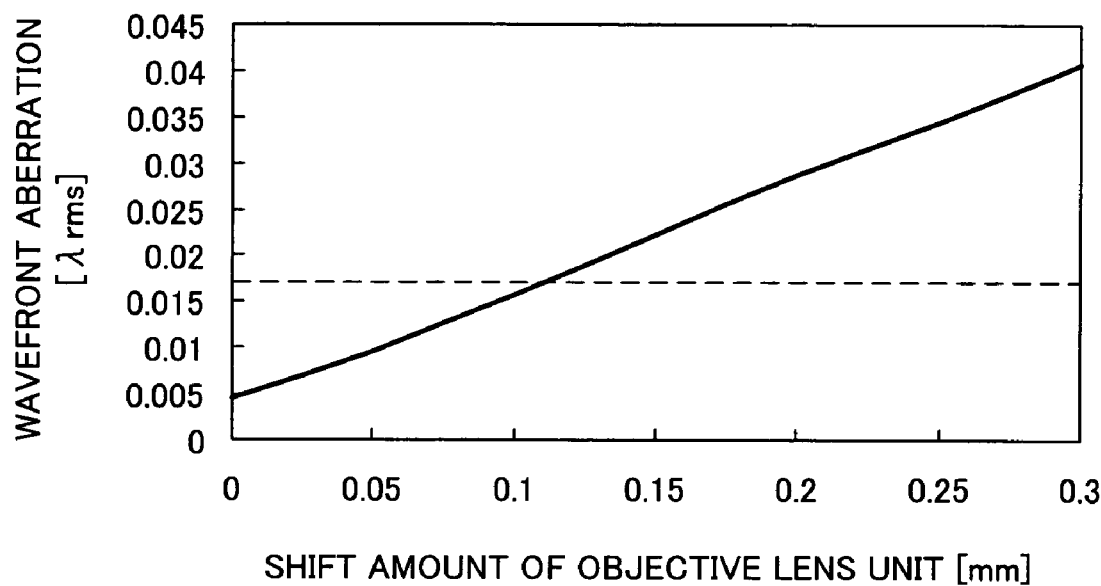
Figure 14:
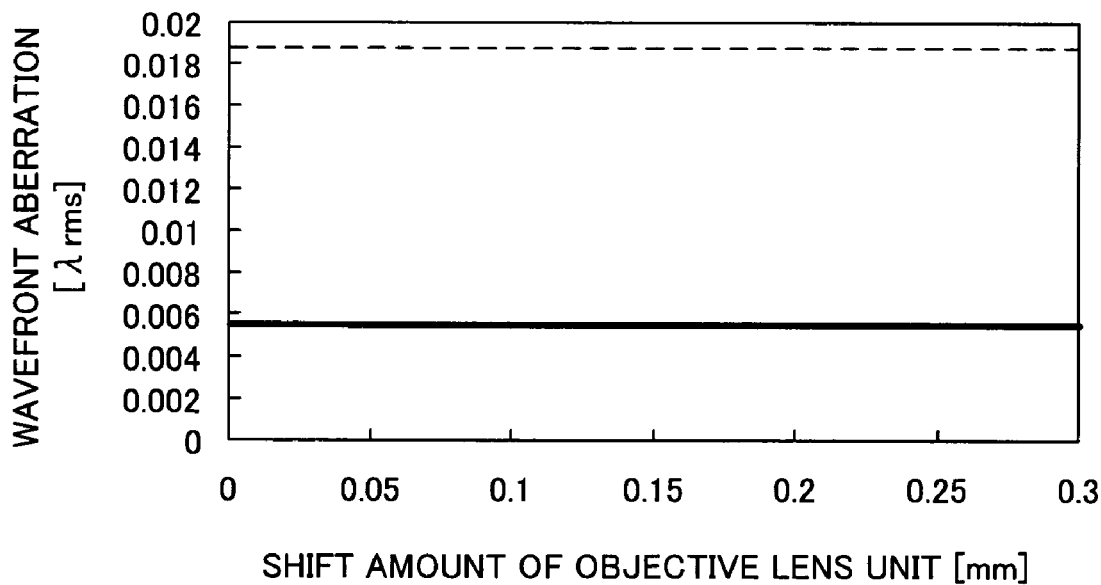

FIG. 14(a) and FIG. 14(b) show changes in wavefront aberration λrms on an image surface with respect to an amount of shift of the objective lens unit 213 in the optical axis direction, as indicated by solid line, when the light is focused on the optical disk using an optical pickup 200 prepared in this Example. In addition, FIG. 14(a) and FIG. 14(b) show changes in wavefront aberration λrms on an image surface with respect to an amount of shift of the objective lens unit 20 in the optical axis direction, as indicated by broken line, when the light is focused on the optical disk using a conventional optical pickup prepared for comparison. Note that, FIG. 14(a) is the result when the light was focused on the first optical disk, and FIG. 14(b) is the result when the light was focused on the second optical disk.

As with Example 3 above, the conventional optical pickup for comparison is prepared so that wavefront aberration is optimized when both the first and second light beams are incident on the objective lens unit as parallel rays, and when the second order component of the diffracted light is used for the first light beam and the first order component of the diffracted light is used for the second light beam.

As can be seen from FIG. 14(a), if the amount of shift of the objective lens unit 213 is not more than 0.12 mm, the optical pickup 200 can reduce wavefront aberration caused on the first optical disk by the shifting of the objective lens unit 213 when the first light beam L1 is incident on the objective lens unit 213 as a converging ray, more effectively than the conventional optical pickup.

As can be seen from FIG. 14(b), the optical pickup 200 can reduce the wavefront aberration for the second optical disk more effectively than the conventional optical pickup, thus forming a desirable focused light spot.

That is, with the optical pickup 2, wavefront aberration for the first and second optical disks can be reduced more effectively than the conventional optical pickup.

EXAMPLE 5

Figure 15:
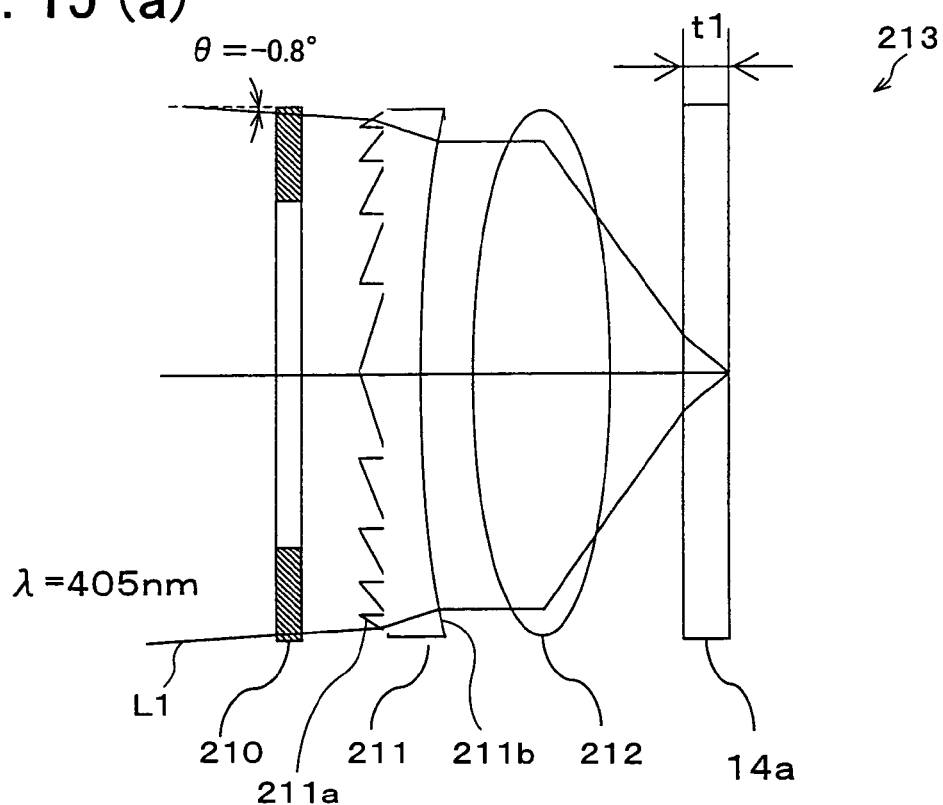
Figure 15:
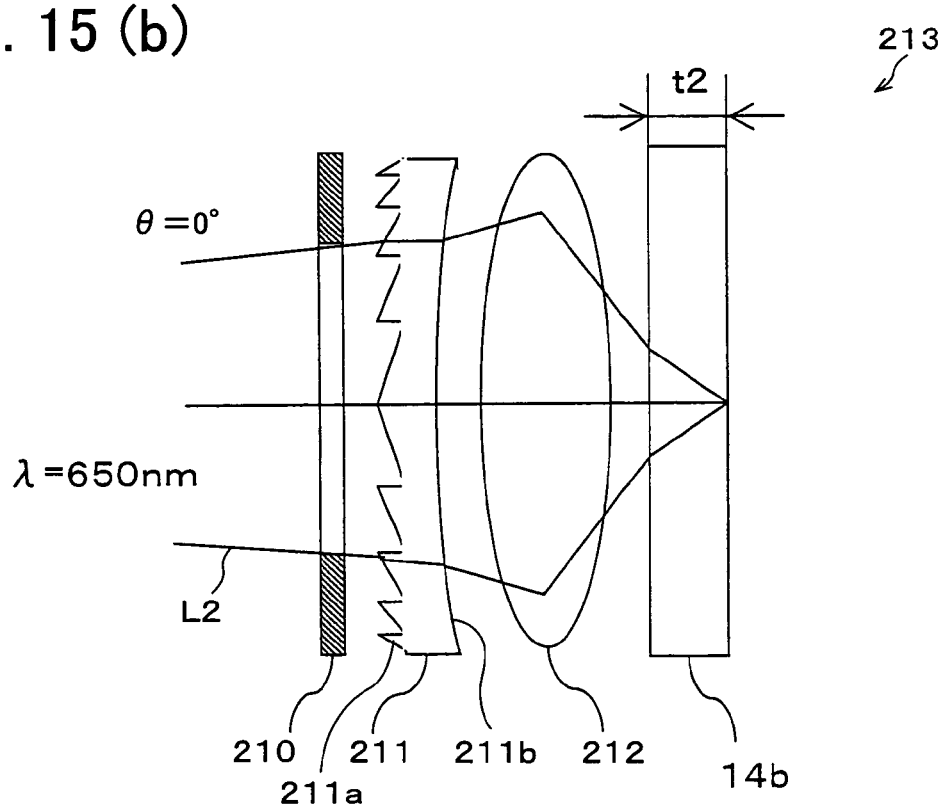

In this example, as shown in FIG. 15(a) and FIG. 15(b), an objective lens unit 213 is prepared so that a first light beam L1 (λ=405 nm) enters the objective lens unit 213 as a converging ray (i.e. at a converging or diverging angle θ of −0.8°) and the objective lens unit 213 uses the second order component of the light diffracted by a diffraction optical element 211, and that a second light beam L2 (λ=650 nm) enters the objective lens unit 213 as a diverging ray (i.e., at a converging or diverging angle θ of 0.8°) and the objective lens unit 213 uses the first order component of the light diffracted by the diffraction optical element 211. An aspherical lens is adopted for an objective lens 212. The diffraction optical element 211 has a concave face that is also aspherical.

When the first light beam L1 enters the diffraction optical element 211 as a converging ray, the light diffracted in the second order diffraction direction (in the converging direction with respect to the optical axis) by a diffraction grating 211a of the diffraction optical element 211 refracts in the diverging direction on a planoconcave lens 211b of the diffraction optical element 211 and enters the objective lens 212 as a parallel ray. The diffracted light is then focused by the objective lens 212, passes through a light transmissive layer (thickness of 0.1 mm), and forms a small light spot on an information recording face, thereby obtaining a desirable light focusing characteristic.

When the second light beam L2 enters the diffraction optical element 211 as a diverging ray, the light diffracted in the first order diffraction direction (in the converging direction with respect to the optical axis) by the diffraction grating 211a of the diffraction optical element 211 refracts in the diverging direction by the planoconcave lens 211b of the diffraction optical element 211 and enters the objective lens 212 as a diverging ray. The diffracted light is then focused by the objective lens 212, passes through a light transmissive layer (thickness of 0.6 mm), and forms a small light spot on the information recording face, thereby obtaining a desirable light focusing characteristic.

By thus causing the first light beam L1 and the second light beam L2 to enter the diffraction optical element 211 as a converging ray and a diverging ray, respectively, the diffraction grating 211a and the planoconcave lens 211b can be designed to have a pitch and a concave face that satisfy a converging or diverging angle θ of 0° for the second order component of the diffracted light for the first light beam L1 entering the objective lens 212, and a converging or diverging angle of 2° to 3° for the first order component of the diffracted light for the second light beam L2 entering the objective lens 212 (i.e., a diffraction angle difference of 2° to 3° is achieved between the second order component of the diffracted light for the first light beam L1 and the first order component of the diffracted light for the second light beam L2).

Table 16 through Table 19 below show data concerning the respective faces of the objective lens 212 and diffraction optical element 211 so designed. Note that, the same symbols, numbers, and the like are used in Table 16 through Table 19 as in Tables 8 through Table 11.

TABLE 16

NEXT-GENERATION HIGH-DENSITY OPTICAL DISK (FIRST OPTICAL DISK)

|  | FACE NUMBER | CURVATURE RADIUS | FACE PITCH | MATERIAL |
|---|---|---|---|---|
| VIRTUAL LIGHT SOURCE | 0 | INFINITY | −100.000 |  |
| DIFFRACTION OPTICAL ELEMENT | 1 | INFINITY | 0.5 | BK7_ |
|  | 2 | 12.520 | 0.5 | SCHOTT |
| OBJECTIVE LENS | 3 | 1.465 | 2.5 | LAH67_ |
|  | 4 | 20.516 | 0.1 | OHARA |
| DISK | 5 | INFINITY | 0.1 | PC |
|  | 6 | INFINITY | 0.23 |  |

TABLE 17

DVD (SECOND OPTICAL DISK)

|  | FACE NUMBER | CURVATURE RADIUS | FACE PITCH | MATERIAL |
|---|---|---|---|---|
| VIRTUAL LIGHT SOURCE | 0 | INFINITY | INFINITY |  |
| DIFFRACTION OPTICAL ELEMENT | 1 | INFINITY | 0.5 | BK7_ |
|  | 2 | 12.520 | 0.5 | SCHOTT |
| OBJECTIVE LENS | 3 | 1.465 | 2.5 | LAH67_ |
|  | 4 | 20.516 | 0.1 | OHARA |
| DISK | 5 | INFINITY | 0.6 | PC |
|  | 6 | INFINITY | 0.10 |  |

TABLE 18

| | FACE NUMBER | K | A | B | C | D | E |
|---|---|---|---|---|---|---|---|
| ASPHERICAL FACTOR | 2 | 0.00E+00 | −5.6E−03 | −1.1E−03 | −3.4E−03 | 1.4E−03 | 0.0E+00 |
| | 4 | −6.9E−01 | 1.3E−02 | 3.1E−03 | 2.6E−05 | 5.2E−04 | −6.7E−05 |
| | 5 | 7.2E+02 | 4.5E−01 | −1.2E+00 | 1.5E+00 | −9.4E−01 | 5.0E−01 |

TABLE 19

| | FACE NUMBER | DF1 | DF2 | DF3 | DF4 | DF5 |
|---|---|---|---|---|---|---|
| PHASE DIFFERENCE FACTOR | 1 | −9.5E−03 | 2.5E−03 | 2.6E−04 | 1.7E−03 | −6.4E−04 |

Figure 16:
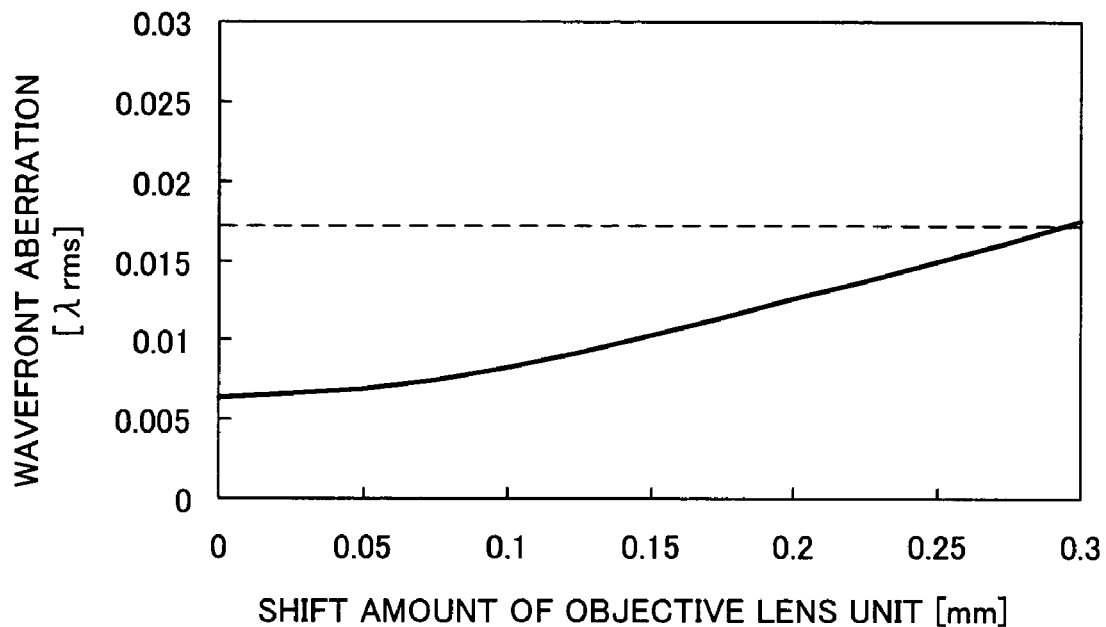
Figure 16:
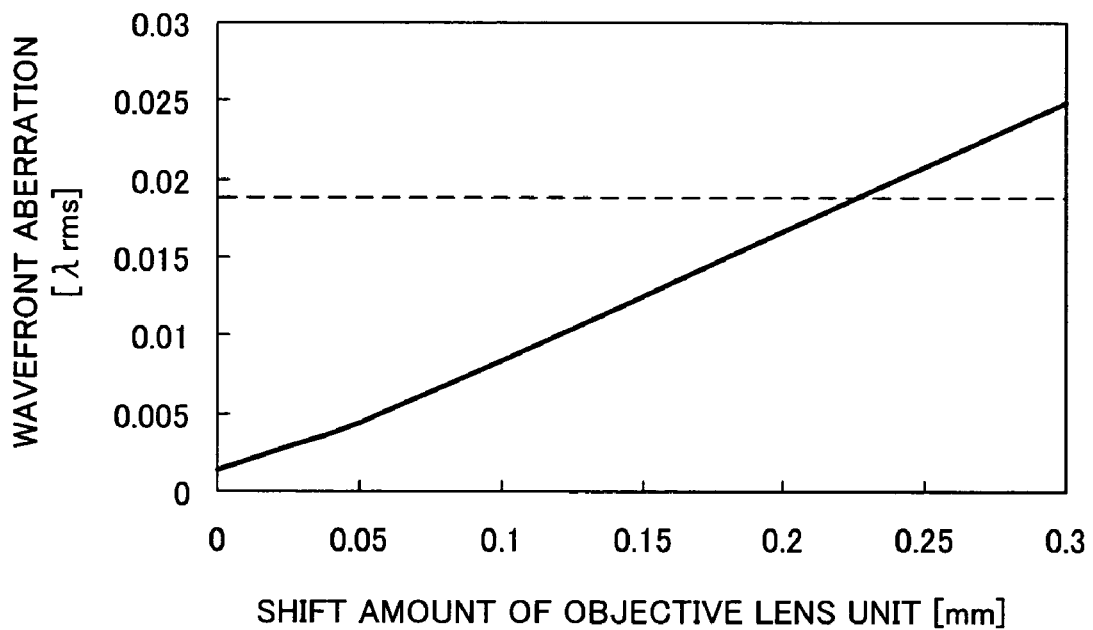

FIG. 16(a) and FIG. 16(b) show changes in wavefront aberration λrms on an image surface with respect to an amount of shift of the objective lens unit 213 in the optical axis direction, as indicated by solid line, when the light is focused on the optical disk using an optical pickup 200 prepared in this Example. In addition, FIG. 16(a) and FIG. 16(b) show changes in wavefront aberration λrms on an image surface with respect to an amount of shift of the objective lens unit 213 in the optical axis direction, as indicated by broken line, when the light is focused on the optical disk using a conventional optical pickup prepared for comparison. Note that, FIG. 16(a) is the result when the light was focused on the first optical disk, and FIG. 16(b) is the result when the light was focused on the second optical disk.

As with Example 4 above, the conventional optical pickup for comparison is prepared so that wavefront aberration is optimized when both the first and second light beams are incident on the objective lens unit as parallel rays, and when the second order component of the diffracted light is used for the first light beam and the first order component of the diffracted light is used for the second light beam.

As can be seen from FIG. 16(a) and FIG. 16(b), the optical pickup 200 can reduce the wavefront aberration for the first optical disk more effectively than the conventional optical pickup, thus forming an excellent focus spot.

Further, in the optical pickup 200, the adverse effect of shifting of the objective lens unit 213, which is caused when the first and second light beams are incident on the objective lens unit 213 as a converging ray and a diverging ray, respectively, can be reduced more effectively than the conventional optical pickup when the amount of shift of the objective lens unit 213 causing wavefront aberration is not more than 0.23 mm for the first optical disk and when the amount of shift of the objective lens unit 213 causing wavefront aberration is not more than 0.3 mm for the second optical disk.

By thus causing the first light beam and the second light beam to enter the objective lens unit 213 as a converging ray and a diverging ray, respectively, the wavefront aberration can be reduced over a relatively wide shift range even when the objective lens unit 213 shifts in the optical axis direction of the first and second light beams.

In Examples 3 through 5, the diffraction optical element 211 has an aspherical concave face. However, the same effect can also be obtained with a spherical concave face. Fabrication of the diffraction optical element 211 is easier when the concave face is spherical than it is when aspherical. Thus, with a spherical concave face, the diffraction optical element 211 can be provided inexpensively, reducing the cost therefor.

In the optical pickup 200, the first and second light beams L1 and L2 enter the diffraction optical element 211 as light beams with different degrees of convergence or divergence, which makes it easier to provide a large angle difference. This enables the required diffracting and refracting characteristics for the diffraction optical element 211 to be set more freely, allowing for more flexible design for the diffraction optical element 211. As a result, using the diffraction optical element 211, which is easy to fabricate, it is possible to realize the optical pickup 200 which can sufficiently reduce wavefront aberration in focused diffracted light.

Note that, when the first and second light beams L1 and L2 enter the diffraction optical element 211 as light beams with different degrees of convergence or divergence, the incident ray of one of the first and second light beams may be a converging ray while the other is a diverging ray, as described in Example 3 through Example 5. Alternatively, the incident ray of one of the first and second light beams may be a parallel ray while the other is a converging ray or a diverging ray. Further, the incident rays of both the first light beam and the second light beams may be converging rays or diverging rays with different degrees of convergence or divergence.

Figure 42:
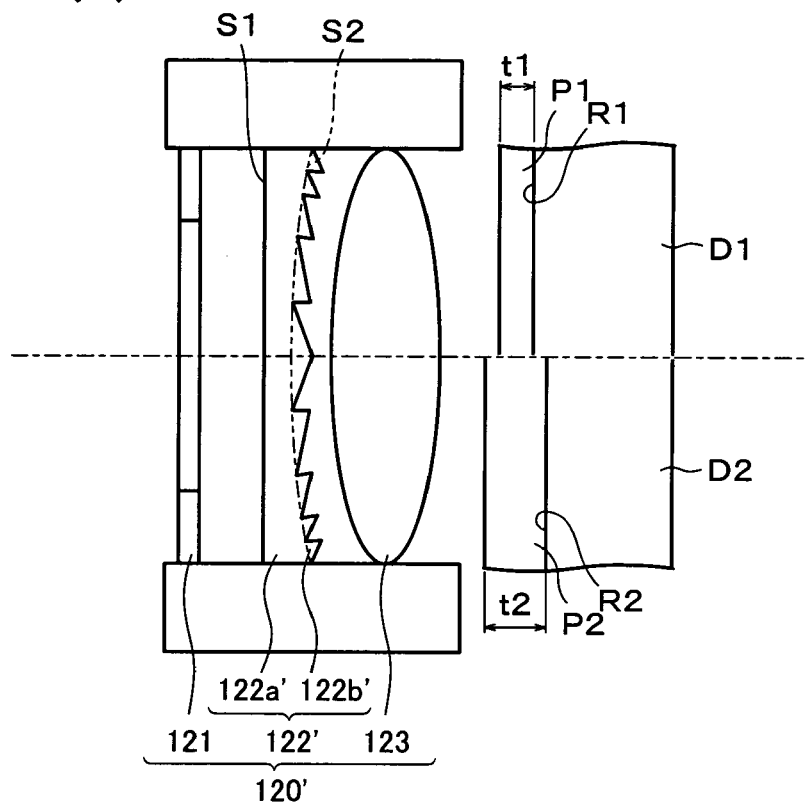
FIG. 42(a) and FIG. 42(b) are schematic drawings showing another Example of the objective lens unit in the optical pickup of the present invention.
Figure 42:
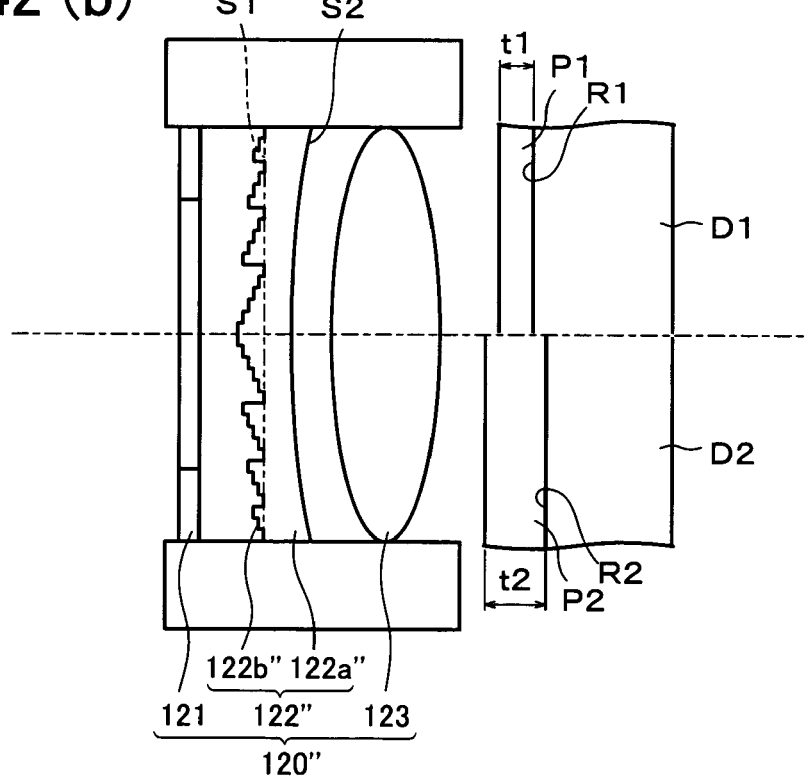

When the respective light beams of blue and red are incident on the diffraction optical element 211 as parallel rays, the angle difference between the diffraction angle for the blue light and the diffraction angle for the red light, which is required to compensate for the spherical aberration caused by the large difference in thickness of the light transmissive layers, must be increased to about 2° to 3° in order to provide compatibility for the next-generation high-density optical disk and the conventional DVD. The angle difference is related to the pitch of the diffraction grating 211a of the diffraction optical element 211, as shown by the graph of FIG. 42. It can be seen from FIG. 42 that the pitch of the diffraction grating needs to be as narrow as 3.5 μm to 4.5 μm in order to achieve the angle difference of about 2° to 3°.

Further, since the objective lens (infinite objective lens) is generally optimized for the blue light approaching from a point of infinity, the emergent ray from the diffraction optical element needs to be a parallel ray. That is, a ray of blue light that is bent on the diffracting face of the diffraction optical element needs to be refracted to a parallel ray on entering the refracting face (face of the diffraction optical element on the side of the objective lens). This is also effective in preventing aberration caused by misalignment of the diffraction optical element with the objective lens.

Figure 43:
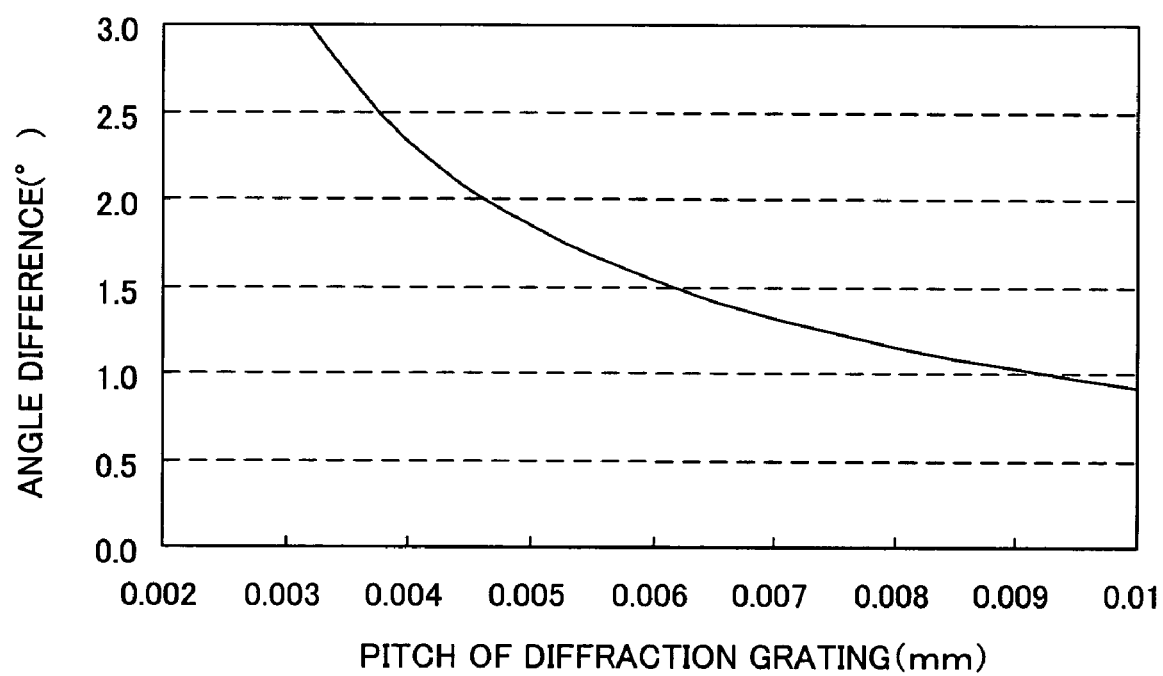
FIG. 43 is a graph representing a relationship between pitch of a diffraction grating of the diffraction optical element and diffraction angle difference of the diffraction optical element.
Figure 44:
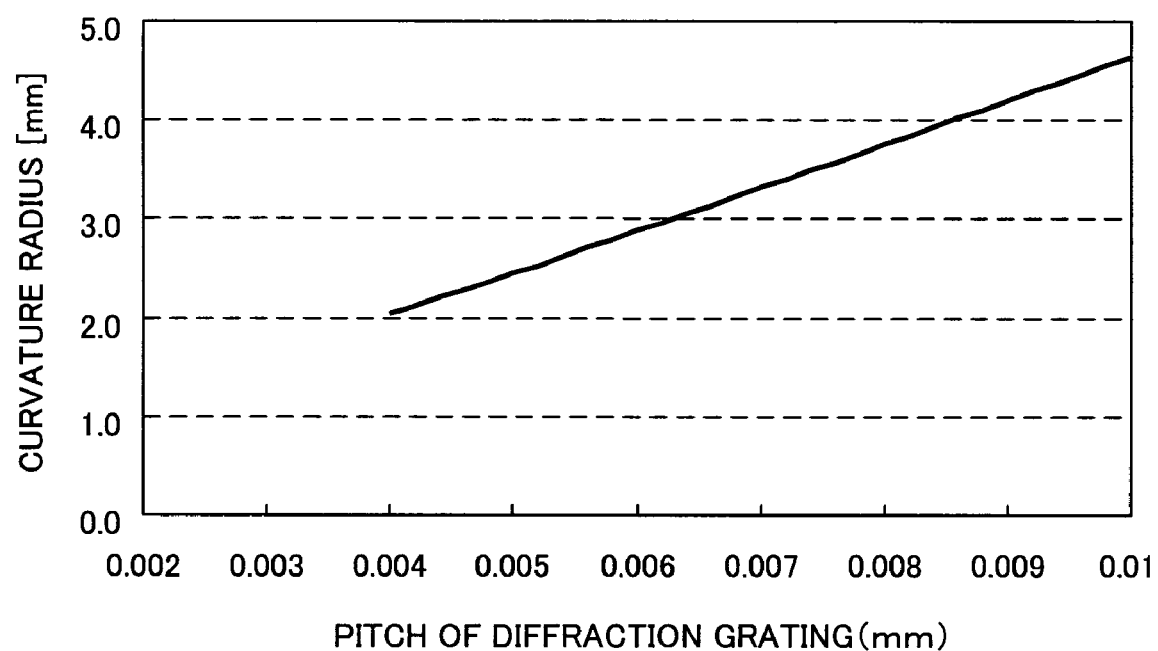
FIG. 44 is a graph representing a relationship between pitch of the diffraction grating and curvature of the refracting face of the diffraction optical element, when an incident parallel ray of blue light on the diffraction optical element emerges from the diffraction optical element as a parallel ray.

FIG. 43 represents a relationship between pitch of the diffraction grating and curvature of the refracting face of the diffraction optical element, when a parallel ray of blue light incident on the diffraction optical element emerges from the diffraction optical element also as a parallel ray. Note that, the relationship represented in FIG. 43 is based on a diffraction optical element in an optical pickup using an objective lens with an effective radius of 2 mm. The refracting face of the diffraction optical element is spherical. It can be seen from FIG. 43 that the curvature radius of the refracting face of the diffraction optical element needs to be no greater than 2.2 mm in order to confine the pitch of the diffraction grating from 3.5 µm to 4.5 µm.

However, given the fact that the effective radius of a common objective lens is 2 mm, and that the effective diameter of the diffraction optical element is also 2 mm, the refracting face with a curvature radius of no greater than 2.2 mm is substantially hemispherical, which is impossible to fabricate or practically useless. The refracting face may be made aspherical, but in this case the exceedingly small curvature makes fabrication of the diffraction optical element difficult. Even if it is possible to fabricate, the on-axis focusing characteristic is undesirably increased to 0.018λ (rms) for all of the optical disks.

As described, these and other problems can be solved by the optical pickup 200 of the present embodiment. That is, the optical pickup 200 is able to record or reproduce information with respect to recording media respectively having light transmissive layers of different thicknesses and respectively using different optimum wavelengths of light for reproducing. In addition, the optical pickup 200 is easy to fabricate, and can sufficiently reduce aberration in the focused light beam.

Figure 45:
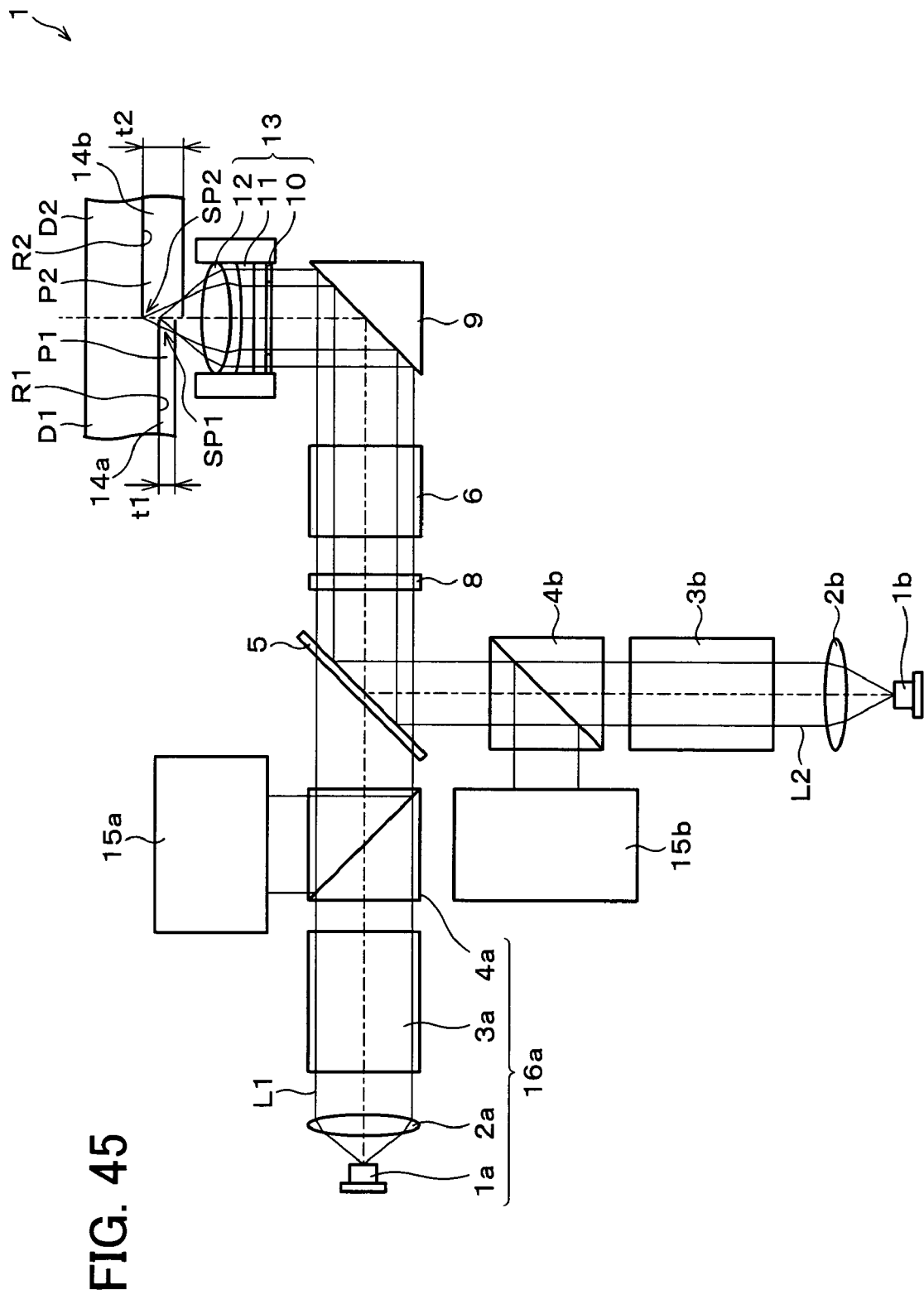
FIG. 45 is a schematic drawing showing another Example of the optical pickup of the present invention.

The optical pickup of the present embodiment as shown in FIG. 9 may be modified to provide an optical pickup as illustrated in FIG. 45. The optical pickup shown in FIG. 45 has the same structure as the optical pickup of FIG. 9, except that the ¼ wavelength plate 8 and the spherical aberration compensation system 6 are switched in position in the optical pickup 200.

Third Embodiment

Figure 17:
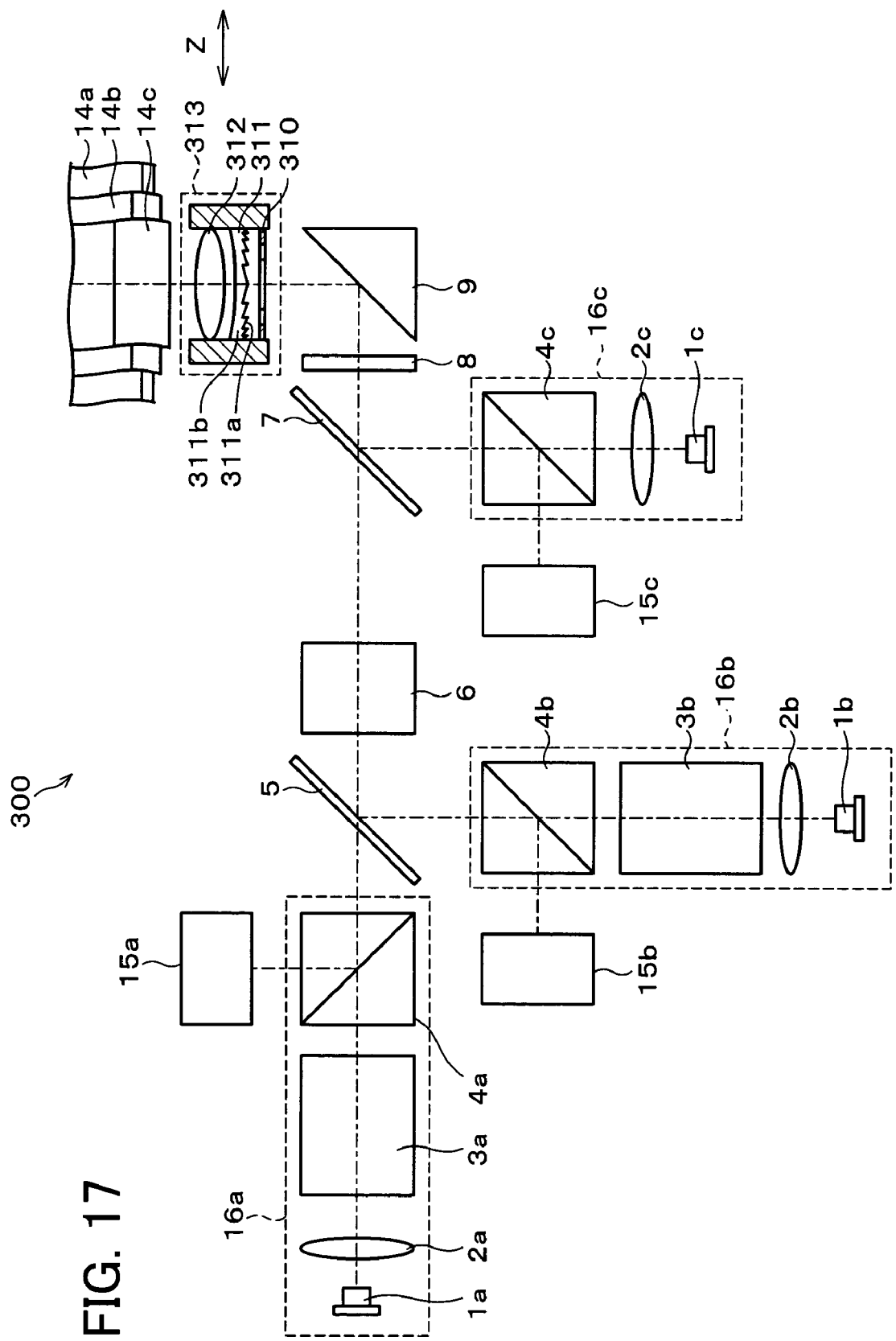
FIG. 17 is a schematic drawing showing a structure of an optical pickup according to one embodiment of the present invention.

FIG. 17 illustrates a schematic structure of an optical pickup 300 of the present embodiment. The description of the present embodiment will be given based on the optical pickup 300 that is compatible with a next-generation high-density optical disk (first optical disk 14a, first recording medium), a conventional DVD (second optical disk 14b, second recording medium), and a conventional CD (third optical disk 14c, third recording medium).

The first optical disk 14a uses blue light (first light beam) of a short wavelength in the vicinity of 405 nm (first wavelength λ1), and has a light transmissive layer with a thickness t1=0.1 mm. The second optical disk 14b uses red light (second light beam) of a long wavelength in the vicinity of 650 nm (second wavelength λ2), and has a light transmissive layer with a thickness t2=0.6 mm. The third optical disk 14c uses infrared light (third light beam) of a long wavelength in the vicinity of 780 nm (third wavelength λ3), and has a light transmissive layer with a thickness t3=1.2 mm.

The optical pickup 300 includes a semiconductor laser 1a that emits the first light beam of the first wavelength λ1, a semiconductor laser 1b that emits the second light beam of the second wavelength λ2 longer than λ1, and a semiconductor laser 1c that emits the third light beam of the third wavelength λ3 longer than λ2. The semiconductor laser 1a, semiconductor laser 1b, and semiconductor laser 1c (light source) are switched (turned on) according to the type of target optical disk.

The optical pickup 300 further includes collimator lenses 2a and 2b, shaping optical systems 3a and 3b, and beam splitters 4a and 4b. Through the collimator lenses 2a and 2b, the first and second light beams respectively emerged from the semiconductor lasers 1a and 1b become substantially parallel rays. The shaping optical systems 3a and 3b, such as a shaping prism, shape an ellipsoidal intensity distribution of the first and second light beams into a substantially circular intensity distribution. The beam splitters 4a and 4b pass the first and second light beams from the shaping optical systems 3a and 3b.

The shaping optical systems 3a and 3b are realized by a known optical system, which may be a single triangular prism, a combined triangular prism, or two discrete triangular prisms. It should be noted that the shaping optical systems 3a and 3b are optional in the optical pickup 300.

Further, the optical pickup 300 includes a compensating lens 2c through which the third light beam emerged from the semiconductor laser 1c becomes a predetermined diverging ray, and a beam splitter 4c that passes the third light emerged from the compensating lens 2c. Here, the compensating lens 2c is an aspherical lens inserted to reduce the adverse effect of radial shifting of the objective lens unit 313.

The semiconductor laser 1a, the collimator lens 2a, the shaping optical system 3a, and the beam splitter 4a make up a first optical system 16a. The semiconductor laser 1b, the collimator lens 2b, the shaping optical system 3b, and the beam splitter 4b make up a second optical system 16b. The semiconductor laser 1c, the compensating lens 2c, the beam splitter 4c make up a third optical system 16c.

The first and second light beams respectively emerged from the first and second optical systems 16a and 16b enter a dichroic mirror 5 where their optical axes merge, and through a spherical aberration compensation system 6 they change their degrees of convergence and/or divergence according to the type of light beam (first light beam or second light beam). Thereafter, the first and second light beams enter a dichroic mirror 7 where their optical axes merge with optical axis of the third light beam emerged from the third optical system 16c. Leaving the dichroic mirror 7, the first, second, and third light beams travel through a common optical system.

Here, the spherical aberration compensation system 6 serves as a beam expander to compensate for the spherical aberration caused by the thickness difference or other properties of the light transmissive layers of the first and second optical disks 14a and 14b, as well as light beam control means for changing the degree of convergence and/or divergence of the first and second light beams, as described above. Note that, the compensating lens 2c serves as light beam control means for changing the degree of convergence and/or divergence of the third light beam.

In a configuration where the optical pickup 300 does not include the shaping optical systems 3a and 3b, the collimator lens 12a and 12b may be used instead of the spherical aberration compensation system 6 to change the degree of convergence and/or divergence of the first and second light beams. In addition, elements other than the spherical aberration compensation system 6 or the collimator lenses 12a and 12b may be used to change the degree of convergence and/or divergence of the first and second light beams.

In the common optical system, the first, second, and third light beams pass through a ¼-wavelength plate 8, and are reflected by a mirror 9 into an objective lens unit 313.

Entering the objective lens unit 313, the first, second, third light beams travel through a wavelength-selective aperture filter 310, a diffraction optical element 311, and an objective lens 312 in this order, and form a small light spot on an information recording face of the first optical disk 14a, second optical disk 14b, or third optical disk 14c.

Further, the wavelength-selective aperture filter 310 controls aperture so that a numerical aperture NA1 (0.85 to be specific), a numerical aperture NA2 (0.6 to be specific), and a numerical aperture NA3 (0.45 to be specific) are obtained for the first, second, and third light beams of the first, second, and third wavelengths λ1, λ2, and λ3, respectively. Note that, the wavelength-selective aperture filter 310, which is provided between the mirror 9 and the diffraction optical element 311 in this embodiment, may be disposed in any other position, provided that the wavelength-selective aperture filter 310 is operative as an integral unit with the diffraction optical element 311 and the objective lens 312, and that the wavelength-selective aperture filter 310 is disposed between the objective lens 312 and light source. Further, the wavelength-selective aperture filter 310 may be realized by any other member, provided that it serves to control aperture.

The wavelength-selective aperture filter 310, the diffraction optical element 311, and the objective lens 312 are integrally provided as the objective lens unit 313, and can move relative to other optical systems in the optical pickup 300 in the direction of optical axis, i.e. in the Z direction as indicated by arrow in FIG. 17. This allows the light spot of focused light to desirably follow the oscillations of the information recording faces of the first, second, third optical disks 14a, 14b, and 14c, or rotation eccentricity of information tracks of the first, second, third optical disks 14a, 14b, and 14c.

In addition to the foregoing light projecting optical system, the optical pickup 300 further includes reproduced signal detecting optical systems 15a, 15b, and 15c. The reproduced signal detecting optical systems 15a, 15b, and 15c are realized by a known optical system, and serve to reproduce a light spot control signal for auto focusing or tracking, or an information signal recorded in the optical disk.

The objective lens unit 313 is an assembly integrally composed of: the objective lens 312 that focuses the first, second, and third light beams onto the information recording faces of the first, second, and third optical disk 14a, 14b, and 14c, respectively; the diffraction optical element 311 having a planoconcave lens 311b, which is a translucent diverging lens, and a converging diffraction grating 311a formed on a surface of the planoconcave lens; and the wavelength-selective aperture filter 310.

The diffraction optical element 311 is made with the converging diffraction grating 311a and the diverging planoconcave lens 311b, so as to suppress the wavefront aberration caused by wavelength fluctuations and to obtain desirable light focusing characteristics against wavelength fluctuations. Note that, an amount of aberration is referred to herein as wavefront aberration.

The diffraction optical element 311 is made by forming the diffraction grating 311a on a plane face of the planoconcave lens 311b, so that the number of components can be reduced. Alternatively, the diffraction optical element 311 may be composed of two optical elements made up of a diffraction element and a lens. In either case, the face of the diffraction optical element 311 with the diffracting action and the face with the refracting action are referred to as a diffracting face and a refracting face, respectively.

Note that, in the present optical pickup 300, the diffraction grating 311a of the diffraction optical element 311 is provided on the side of the wavelength-selective aperture filter 310 (on the side of light source); however, provision of the diffraction grating 311a on the side of the objective lens 312 can also bring about the same or similar effect.

In addition, the objective lens unit 313 may be realized by a diffraction optical element 311 including the diffraction grating on the concave face (refracting face) of the translucent lens on the other side of the plane face. In this case, alignment of the concave face with the diffraction grating becomes easier.

The planoconcave lens 311b of the diffraction optical element 311 is made of glass or plastic, for example. The diffraction grating 311a of the diffraction optical element 311 has concentrically grooved rings around the optical axis, or raised orbicular bands formed by photolithography around the optical axis on the plane face of the planoconcave lens 311b. Alternatively, the diffraction grating of the diffraction optical element 311 may be concentrically formed around the optical axis by glass molding or resin molding.

Preferably, the diffraction grating 311a is formed so that the cross section that cuts across the plane including the optical axis is blazed, i.e. serrated. The diffraction grating with the serrated cross section is advantageous over other types of diffraction gratings because it offers higher diffraction efficiency. Further, the diffraction grating 311a may be formed so that the cross section that cuts across the plane including the optical axis is stepped. The diffraction grating with the stepped cross section is advantageous over other types of diffraction gratings because it offers higher diffraction efficiency next to the diffraction grating with the serrated cross section.

Here, the objective lens 312 is designed so as to compensate for the aberration caused on the information recording face of the first optical disk 14a (next-generation high-density optical disk: using the wavelength of 405 nm; light transmissive layer of 0.1 mm) using the first light beam (blue light: λ=405 nm).

The degrees of convergence or divergence for the first, second, and third light beams after they have passed through the diffraction optical element 311 are respectively denoted as Φoutb, Φoutr, and ΦoutIr in the following Equation (15).

$$\Phi_{outb} = \Phi_{inb} + \Phi_{HOEb} + \Phi_{Lb}$$

$$\Phi_{outr} = \Phi_{inr} + \Phi_{HOEr} + \Phi_{Lr}$$

$$\Phi_{outIr} = \Phi_{inIr} + \Phi_{HOEIr} + \Phi_{LIr} \quad (15),$$

where Φinb, Φinr, and ΦinIr are respectively the degrees of convergence or divergence of the first, second, and third light beams entering the diffraction optical element 311, ΦHOEb, ΦHOEb, and ΦHOEIr are respectively the powers of the diffracting face of the diffraction optical element 311 for the first, second, and third light beams, and ΦLb, ΦLr, and ΦLIr are respectively the powers of the refracting face of the diffraction optical element 311 for the first, second, and third light beams.

Figure 18:
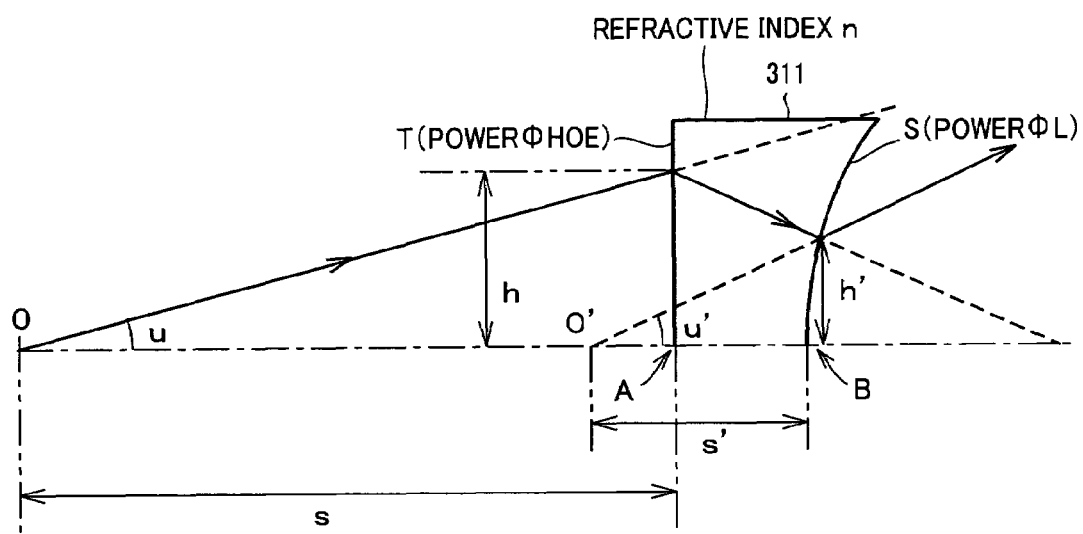
FIG. 18 is a cross sectional view explaining the power of a diffracting face and the power of a refracting face of an diffraction optical element in the optical pickup of FIG. 17, and degrees of convergence and/or divergence of a light beam entering and leaving the diffraction optical element.

Referring to FIG. 18, the following defines the degree of convergence or divergence and the power of the respective face. FIG. 18 is a cross sectional view as viewed in a direction orthogonal to the optical axis, showing a state of light rays passing through the diffraction optical element 311 made of a material with a refractive index n. It can be seen that rays from an object point O are diffracted on the diffracting face T and refracted on the refracting face S.

The degree of convergence or divergence Φin of an incident ray on the diffraction optical element 311 (degree of incident convergence or incident divergence) is an inverse of distance s between the object point O and point A where the optical axis intersects with the diffracting face T. That is, the degree of convergence or divergence of the light that enters the diffracting face T at angle u locating a point of incidence distanced by h from point A where the optical axis intersects with the diffracting face T can be expressed by the following Equation (16).

$$\phi \times \Phi_{in} = \tan u/h \tag{16}$$

Further, the degree of convergence or divergence Φout of an emergent ray from the diffraction optical element 311 (degree of emergent convergence or emergent divergence) is an inverse of distance s' from the refracting face S to an object point O' where the emergent ray intersects with the optical axis after passage through the diffraction optical element 311. That is, the degree of convergence or divergence of the light that emerges from the refracting face S at angle u' locating a point of emergence distanced by h' from peak B of the refracting face S can be expressed by the following Equation (17).

$$\phi \times \Phi_{out} = \tan u'/h' \tag{17}$$

Note that, in this specification, rays are diverging rays when the degree of convergence or divergence has a negative value, and are converging rays when the degree of convergence or divergence has a positive value. Further, the degree of convergence or divergence may be expressed as φ×Φin and φ×Φout by multiplying Φin and Φout with φ, which is the effective diameter of the objective lens 312 for the first light beam.

The powers ΦLb, ΦLr, ΦLlr of the refracting face S can be expressed by Equation (18) below. Note that, in this specification, powers are diverging when they have a negative value, and are converging when they have a positive value.

$$\Phi_{bL} = (1-n_b)/R$$

$$\Phi_{Lr} = (1-n_r)/R$$

$$\Phi_{Llr} = (1-n_{lr})/R \tag{18}$$

Here, nb, nr, nIr are respectively the refractive indices of the diffraction optical element 311 for the first, second, and third light beams, and R is the curvature radius of the refracting face S. Further, the power ΦHOE of the diffracting face T can be obtained from an optical path difference function, which represents a shape of the diffracting face T. Note that, the power of the refracting face S and the power ΦHOE of the diffracting face T are equivalent in terms of their ability to refract incident light.

In the case where no aberration is caused on the first optical disk 14a by the first light beam entering the objective lens 312 as a parallel ray, the degrees of convergence and/or divergence for the second and third light beams emerging from the diffraction optical element 311 (degrees of convergence and/or divergence of the incident ray on the objective lens) necessary to compensate for the spherical aberration caused by the difference in thickness of the light transmissive layers of the second and third optical disks 14b and 14c should generally be confined within the ranges defined by Inequalities (19) below.

$$-0.16 \leq \phi \times \Phi_{outr} \leq -0.05 \tag{19}$$

$$-0.26 \leq \phi \times \Phi_{outlr} \leq -0.15,$$

where φ is the effective diameter of the objective lens 312 for the first light beam.

The optical pickup 300 is designed to satisfy the following Inequalities (20) using the diffraction optical element 311.

$$|\Phi_{outr}| > |\Phi_{inr}|, \text{ and } |\Phi_{outlr}| > |\Phi_{inlr}| \tag{20}$$

By satisfying these inequalities, the light beams can enter the objective lens 312 with sufficient degrees of divergence so as to compensate for the spherical aberration caused by the difference in thickness of the light transmissive layers, even when the second and third light beams are incident on the objective lens unit 313 with degrees of divergence of relatively small absolute values. By thus enabling the second and third light beams to be incident on the objective lens unit 313 with degrees of divergence of relatively small absolute values, it is possible to reduce the adverse effect of radial shifting of the objective lens unit 313 (in the substantially orthogonal direction to the optical axes of the incident first, second, and third light beams; in a direction of arrow Z in FIG. 17) caused by tracking or other operations.

The values that satisfy Inequalities (15) are determined by the following: (a) the optical path difference function which represents a shape of the diffracting face; (b) the diffraction orders of the first, second, and third light beams used; (c) the degrees of convergence and/or divergence for the first, second, and third light beams entering the diffraction optical element 311; (d) the curvature radius of the refracting face; and (e) the refractive index of the diffraction optical element 311.

In the optical pickup 300, Φoutb is preferably 0. This allows the first light beam of a short wavelength, which requires the most accuracy for the wavefront aberration, to be incident on the objective lens 312 as a parallel ray. As a result, when using the first light beam, it is possible to suppress the aberration caused by misalignment of the diffraction optical element 311 with the objective lens 312.

The following explains how diffraction orders of the light beams diffracted on the diffracting face of the diffraction optical element 311 are used. The diffraction efficiency of the diffraction grating with the blazed cross section can be obtained by the following Equation (21).

$$\eta_m = \left| \frac{1}{T} \int_0^T A(x) \exp\{i\phi(x)\} \exp\left(-i\frac{2\pi m x}{T}\right) dx \right|^2 \tag{21}$$

Figure 19:
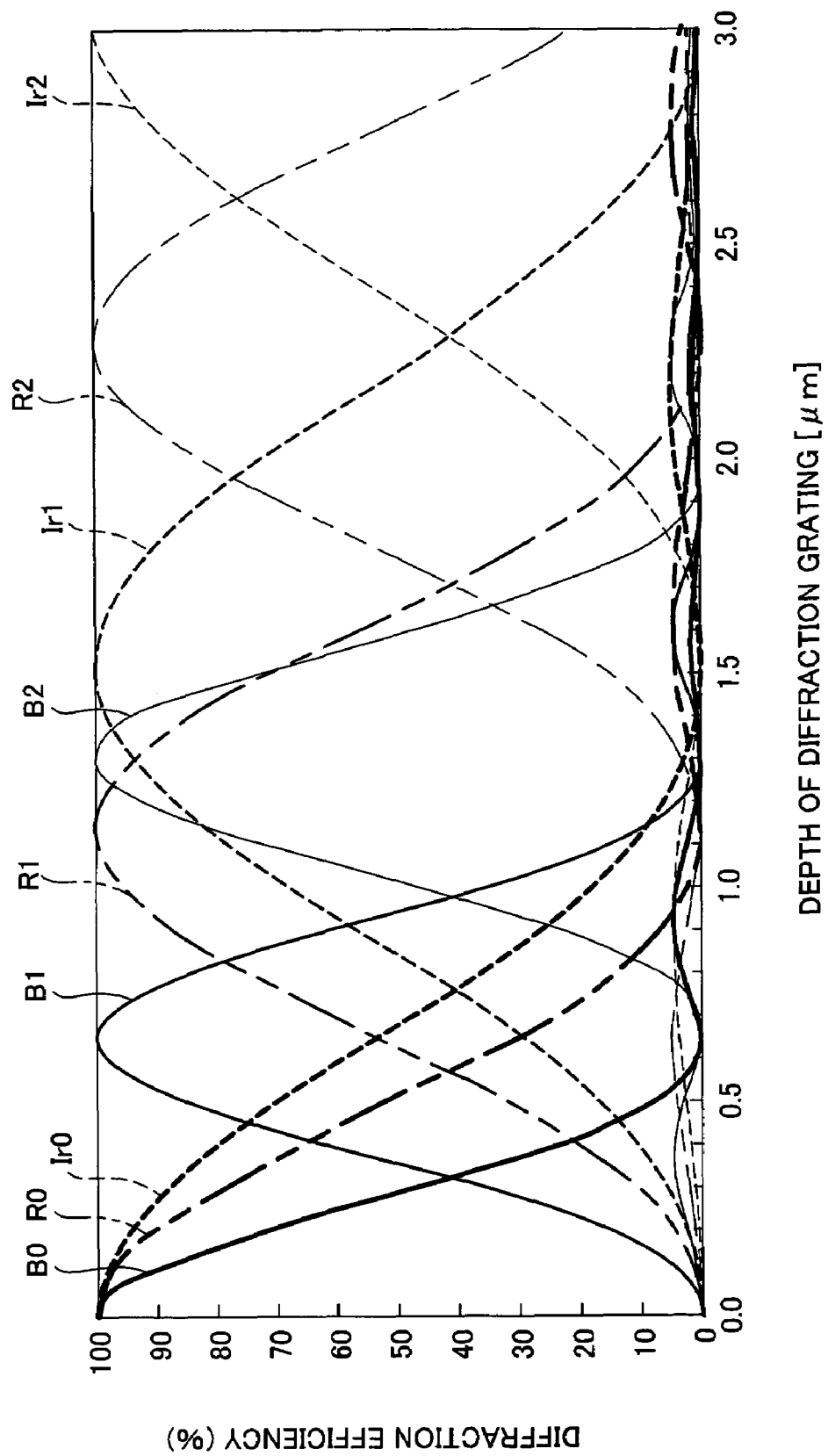
FIG. 19 is a graph representing a relationship between depth of the diffraction grating of the optical pickup of FIG. 17 and diffraction efficiency for the respective diffraction orders.

In this equation, m is the diffraction order, A(x) is the transmitted amplitude distribution, φ(x) is the phase distribution, and T is the period length in the x-axis direction. Note that, calculations below have been normalized with A(x)=1. FIG. 19 illustrates the result of calculation using Equation (5) when diffraction efficiencies were specifically calculated using a diffraction grating made out of a PC (polycarbonate) base.

In FIG. 19, B0, B1, B2 are diffraction efficiencies for the zeroth order, first order, and second order components of the diffracted light for the first light beam, respectively, R0, R1, R2 are diffraction efficiencies for the zeroth order, first order, and second order components of the diffracted light for the second light beam, respectively, and Ir0, Ir1, and Ir2 are diffraction efficiencies for the zeroth order, first order, and second order components of the diffracted light for the third light beam, respectively.

The optical pickup 300 is adapted to use the second order component of the diffracted light for the first light beam and the first order component of the diffracted light for the second and third light beams. This can increase the efficiency of using each of the first, second, and third light beams.

Specifically, when PC is used as the material of the diffraction optical element, as shown in FIG. 19, the diffraction grating approximately 1.3 μm in depth allows for approximately 100% efficiency for the first light beam and 90% or greater efficiency for the second and third light beams. This makes it possible to readily realize an optical pickup that performs information recording and erasing that requires a high power light beam. In addition, the power of the light source can be made smaller, reducing power consumption. Further, since there is no unnecessary light other than the diffracted light used, it is possible to prevent stray light from entering a detector such as the reproduced signal detecting optical systems 15a during reproduction, thereby suppressing deterioration of reproduced signals.

Figure 20:
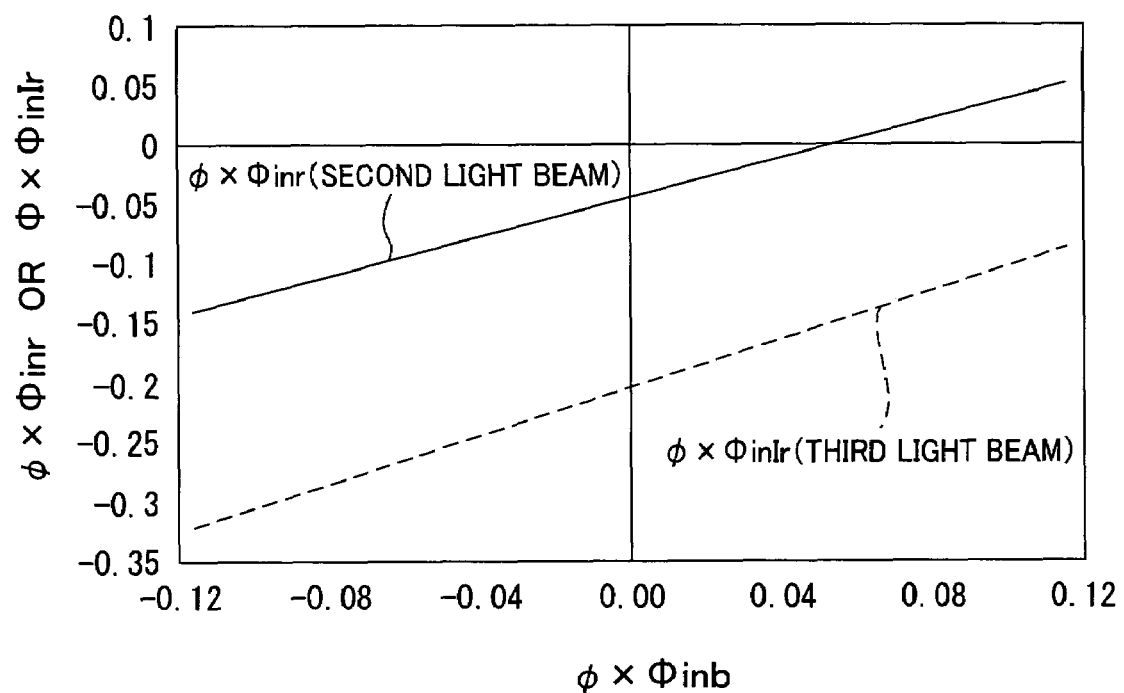
FIG. 20 is a graph representing a relationship between a degree of convergence and/or divergence of the first light beam and degrees of convergence and/or divergence of the second and third light beams incident on the diffraction optical element of the optical pickup of FIG. 17.

FIG. 20 illustrates a relationship between degrees of convergence and/or divergence for the first, second, and third light beams incident on the diffraction optical element 311. FIG. 20 shows changes in degrees of incident convergence and/or incident divergence for the second and third light beams ($\phi \times \Phi_{inr}$ and $\phi \times \Phi_{inIr}$) with changes in degree of incident convergence or incident divergence for the first light beam ($\phi \times \Phi_{inb}$).

Here, the first light beam (emergent ray from the diffraction optical element 311) is incident on the objective lens 312 as a parallel ray ($\phi \times \Phi_{outb}=0$).

The second light beam (emergent ray from the diffraction optical element 311) is incident on the objective lens 312 as a diverging ray ($\phi \times \Phi_{outr}=-0.1$), and the third light beam (emergent ray from the diffraction optical element 311) is incident on the objective lens 312 as a diverging ray ($\phi \times \Phi_{outIr}=-0.2$). These degrees of divergence are approximate mean values of Inequalities (19), which define the ranges of divergence degree generally required to compensate for the spherical aberration caused by the difference in thickness of the light transmissive layers of the optical disks 14b and 14c from that of the first optical disk 14a, when the second and third light beams are focused on the second and third optical disks 14b and 14c. The degrees of divergence given above are also values that yield the best compensation result.

Further, the diffracting face of the diffraction optical element 311 is designed such that the second order component of the diffracted light is used for the first light beam, and the first order component of the diffracted light is used for the second and third light beams. The diffraction optical element 311 is made with a refracting face with a curvature radius of 5 mm, and the material of the diffraction optical element 311 is PC. The degree of incident convergence or incident divergence for the first light beam is varied by changing the shape of the diffracting face of the diffraction optical element 311.

As can be seen from FIG. 20, the degree of incident convergence or incident divergence for the first light beam is directly proportional to the degrees of incident convergence or incident divergence of the second and third light beams. Further, with a negative value of the degree of convergence or divergence for the third light beam incident on the diffraction optical element 311, i.e. when the third light beam enters the diffraction optical element 311 as a diverging ray, the degrees of incident convergence or incident divergence for the first and second light beams can remain at relatively small absolute values. Further, when the degree of incident convergence or incident divergence for the first light beam is not less than 0, i.e., when the first light beam enters the diffraction optical element 311 as a parallel or a converging ray, the degrees of incident convergence or incident divergence for the second and third light beams have small absolute values.

It is therefore preferable that the first and second light beams enter the diffraction optical element 311, for example, as a parallel ray and a diverging ray, respectively. By causing the first light beam, which requires the most accurate light focusing characteristic, to be incident on the diffraction optical element 311 as a parallel ray, the degrees of divergence for the second and third light beams entering the diffraction optical element 311 can remain relatively small. As a result, it is possible to effectively suppress the impairment of light focusing characteristic due to radial shifting of the objective lens unit 313.

Alternatively, it is preferable that the first light beam is incident on the diffraction optical element 311 as a converging ray, and the second light beam is incident on the diffraction optical element 311 as a converging, parallel, or diverging ray. In this way, the degrees of convergence or divergence for the first, second, and third light beams entering the diffraction optical element 311 can remain at relatively small absolute values. As a result, it is possible to effectively suppress the impairment of light focusing characteristic due to radial shifting of the objective lens unit 313.

Figure 21:
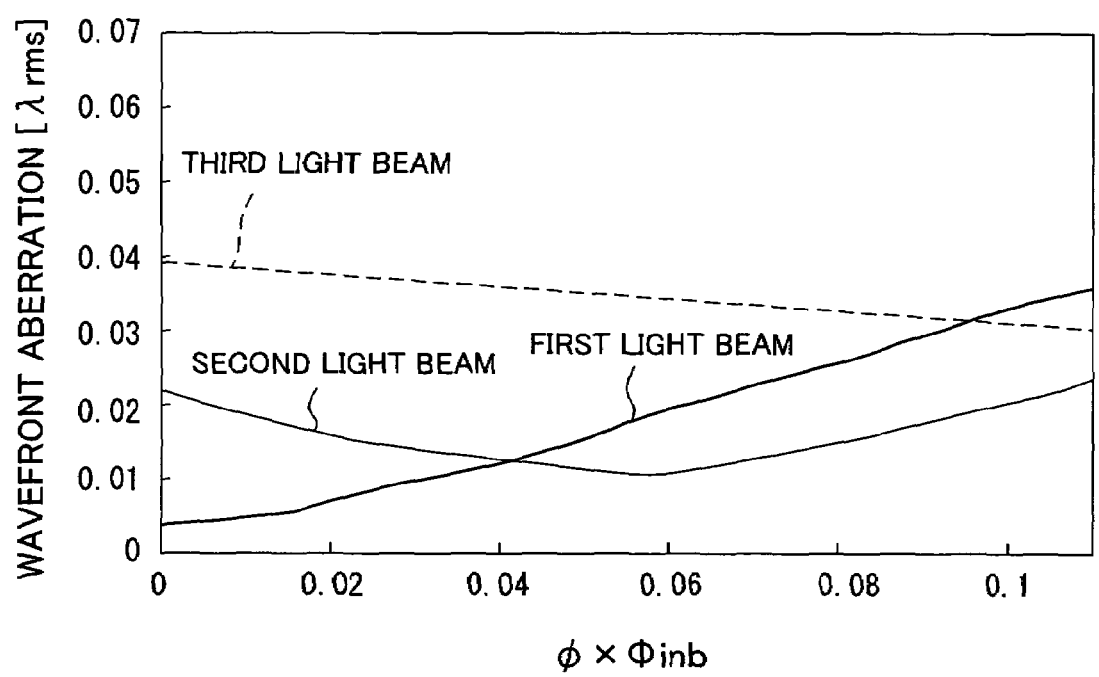
FIG. 21 is a graph representing a relationship between a degree of convergence and/or divergence of the first light beam incident on the diffraction optical element in the optical pickup of FIG. 17 and wavefront aberration caused in the first, second, and third light beams.

FIG. 21 verifies this in detail. FIG. 21 shows a relationship between wavefront aberration and degree of divergence for the first light beam entering the diffraction optical element 311, when the amount of radial shift of the objective lens unit 313 is 200 μm.

Referring to FIG. 20, in the optical pickup 300, when the degree of convergence or divergence for the first light beam entering the diffraction optical element 311 is in the range of Inequality (22) below, the degrees of convergence or divergence for the second and third light beams entering the diffraction optical element 311 satisfy Inequalities (23) and (24) below, respectively.

$$0 \leq \phi \times \Phi_{inb} \leq 0.11 \tag{22}$$

$$-0.048 \leq \phi \times \Phi_{inr} \leq 0.04 \tag{23}$$

$$-0.18 \leq \phi \times \Phi_{inIr} \leq -0.1 \tag{24}$$

In this case, as shown in FIG. 21, it is possible to reduce wavefront aberration to not more than 0.04λrms for all of the first, second, and third light beams.

Further, in this case, the aforementioned Inequalities (20) are satisfied, as can be seen from FIG. 21. This can reduce the degrees of convergence or divergence for the second and third light beams entering the diffraction optical element 311, thereby reducing the adverse effect of radial shifting of the objective lens unit 313 caused by tracking or other operations.

Here, the respective powers Φb, Φr, and ΦIr of the diffraction optical element 311 for the first, second, and third light beams are defined by Equations (25) below. That is, the power of the diffraction optical element 311 is defined by a sum of the power of the diffracting face (ΦHOE) and the power of the refracting face (ΦL).

$\Phi_b = \Phi_{HOEb} \Phi_{Lb}$ $\Phi_r = \Phi_{HOEr} + \Phi_{Lr}$ $\Phi_{Ir} = \Phi_{HOEIr} + \Phi_{LIr}$ (25)

From Equations (15) and (25), the following Equation (26) can be obtained.

$\Phi_b = \Phi_{outb} - \Phi_{inb}$ $\Phi_r = \Phi_{outr} - \Phi_{inr}$ $\Phi_{Ir} = \Phi_{outIr} - \Phi_{inIr}$ (26)

Therefore, in the optical pickup 300, from Equations (22), (23), and (24) defining ranges of Φin, and from Φoutb=0 defining a range of Φout, and from Inequalities (19), the respective powers of the diffraction optical element 311 satisfy the following Inequalities (27).

$-0.11 \leq \phi \times \Phi_b \leq 0$ $-0.2 \leq \phi \times \Phi_r \leq -0.002$ $-0.16 \leq \phi \times \Phi_{Ir} \leq 0.03$ (27)

According to this, it is possible to obtain desirable wavefront aberration regardless of the presence or absence of radial shifting of the objective lens unit 313.

The respective powers of the diffracting face and refracting face of the diffraction optical element 311 can be suitably set in the foregoing power ranges for the diffraction optical element 311. In the optical pickup 300, the diffracting face has a positive power (converging diffracting face) and the refracting face has a negative power (concave face). This makes it possible to reduce an increase of the wavefront aberration caused when the wavelength of the light source shifts, as will be described later.

Here, by setting the degree of convergence or divergence for the first light beam entering the diffraction optical element 311 so that φ×Φinb=0 (causing the first light beam to be incident on the diffraction optical element 311 as a parallel ray), it is possible to reduce the wavefront aberration caused by radial shifting of the objective lens unit 313, also for the first light beam which requires more accurate light focusing characteristic due to its short wavelength. When φ×Φoutb=0 (causing the first light beam to be incident on the objective lens 312 as a parallel ray), the power of the diffraction optical element 311 for the first light beam is set so that Φb=0. Details of this will be explained in Example 6.

As another example, when the degree of divergence for the first light beam entering the diffraction optical element 311 is φ×Φinb=0.06 (the first light beam enters the diffraction optical element 311 as a converging ray), φ×Φinr≈0 (the incident ray is substantially parallel) and φ×ΦinIr≈−0.15 (the incident ray is diverging) (see FIG. 20). In this case, it is possible to reduce the wavefront aberration caused by radial shifting of the objective lens unit 313, also for the second light beam (see FIG. 21). Details of this will be explained in Example 7.

Further, by causing the first, second, and third light beams to enter the diffraction optical element 311 with predetermined degrees of convergence and/or divergence as described above, the wavefront aberration can be suppressed even when the objective lens unit 313 shifts in the radial direction. However, the wavefront aberration can be suppressed more effectively when an aspherical lens is inserted between the light source and the diffraction optical element 311, so as to reduce coma aberration caused by radial shifting of the objective lens unit 313, when a diverging ray is incident on the diffraction optical element 311.

EXAMPLE 6

Another Example of the present invention is described below with reference to FIGS. 22(*a*), (*b*), (*c*), FIGS. 23(*a*), (*b*), (*c*) and FIG. 24.

Figure 22:
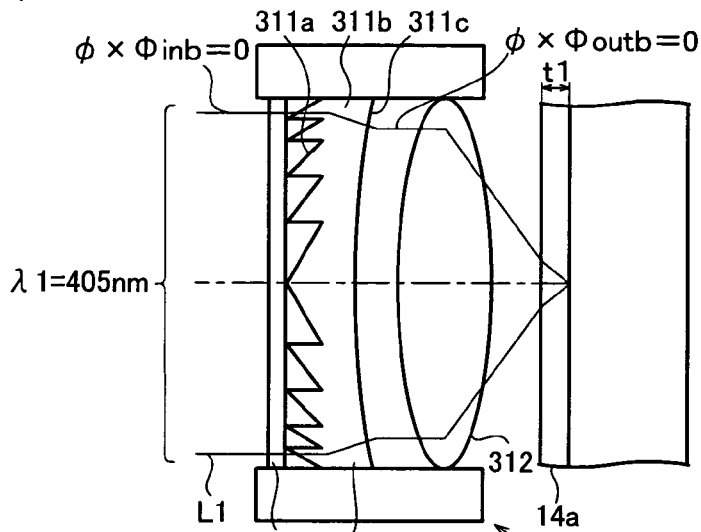
Figure 22:
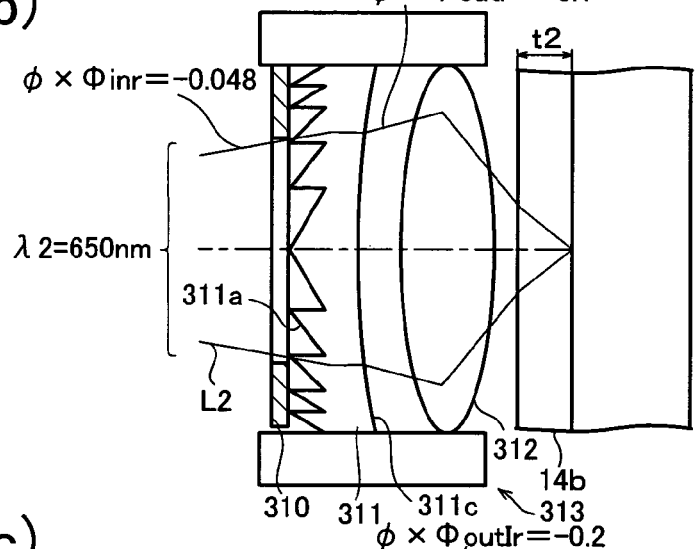
Figure 22:
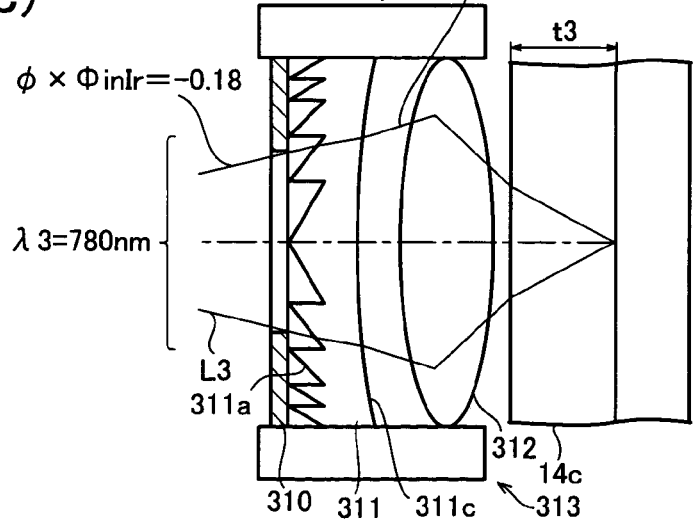
Figure 23:
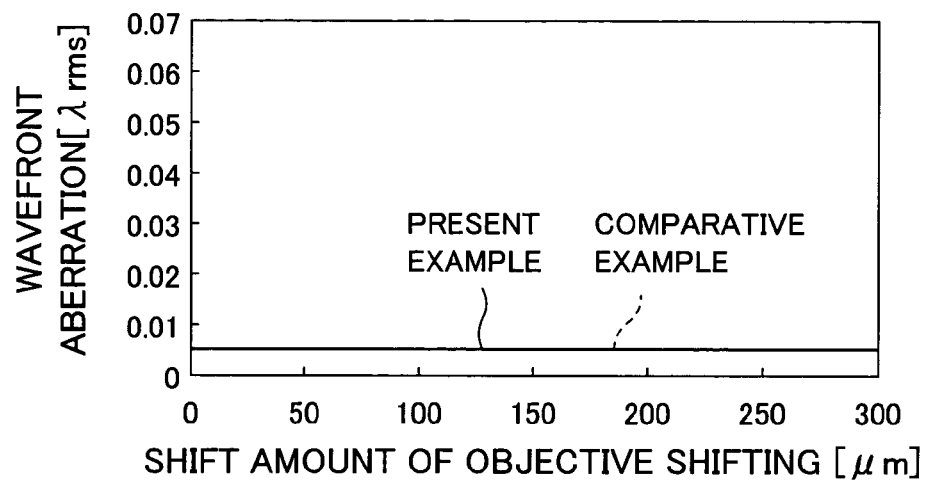
FIG. 23(a) through FIG. 23(c) are graphs representing a relationship between shift amount of objective shifting and wavefront aberration, comparing the Example shown in FIG. 22(a) through FIG. 22(c) with a comparative example.
Figure 23:
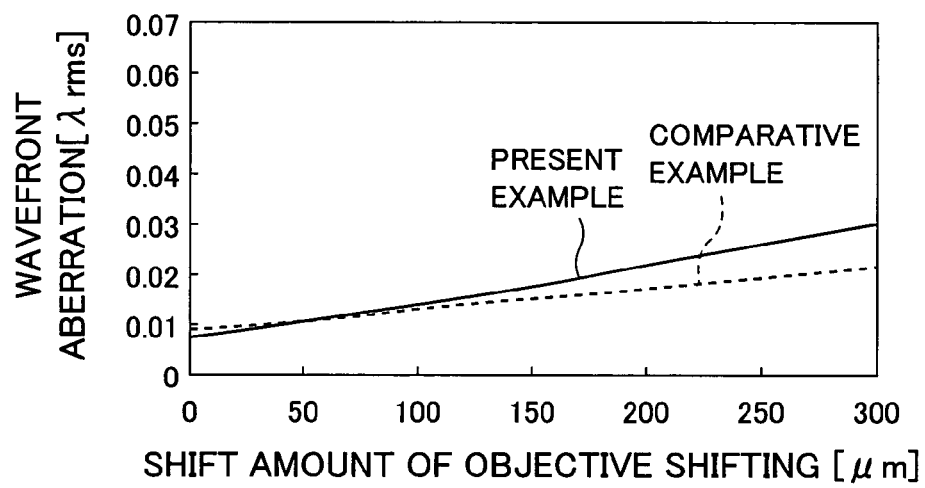
Figure 23:
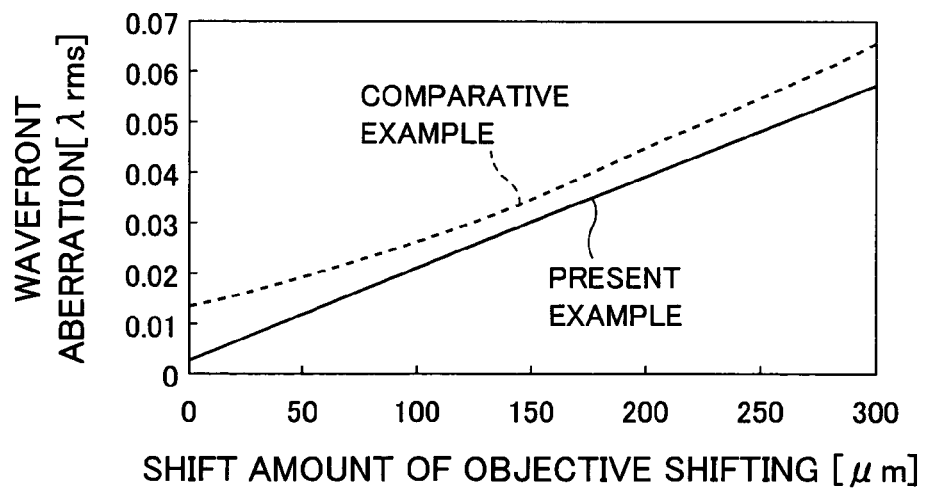

In this Example, as shown in FIG. 22(*a*), FIG. 22(*b*) and FIG. 22(*c*), the first light beam is incident on the diffraction optical element 311 with a degree of convergence or divergence φ×Φinb=0, so that the adverse effect of radial shifting of the objective lens unit 313 can be eliminated almost completely for the first light beam which requires the more accurate light focusing characteristic. Note that, this Example uses an objective lens 312 with an effective diameter φ=3 mm for the first light beam L1.

An optical pickup 3 of this example is fabricated so that the first light beam L1 is incident on the diffraction optical element 311 as a parallel ray given by φ×Φinb=0, while the second and third light beams L2, L3 are incident on the diffraction optical element 311 as diverging rays, which are given by φ×Φinr=−0.048 and φ×ΦinIr=−0.18, respectively. The diffracting face of the diffraction optical element 311 is designed such that the second order component of the diffracted light is used for the first light beam, and the first order component of the diffracted light is used for the second and third light beams.

The diffraction optical element 311 is made with a concave face and a diffraction grating, and is disposed on the side of the light source for the aspherical objective lens 312. The concave face is spherical and has a curvature radius of 5 mm.

Here, the concave face is spherical because it is easier to fabricate. The concave face may be made aspherical to further improve shifting characteristics of the objective lens unit 313 in the radial direction.

In the optical pickup 300 of this Example, as shown in FIG. 22(*a*), for the first optical disk 14*a*, the first light beam L1 is incident on the diffraction optical element 311 as a parallel ray given by φ×Φinb=0, and the light beam diffracted in a second order diffraction direction (converging direction with respect to the optical axis) on the diffracting face is refracted in a diverging direction on the concave face so that the light beam is incident on the objective lens 312 as a parallel ray and is focused on the first optical disk 14*a* having a 0.1 mm thick light transmissive layer. In this way, desirable light focusing characteristics are obtained.

For the second optical disk 14*b*, as shown in FIG. 22(*b*), the second light beam L2 is incident on the diffraction optical element 311 as a diverging ray given by φ×Φinr=−0.048, and the light beam diffracted in a first order diffraction direction (converging direction with respect to the optical axis) on the diffracting face is refracted on the concave face in the diverging direction so that the light beam is incident on the objective lens 312 with a predetermined degree of divergence (φ×Φoutr=−0.1 in this Example). In this way, desirable light focusing characteristics are obtained for the second optical disk 14*b* having a 0.6 mm thick light transmissive layer.

Here, the provision of the diffraction optical element 311 enables the light beam to be incident on the objective lens unit 313 with a smaller degree of divergence than when it is incident on the objective lens 312, thereby reducing the adverse effect of radial shifting of the objective lens unit 313.

For the third optical disk 14c, as shown in FIG. 22(c), when the third light beam L3 is incident on the diffraction optical element 311 as a diverging ray given by φ×ΦinIr=−0.18, the light beam is diffracted on the diffracting face in a first order diffraction direction (converging direction with respect to the optical axis), and is refracted on the concave face in a diverging direction so that the light beam is incident on the objective lens 312 with a predetermined degree of divergence (φ×ΦoutIr=−0.2 in this Example). In this way, desirable light focusing characteristics are obtained for the third optical disk 14c having a 1.2 mm thick light transmissive layer.

Here, the provision of the diffraction optical element 311 enables the light beam to be incident on the objective lens unit 312 with a smaller degree of divergence than when it is incident on the objective lens 312, thereby reducing the adverse effect of radial shifting of the objective lens unit 313.

FIG. 23(a), FIG. 23(b) and FIG. 23(c) represent changes in wavefront aberration λrms on an image surface with respect to an amount of shifting (objective shifting) of the objective lens unit 313 in the radial direction, as indicated by solid line, when the first, second and third light beams are respectively focused on the first, second and third disks 14a, 14b, and 14c by using the optical pickup 300 prepared in this Example. Further, broken line in FIG. 23(a), FIG. 23(b) and FIG. 23(c) indicates the results when an optical pickup (comparative example 1a) prepared for comparison was used. Note that, FIG. 23(a) shows the result when the first light beam was focused on the first optical disk 14a, and FIG. 23(b) shows the result when the second light beam was focused on the second optical disk 14b, and FIG. 23(c) shows the result when the third light beam was focused on the third optical disk 14c.

The comparative example 1a was prepared to optimize wavefront aberration in such a manner that the first light beam is incident on the objective lens as a parallel ray, and the second and third light beams are incident on the objective lens as predetermined diverging rays so as to compensate for the spherical aberration caused by a thickness difference of the light transmissive layers. Further, in order to optimize wavefront aberration, an aspherical lens is inserted in the optical paths of the diverging rays so as to prevent impairment of shifting characteristics of the objective lens.

As can be seen from FIG. 23(a), the use of the optical pickup 300 of the present Example makes it possible to form a desirable focused light spot on the first optical disk 14a.

Further, as can be seen from FIG. 23(b), the use of the optical pickup 300 of the present Example makes it possible to form a desirable focused light spot on the second optical disk 14b. Compared with the comparative example 1a, the present invention can more effectively suppress wavefront aberration, even though there is an area where the adverse effect of radial shifting of the objective lens unit 313, which is caused when the second light beam is incident on the diffraction optical element 311 as a diverging ray, is greater. Here, in order to further reduce the adverse effect of radial shifting of the objective lens unit 313, the diffracting face 311a of the diffraction optical element 311 on the side of the light source is made aspherical.

Further, as can be seen FIG. 23(c), the use of the optical pickup 300 of the present Example makes it possible to form a desirable focused light spot on the third optical disk 14c. The optical pickup 300 of the present Example can reduce the adverse effect of radial shifting of the objective lens unit 313, which is caused when the third light beam is incident on the diffraction optical element 311 as a diverging ray, more effectively than the comparative example 1a. Here, in order to further reduce the adverse effect of radial shifting of the objective lens unit 313, the diffracting face 311a of the diffraction optical element 311 on the side of the light source is made aspherical.

As described, for the first light beam L1, the optical pickup 300 of the present Example can attain the same level of wavefront aberration as can the comparative example 1a. For the third light beam L3, the optical pickup 300 can improve wavefront aberration more desirably than the comparative example 1a. As for the second light beam L2, the waveform aberration can also be suppressed at low level, even though wavefront aberration may be generated more than it is in the comparative example 1a depending on the shift amount of the objective lens unit 313 in the radial direction.

Figure 24:
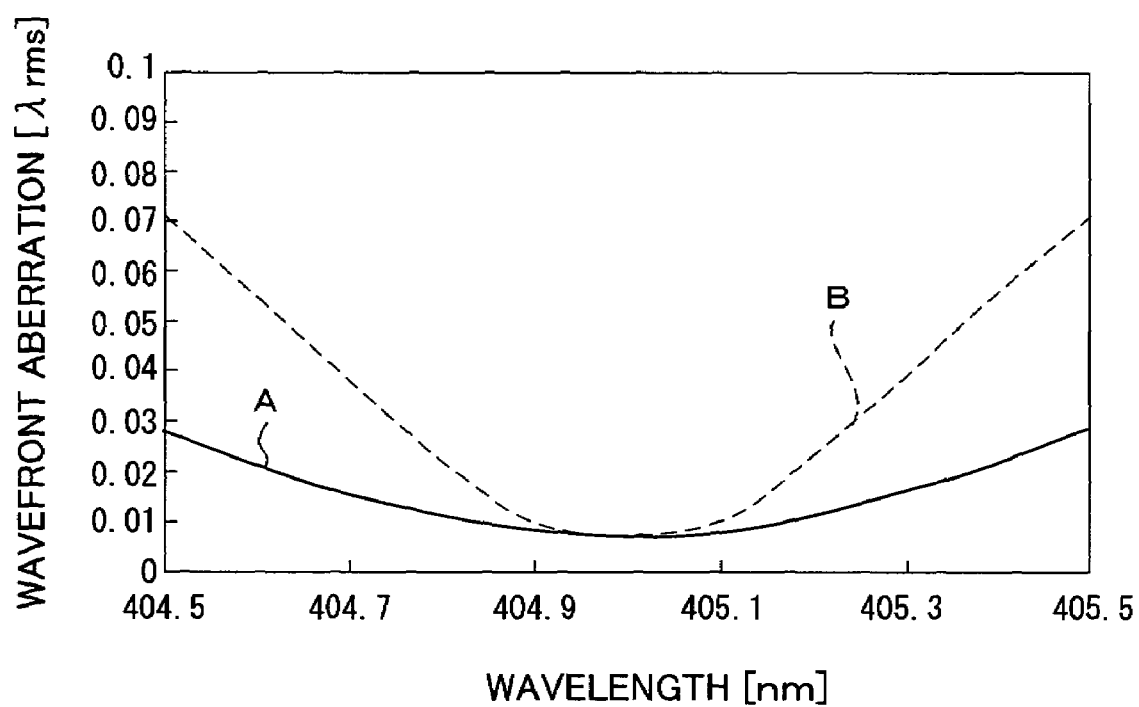
FIG. 24 is a graph representing a relationship between wavelength shifting of blue light and wavefront aberration according to the Example shown in FIG. 22(a) through FIG. 22(c).

FIG. 24 represents changes in wavefront aberration λrms with respect to shifting of the wavelength in the first light beam L1, as indicated by solid line, when the first light beam is focused on the first disk 14a using the optical pickup 300 of the present Example. Further, broken line in FIG. 24 indicates the result when an optical pickup (comparative example 1b) prepared for comparison was used. The comparative example 1b was prepared to include an objective lens unit solely made up of the objective lens 312 (objective lens 312 designated for the first light beam L1) used in the optical pickup 300 of the present Example. It should be noted here that the wavefront aberration for each wavelength is the smallest wavefront aberration that provides the best focusing with a given wavelength.

As shown in FIG. 24, the optical pickup 300 of the present Example has a wider range of available wavelengths than the comparative example 1b. This is because the optical pickup 300 of the present Example includes the diffraction optical element 311 made with the converging diffraction grating and the planoconcave lens. The wavelength dependant characteristic can thus be improved over the case of solely using the objective lens designated for the first light beam.

Generally, the high NA objective lens used for the next-generation high-density optical disk is made of glass with a high refractive index, and therefore has high wavelength dependency. Therefore, this type of objective lens causes difficulties in forming a desirable spot when a focal length is displaced by a large margin in response to wavelength fluctuations caused by, for example, mode hopping, which cannot be tracked by an actuator. On the other hand, the optical pickup 300 of the present example is capable of forming a desirable focused light spot even in the presence of wavelength fluctuations caused by, for example, mode hopping.

Further, in the optical pickup 300 of the present Example, the diffracting face of the diffraction optical element 311 is designed such that the second order component of the diffracted light is used for the first light beam, and the first order component of the diffracted light is used for the second and third light beams. Thus, as can be seen from FIG. 19, the depth of the diffraction grating can be set so that all the first, second and third light beams can be used with a 90% or higher efficiency. In this way, an optical pickup that can record and erase information requiring high power can easily be realized. In addition, the power of the light source can be reduced to suppress power consumption. Further, it also is possible to prevent unnecessary light other than the diffracted light from entering the detector, thereby suppressing degradation of signals.

EXAMPLE 7

Another Example of the present invention is described below with reference to FIGS. 25(a),(b),(c), FIGS. 26(a), (b), (c), FIG. 27 through FIG. 29.

Figure 25:
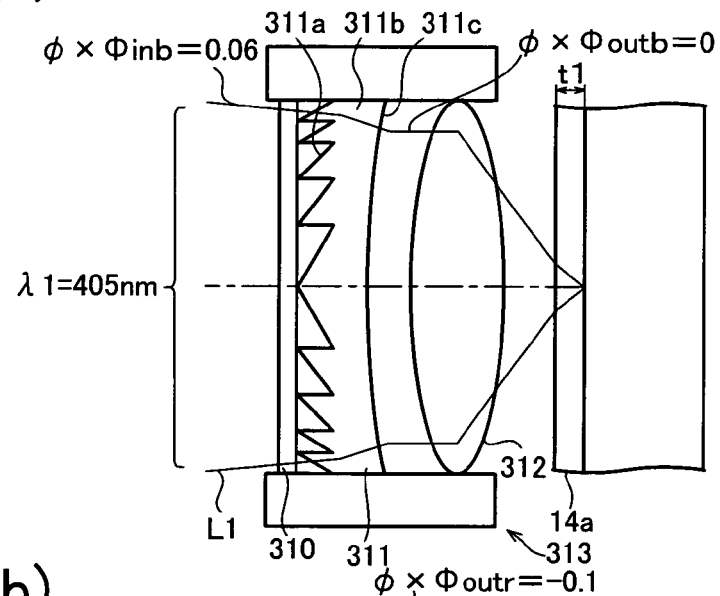
Figure 25:
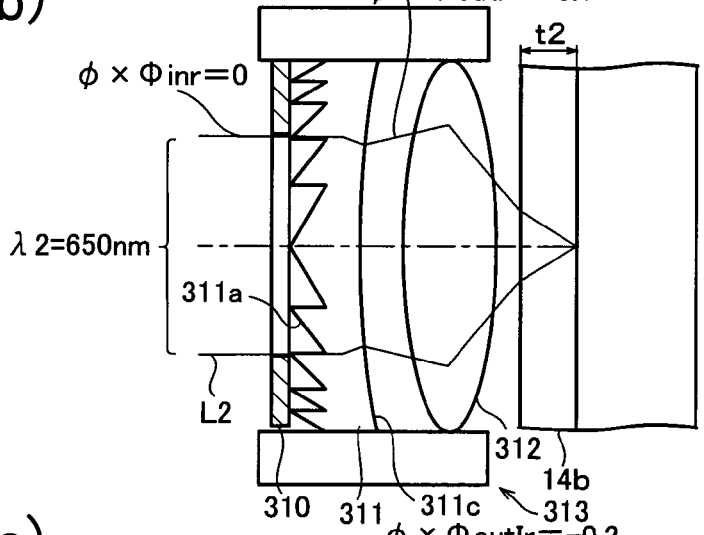
Figure 25:
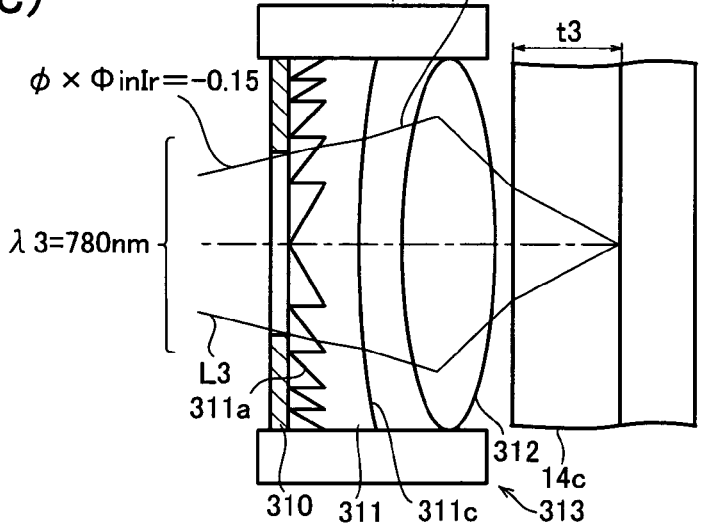

In this Example, as shown in FIG. 25(a), FIG. 25(b) and FIG. 25(c), the first beam is incident on the diffraction optical element 311 with a degree of convergence $\phi \times \Phi inb = 0.06$. Note that, as in Example 6 above, this Example also uses an objective lens 312 with an effective diameter $\phi = 3$ mm for the first light beam.

An optical pickup 300 of this Example is fabricated so that the first light beam is incident on the diffraction optical element 311 as a converging ray given by $\phi \times \Phi inb = 0.06$, while the second and third light beams are incident on the diffraction optical element 311 as a substantial parallel ray and a diverging ray, which are given by $\phi \times \Phi inr = 0$ and $\phi \times \Phi inIr = -0.15$, respectively. The diffracting face of the diffraction optical element 311 is designed such that the second order component of the diffracted light is used for the first light beam, and the first order component of the diffracted light is used for the second and third light beams.

The diffraction optical element 311 is made with a concave face and a diffraction grating, and is disposed on the side of the light source opposite the aspherical objective lens 312. The concave face is spherical and has a curvature radius of 5 mm.

Here, the concave face is spherical because it is easier to fabricate. However, the concave face may be aspherical to improve the shifting characteristic of the objective lens unit 313 in the radial direction.

In the optical pickup 300 of this Example, as shown in FIG. 25(a), for the first optical disk 14a, the first light beam L1 is incident on the diffraction optical element 311 as a converging ray given by $\phi \times \Phi inb = 0.06$, and the light beam diffracted in a second order diffraction direction (converging direction with respect to the optical axis) on the diffracting face is refracted in a diverging direction on the concave face so that the light beam is incident on the objective lens 312 as a parallel ray and is focused on the first optical disk 14a having a 0.1 mm thick light transmissive layer. In this way, desirable light focusing characteristics are obtained.

For the second optical disk 14b, as shown in FIG. 25(b), the second light beam L2 is incident on the diffraction optical element 311 as a substantial parallel ray given by $\phi \times \Phi inr = 0$, and the light beam diffracted in a first order diffraction direction (converging direction with respect to the optical axis) on the diffracting face is refracted in the diverging direction on the concave face so that the light beam is incident on the objective lens 312 with a predetermined degree of divergence ($\phi \times \Phi outr = -0.1$ in this example). In this way, desirable light focusing characteristics are obtained for the second optical disk 14b having a 0.6 mm thick light transmissive layer.

Here, the provision of the diffraction optical element 311 enables the light beam to be incident on the objective lens 312 as a diverging ray and on the objective lens unit 313 as a parallel ray, thereby reducing the adverse effect of radial shifting of the objective lens unit 313.

For the third optical disk 14c, as shown in FIG. 25(c), when the third light beam L3 is incident on the diffraction optical element 311 as a diverging ray given by $\phi \times \Phi inIr = -0.15$, the light beam is diffracted at the diffracting face in a first order diffraction direction (converging direction with respect to the optical axis), and is refracted on the concave face in a diverging direction so that the light beam is incident on the objective lens 312 with a predetermined degree of divergence ($\phi \times \Phi outIr = -0.2$ in this example). In this way, desirable light focusing characteristics are obtained for the third optical disk 14c having a 1.2 mm thick light transmissive layer.

Here, the provision of the diffraction optical element 311 enables the light beam to be incident on the objective lens unit 313 with a smaller degree of divergence than when it is incident on the objective lens 312, thereby reducing the adverse effect of radial of the objective lens unit 313.

Figure 26:
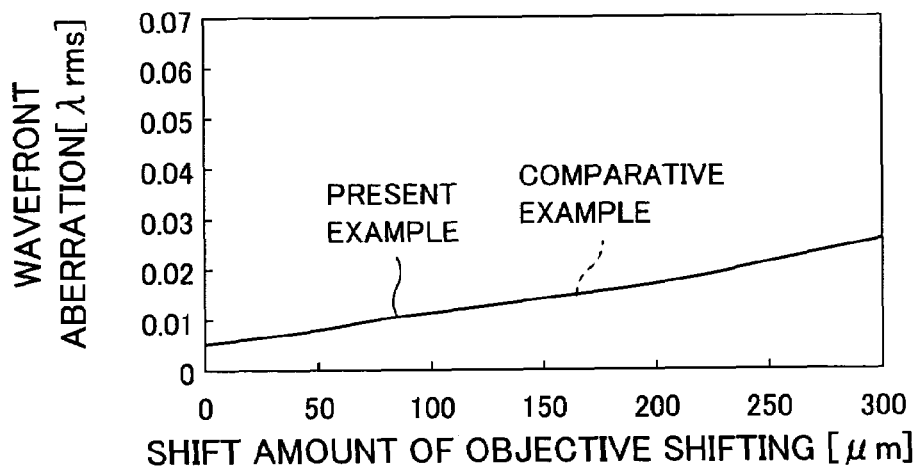
FIG. 26(a) through FIG. 26(c) are graphs representing a relationship between shift amount of objective shifting and wavefront aberration, comparing the Example shown in FIG. 25(a) through FIG. 25(c) with a comparative example.
Figure 26:
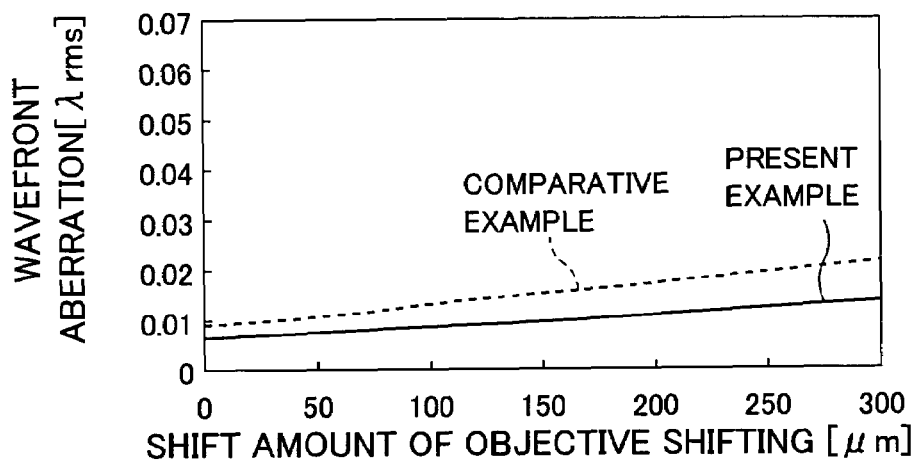
Figure 26:
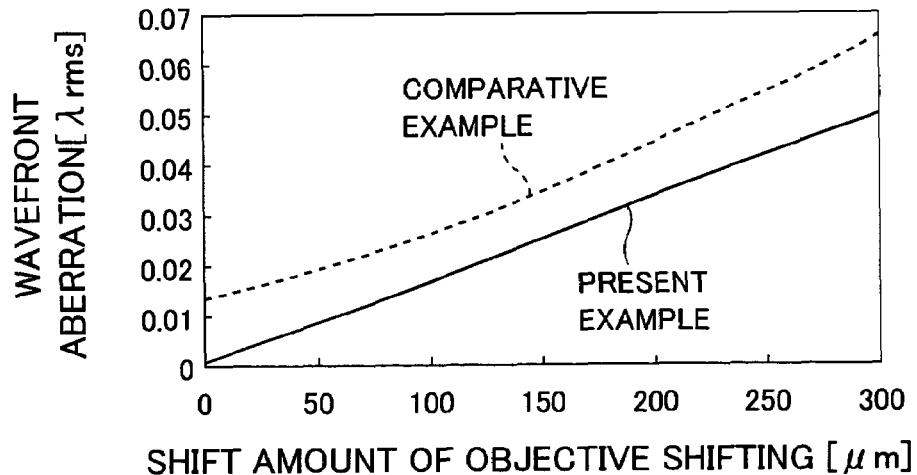

FIG. 26(a), FIG. 26(b) and FIG. 26(c) represent changes in wavefront aberration $\lambda$rms on an image surface with respect to an amount of shifting (objective shifting) of the objective lens unit 313 in the radial direction, as indicated by solid line, when the first, second and third light beams are respectively focused on the first, second and third disks 14a, 14b, and 14c by using the optical pickup 300 prepared in this Example. Further, broken line in FIG. 26(a), FIG. 26(b) and FIG. 26(c) indicates the results when an optical pickup (comparative example 2a) prepared for comparison was used. Note that, FIG. 26(a) shows the result when the first light beam L1 was focused on the first optical disk 14a, and FIG. 26(b) shows the result when the second light beam L2 was focused on the second optical disk 14b, and FIG. 26(c) shows the result when the third light beam L3 was focused on the third optical disk 14c.

The comparative example 2a was prepared to optimize wavefront aberration in such a manner that the first light beam is incident on the objective lens as a parallel ray, and the second and third light beams are incident on the objective lens as predetermined diverging rays so as to compensate for the spherical aberration caused by the thickness difference of the light transmissive layers. Further, in order to optimize wavefront aberration, an aspherical lens is inserted in the optical paths of the diverging rays so as to prevent impairment of shifting characteristics of the objective lens. Note that, the comparative example 2a is identical with the foregoing comparative example 1a.

As can be seen from FIG. 26(a), the use of the optical pickup 300 of the present Example makes it possible to suppress the adverse effect of radial shifting of the objective lens unit 313, in addition to forming a desirable focused light spot on the first optical disk 14a.

Further, by causing the second light beam to be incident on the diffraction optical element 311 as a substantial parallel ray, the optical pickup 300 of the present Example can suppress the adverse effect of radial shifting of the objective lens unit 313 more effectively than the comparative example 2a, as shown in FIG. 26(b).

Further, as can be seen FIG. 23(c), compared with the comparative example 2a, the use of the optical pickup 300 of the present Example makes it possible to further reduce the adverse effect of radial shifting of the objective lens unit 313, which is caused when the third light beam is incident on the diffraction optical element 311 as a diverging ray. Here, in order to further reduce the adverse effect of radial shifting of the objective lens unit 313, the diffracting face 311a of the diffraction optical element 311 on the side of the light source is made aspherical.

As described, with the optical pickup 300 of the present example, the wavefront aberration caused on the first, second, and third optical disks 14a, 14b, and 14c can be reduced more effectively than the comparative example 2a.

Figure 27:
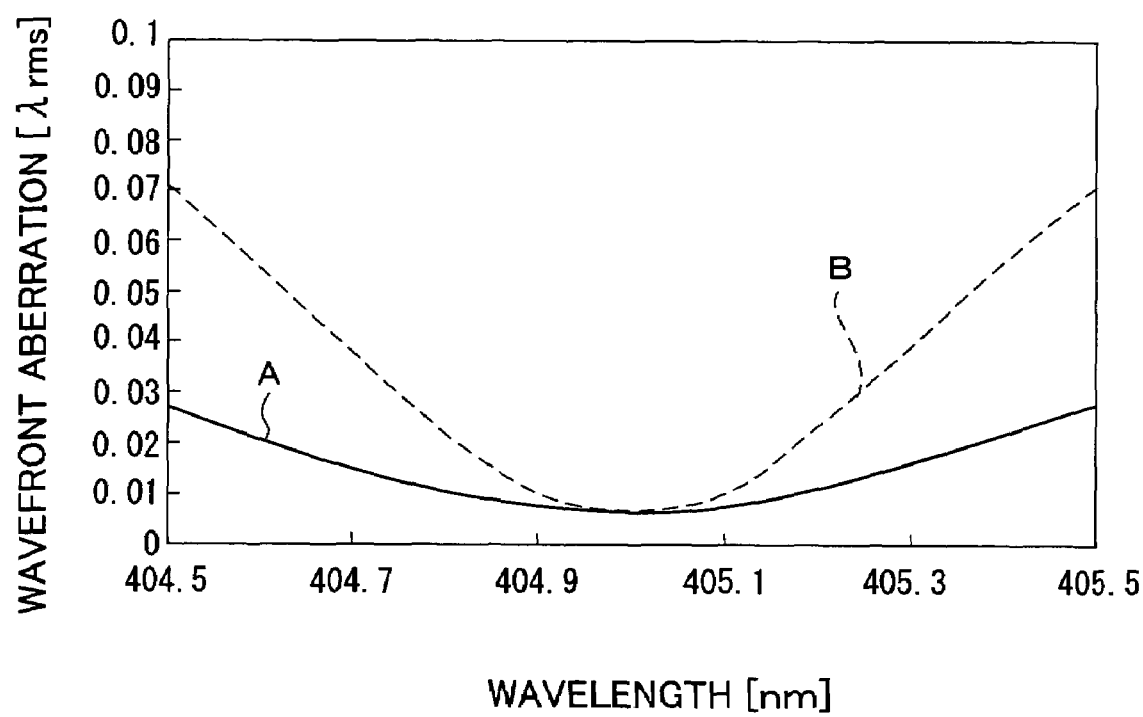
FIG. 27 is a graph representing a relationship between wavelength shifting of blue light and wavefront aberration according to the Example shown in FIG. 25(a) through FIG. 25(c).

FIG. 27 represents changes in wavefront aberration $\lambda$rms with respect to shifting of the wavelength of the first light beam L1, as indicated by solid line, when the first light beam L1 is focused on the first disk 14a using the optical pickup 300 of the present Example. Further, broken line in FIG. 27 indicates the result when an optical pickup (comparative example 2b, identical with the comparative example 1b) prepared for comparison was used. The comparative example 2b was prepared to include an objective lens unit solely made up of the objective lens 312 (objective lens 312 designated for the first light beam) used in the optical pickup 300 of the present Example. It should be noted here that the wavefront aberration for each wavelength is the smallest wavefront aberration that provides the best focusing with a given wavelength.

As shown in FIG. 27, the optical pickup 300 of the present example has a wider range of available wavelengths than the comparative example 2b. This is because the optical pickup 300 of the present Example includes the diffraction optical element 311 made with the converging diffraction grating and the planoconcave lens. The wavelength dependant characteristics can thus be improved over the case of solely using the objective lens designated for the first light beam. Further, the optical pickup 300 of the present Example is also able to form a desirable focused light spot even in the presence of waveform fluctuations caused by, for example, mode hopping.

Further, in the optical pickup 300 of the present example, the diffracting face of the diffraction optical element 311 is designed such that the second order component of the diffracted light is used for the first light beam L1, and the first order component of the diffracted light is used for the second and third light beams. Thus, as can be seen from FIG. 19, the depth of the diffraction grating can be set so that all the first, second and third light beams can be used with a 90% or higher efficiency. In this way, an optical pickup that can record and erase information requiring high power can easily be realized. In addition, the power of the light source can be reduced to suppress power consumption. Further, it also is possible to prevent unnecessary light other than the diffracted light from entering the detector, thereby suppressing degradation of signals.

Figure 28:
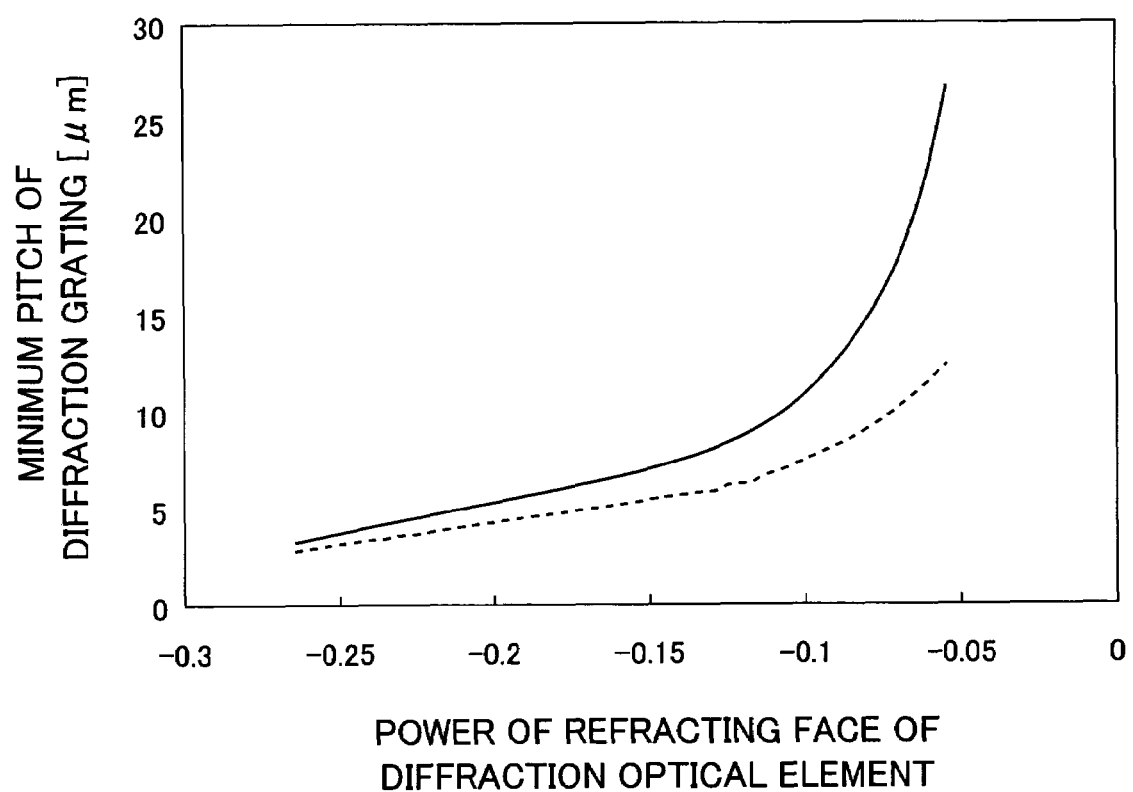
FIG. 28 is a graph representing a relationship between power and minimum pitch of a refracting face of the diffraction optical element according to the Example shown in FIG. 25(a) through FIG. 25(c).

Here, FIG. 28 shows a relationship between power of the refracting face of the diffraction optical element 311 for the first light beam and minimum grating pitch of the diffracting face, when the first light beam L1 is incident on the diffraction optical element 311 with a degree of convergence or divergence $\phi \times \Phi inb=0.06$. In the figure, solid line denotes a concave refracting face, and broken line denotes a convex refracting face. As FIG. 28 indicates, the minimum pitch of the diffracting face can be increased when the refracting face is concave and when the power of the refracting face has a small absolute value. A higher minimum pitch enables the diffraction optical element 311 to be fabricated more easily. Further, it becomes possible to reduce the aberration caused by decentering of the diffracting face and the refracting face.

Figure 29:
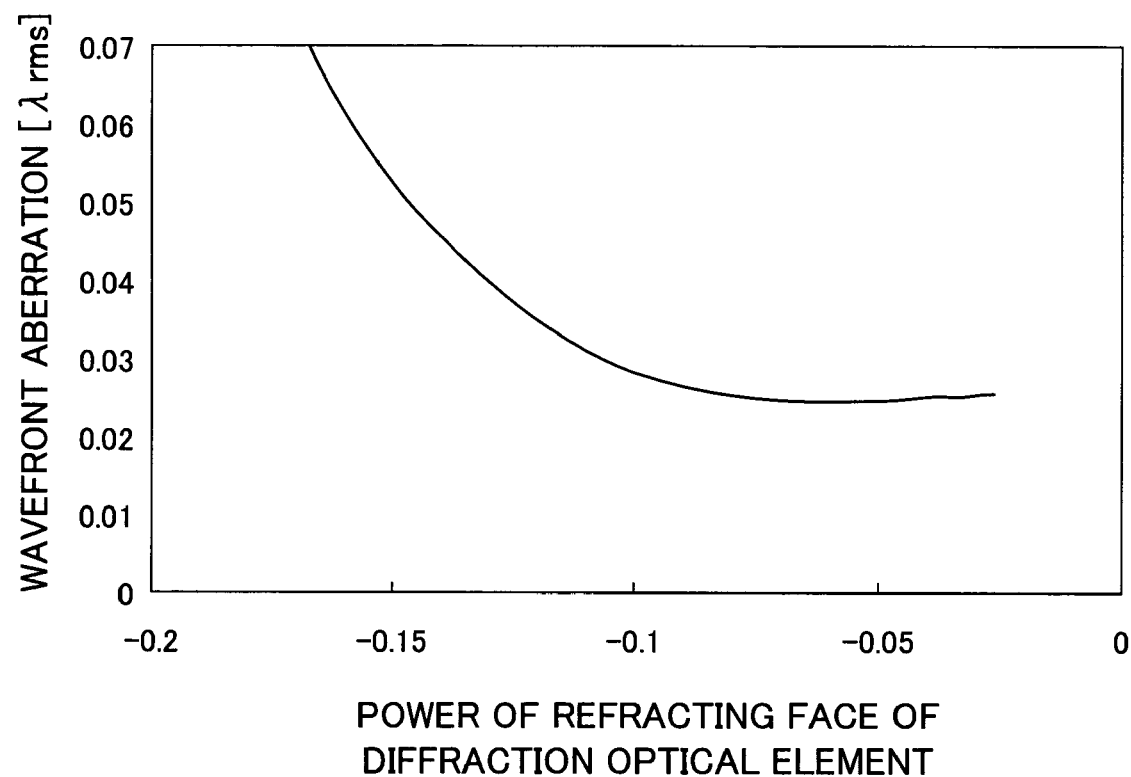
FIG. 29 is a graph according to the Example shown in FIG. 25(a) through FIG. 25(c), representing a relationship between power of a refracting face of the diffraction optical element and wavefront aberration in blue light when the shift amount of objective shifting is 200 μm.

Further, FIG. 29 shows a relationship between power of the refracting face of the diffraction optical element 311 for the first light beam L1 and wavefront aberration when the amount of radial shifting (objective shifting) of the objective lens unit 313 is 200 μm, when the first light beam L1 is incident on the diffraction optical element 311 with a degree of convergence or divergence $\phi \times \Phi inb=0.06$. As FIG. 29 indicates, the wavefront aberration is generated abruptly when the power of the refracting face of the diffraction optical element 311 falls below −0.1. Accordingly, it is preferable that the power of the refracting face is −0.1 or greater.

EXAMPLE 8

Figure 30:
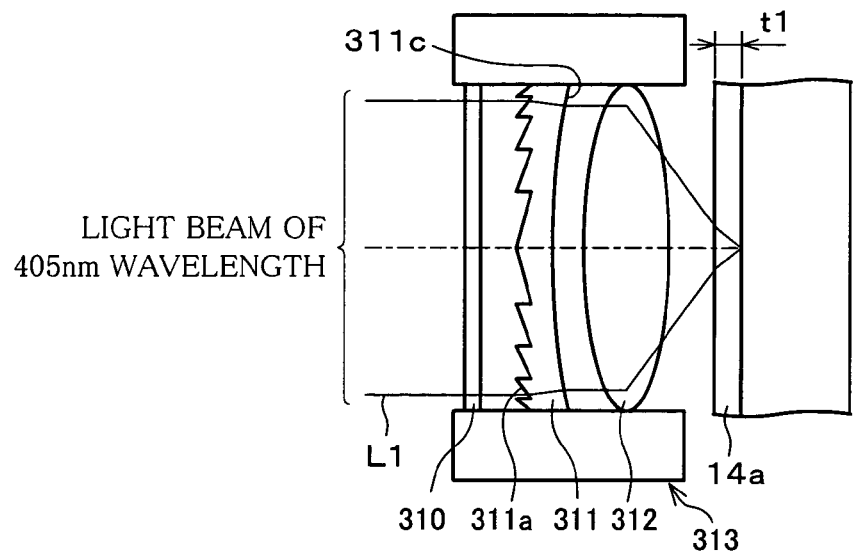
Figure 30:
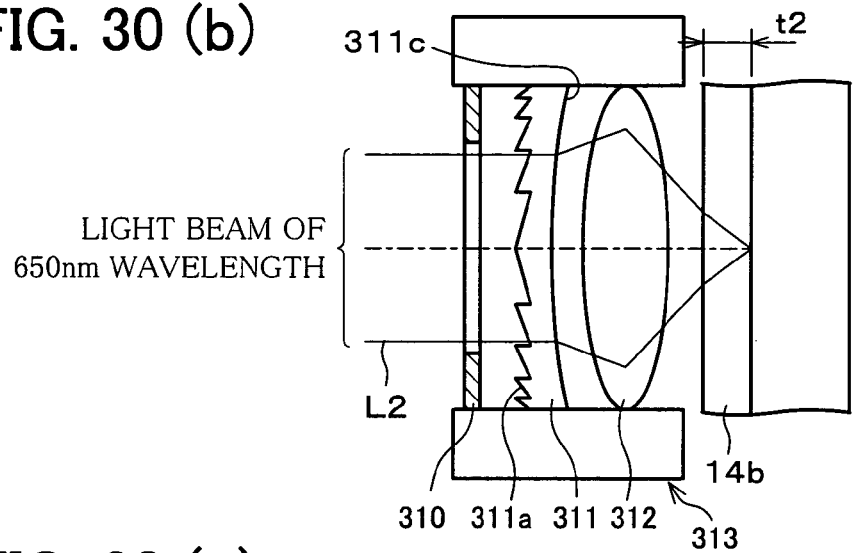
Figure 30:
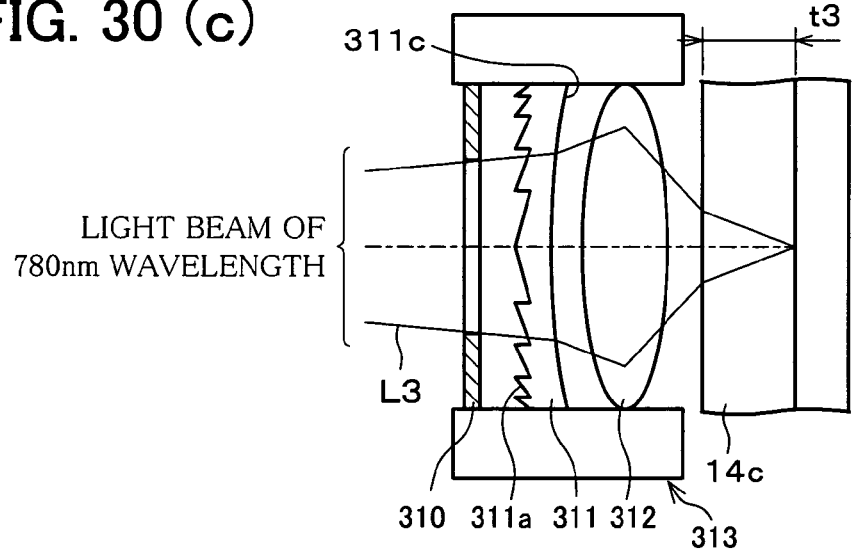
Figure 31:
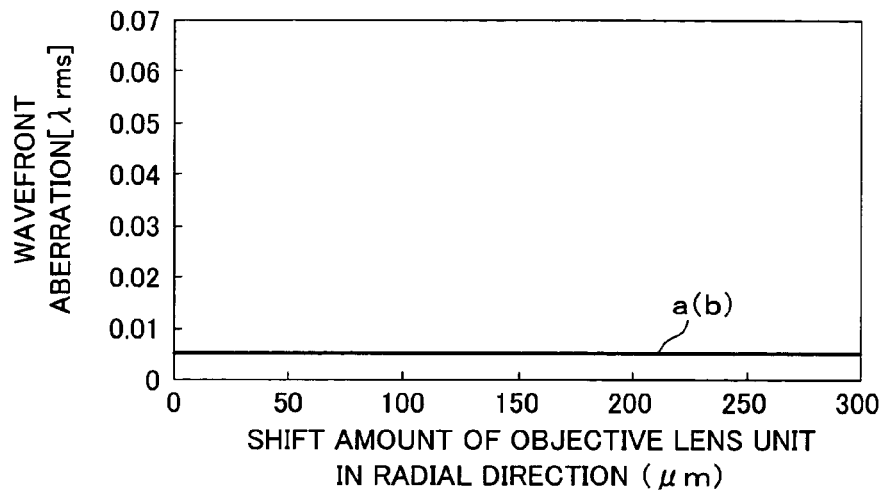
FIG. 31(a) through FIG. 31(c) are graphs representing a relationship between shift amount of objective shifting and wavefront aberration, comparing the Example shown in FIG. 30(a) through FIG. 30(c) with a comparative example.
Figure 31:
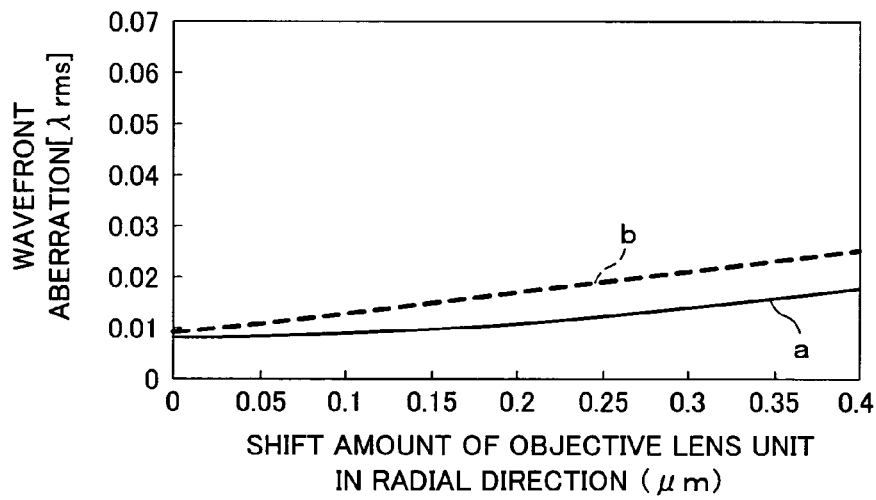
Figure 31:
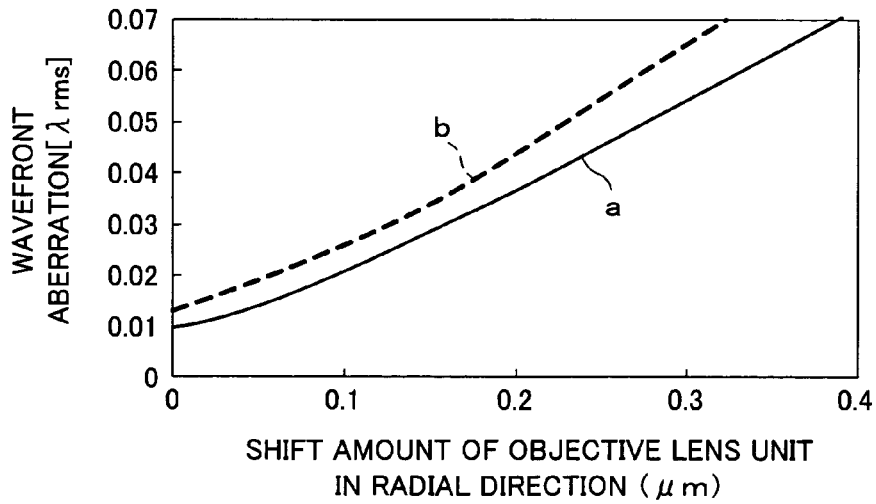
Figure 32:
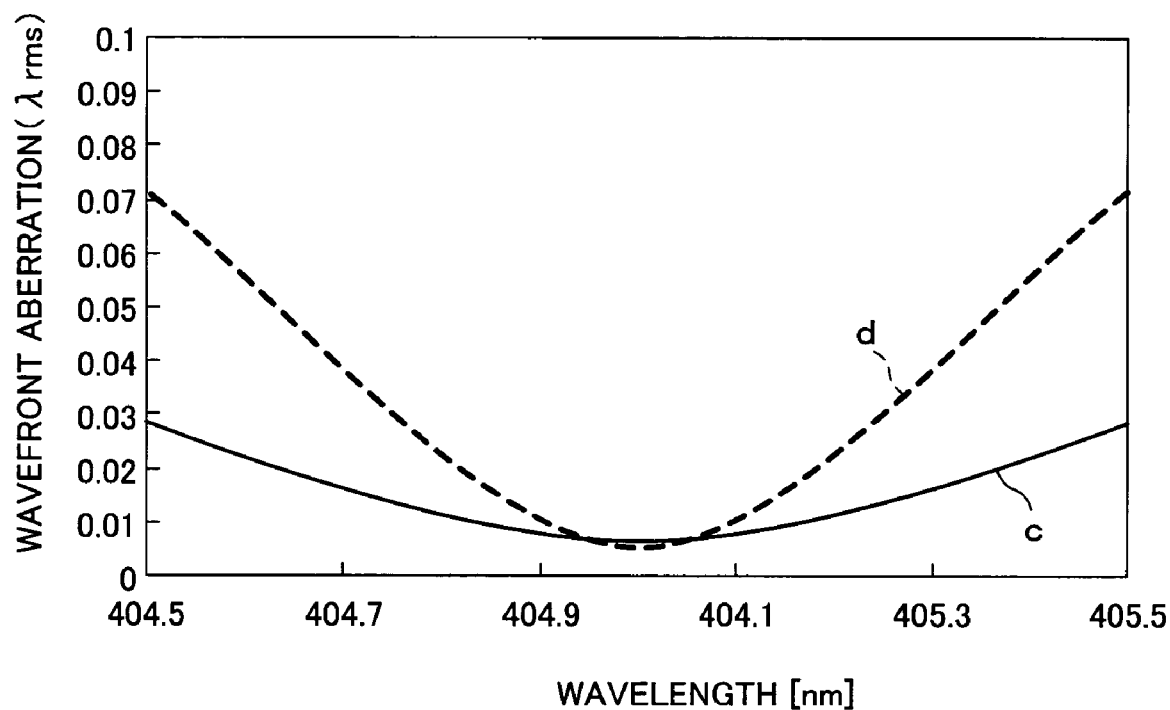
FIG. 32 is a graph representing a relationship between wavelength shifting of blue light and wavefront aberration according to the Example shown in FIG. 30(a) through FIG. 30(c).

The following will explain another Example of the present invention with reference to FIGS. 30(a), (b), (c), FIGS. 31(a), (b), (c), and FIG. 32.

In this Example, as shown in FIG. 30(a), FIG. 30(b) and FIG. 30(c), the first light beam is incident on the diffraction optical element 311 as a parallel ray.

The optical pickup 300 of the present example has such an arrangement that the first light beam L1 is incident on the diffraction optical element 311 as a parallel ray, so that the adverse effect of radial shifting of the objective lens unit 313 can be eliminated almost completely for the first light beam L1 which requires the more accurate light focusing characteristic. That is, the first light beam L1 is incident on the diffraction optical element 311 with a degree of convergence or divergence $\phi \times \Phi inb=0$. Note that, this Example uses an objective lens 312 with an effective diameter $\phi=3$ mm for the first light beam L1.

The optical pickup 300 of this Example is fabricated so that the first and second light beams L1, L2 are incident on a diffraction optical element 311 as parallel rays, while the third light beam L3 is incident on the diffraction optical element 311 as a diverging ray. The diffracting face of the diffraction optical element 311 is designed such that the first order component of the diffracted light is used for the first light beam, and the zeroth order component of the diffracted light is used for the second and third light beams.

The diffraction optical element 311 is made with a concave face 311c (refracting face V) and a diffraction grating 311a, and is disposed on the side of the light source opposite the aspherical objective lens 312. The concave face 311c is aspherical.

Here, since the concave face 311c is aspherical, the spherical aberration, which is caused by the thickness difference of the light transmissive layers of the second and third optical disks 14b and 14c, can be compensated for more effectively. In addition, the shifting characteristics of the objective lens unit 313 in the radial direction can be improved, thereby obtaining a desirable light focusing characteristic.

In the optical pickup 300 of this Example, as shown in FIG. 30(a), for the first optical disk 14a, the first light beam is incident on the diffraction optical element 311 as a parallel ray, and the light beam L1 diffracted in a first order diffraction direction (converging direction with respect to the optical axis) on the diffracting face of the diffraction grating 311a is refracted in a diverging direction on the concave face 311c so that the light beam is incident on the objective lens 312 as a parallel ray and is focused on the first optical disk 14a having a 0.1 mm thick light transmissive layer. In this way, a desirable light focusing characteristic is obtained.

For the second optical disk 14b, as shown in FIG. 30(b), when the second light beam is incident on the diffraction optical element 311 as a substantial parallel ray, the second light beam, by not being diffracted on the diffracting face, is refracted in a diverging direction on the concave face 311c, so that the light beam is incident on the objective lens 312 with a predetermined degree of divergence ($\phi \times \Phi outr=-0.03$ in this Example). In this way, a desirable light focusing characteristic is obtained for the second optical disk 14b having a 0.6 mm thick light transmissive layer. Further, with the aspherical concave face 311c, persisting spherical aberrations can be compensated for, and impairment of shifting characteristic of the objective lens unit 313 can be suppressed, thereby obtaining more desirable light focusing characteristics.

Here, the provision of the diffraction optical element 311 enables the second light beam L2 to be incident on the objective lens 312 with a predetermined degree of divergence, even when the second light beam L2 is incident on the objective lens unit 313 as a substantial parallel ray, thereby reducing the adverse effect of radial shifting of the objective lens unit 313.

For the third optical disk 14c, as shown in FIG. 30(c), when the third light beam L3 is incident on the diffraction optical element 311 as a diverging ray, the light beam that was not diffracted on the diffracting face is refracted in a diverging direction on the concave face 311c, so that the light beam is incident on the objective lens 312 with a predetermined degree of divergence ($\phi \times \Phi outlr = -0.07$ in this Example). In this way, a desirable light focusing characteristic is obtained for the third optical disk 14c having a 1.2 mm thick light transmissive layer. In addition, the spherical aberration that persists despite the aspherical concave face can be compensated for, and impairment of shifting characteristics of the objective lens unit 313 can be suppressed, thereby obtaining desirable light focusing characteristics.

Here, the provision of the diffraction optical element 311 enables the light beam to be incident on the objective lens unit 313 with a smaller degree of divergence than when it is incident on the objective lens 312, thereby reducing the adverse effect of radial shifting of the objective lens unit 313.

Further, in the optical pickup 300 of the present example, the diffracting face of the diffraction optical element 311 is designed such that the first order component of the diffracted light is used for the first light beam, and the zeroth order component of the diffracted light is used for the second and third light beams. In this way, an optical pickup that can record and erase information requiring high power can easily be realized. In addition, the power of the light source can be reduced to suppress power consumption.

Further, in the present example, the provision of the diffraction optical element 311 including the converging diffracting face and the concave face enables a light beam to be incident on the objective lens 312 with a predetermined degree of divergence even when the light beam is incident on the objective lens unit 313 as a weak diverging ray. Accordingly, the adverse effect of radial shifting of the objective lens unit 313 can be reduced. In addition, the semiconductor lasers 1a, 1b, and 1c can be provided at a distant position from the objective lens unit 313, allowing the semiconductor lasers 1a, 1b, and 1c to be disposed more flexibly. Further, since the diffraction optical element 311 is made with the converging diffracting face and the concave refracting face, the optical pickup 300 of the present example has a wider range of available wavelengths than the optical pickup designated for the first optical disk 14a. As a result, the wavelength dependant characteristics can be improved over the case of solely using the objective lens designated for the first optical disk 14a. Thus, with this configuration, desirable light focusing characteristics can be maintained even in the presence of wavelength fluctuations caused by, for example, mode hopping. Further, it also possible to increase the minimum pitch of the diffracting face of the diffraction optical element 311, enabling the diffraction optical element 311 to be easily fabricated.

FIG. 31(a), FIG. 31(b) and FIG. 31(c) represent changes in wavefront aberration λrms on an image surface with respect to an amount of shifting (objective shifting) of the objective lens unit 313 in the radial direction, as indicated by solid line, when the first, second and third light beams are respectively focused on the first, second and third disks 14a, 14b, and 14c using the optical pickup 300 prepared in this Example. Further, broken line in FIG. 31(a), FIG. 31(b) and FIG. 31(c) indicate the results when an optical pickup ("comparative optical pickup (I)" hereinafter) prepared for comparison was used. Note that, FIG. 31(a) shows the result when the first light beam was focused on the first optical disk 14a, and FIG. 31(b) shows the result when the second light beam was focused on the second optical disk 14b, and FIG. 31(c) shows the result when the third light beam was focused on the third optical disk 14c. Note that, as noted above, the term "spherical aberration" refers to an amount of aberration.

The comparative optical pickup was prepared to optimize wavefront aberration in such a manner that the first light beam is incident on the objective lens as a parallel ray, and the second and third light beams are incident on the objective lens as predetermined diverging rays so as to compensate for the spherical aberration caused by the thickness difference of the light transmissive layers. Further, in order to optimize wavefront aberration, an aspherical lens is inserted in the optical paths of the diverging rays so as to prevent impairment of shifting characteristics of the objective lens.

As can be seen from FIG. 31(a), the use of the optical pickup 300 of the present Example makes it possible to suppress the adverse effect of radial shifting of the objective lens unit 313, in addition to forming a desirable focused light spot on the first optical disk 14a.

Further, by causing the second light beam to be incident on the diffraction optical element 311 as a substantial parallel ray, the optical pickup 300 of the present Example makes it possible to suppress the adverse effect of radial shifting of the objective lens unit 313 more effectively than the comparative optical pickup, as shown in FIG. 31(b).

Further, as can be seen from FIG. 31(c), the use of the optical pickup 300 of the present Example makes it possible to form a desirable light spot on the third optical disk 14c. Further, with the optical pickup 300 of the present Example, the adverse effect of radial shifting of the objective lens unit 313, which is caused when the third light beam is incident on the diffraction optical element 311 as a diverging ray, can be reduced more effectively than the comparative optical pickup.

As described, for the first light beam, the optical pickup 300 of the present Example can attain the same level of wavefront aberration as can the comparative optical pickup. For the second and third light beams, wavefront aberration can be improved more desirably over the comparative example 1a.

FIG. 32 represents changes in wavefront aberration λrms with respect to shifting of the wavelength of the first light beam, as indicated by solid line, when the first light beam is focused on the first disk 14a using the optical pickup 300 of the present Example. Further, broken line in FIG. 32 indicates the result when an optical pickup prepared for comparison was used. The comparative optical pickup was prepared to include an objective lens unit solely made up of the objective lens 312 (objective lens 312 designated for the first light beam) used in the optical pickup 300 of the present Example. It should be noted here that the wavefront aberration for each wavelength is the smallest wavefront aberration that provides the best focusing with a given wavelength.

As shown in FIG. 32, the optical pickup 300 of the present Example has a wider range of available wavelengths than the comparative optical pickup. Further, in response to wavelength fluctuations caused by, for example, mode hopping that cannot be tracked by an actuator, the optical pickup 300 of the present Example causes less aberration than the optical pickup designated for the first optical disk 14a. This is because the optical pickup 300 of the present example includes the diffraction optical element 311 made with the converging diffraction grating 311a and the planoconcave lens. The wavelength dependant characteristics can thus be improved over the case of solely using the objective lens designated for the first light beam.

Generally, the high NA objective lens used for the next-generation high-density optical disk is made of glass with a high refractive index, and therefore has high wavelength dependency. Therefore, this type of objective lens causes difficulties in forming a desirable spot when a focal length is displaced by a large margin in response to wavelength fluctuations caused by, for example, mode hopping that cannot be tracked by an actuator. On the other hand, the optical pickup 300 of the present example can form a desirable focused light spot even in the presence of wavelength fluctuations caused by, for example, mode hopping.

EXAMPLE 9

Figure 33:
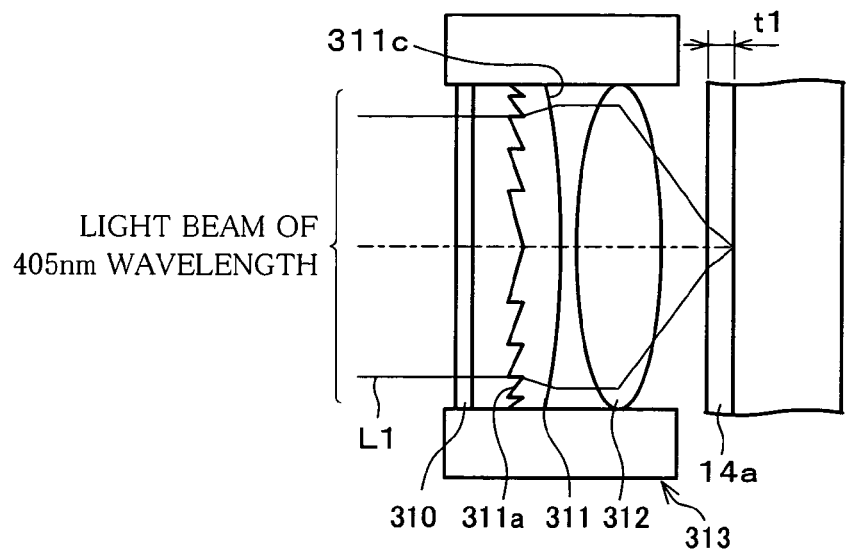
Figure 33:
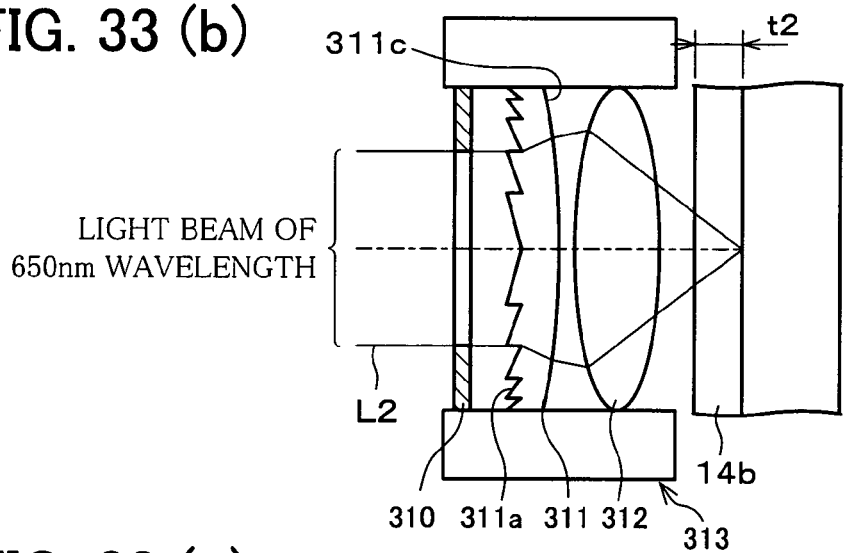
Figure 33:
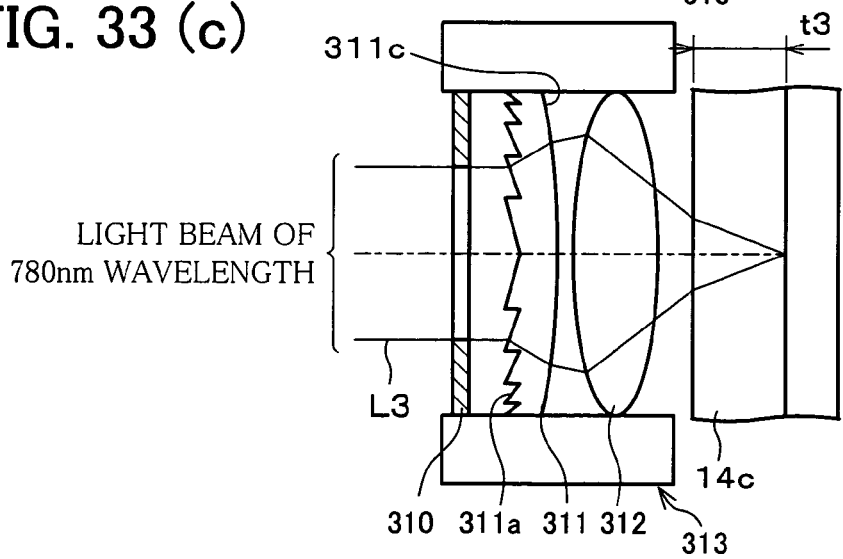
Figure 34:
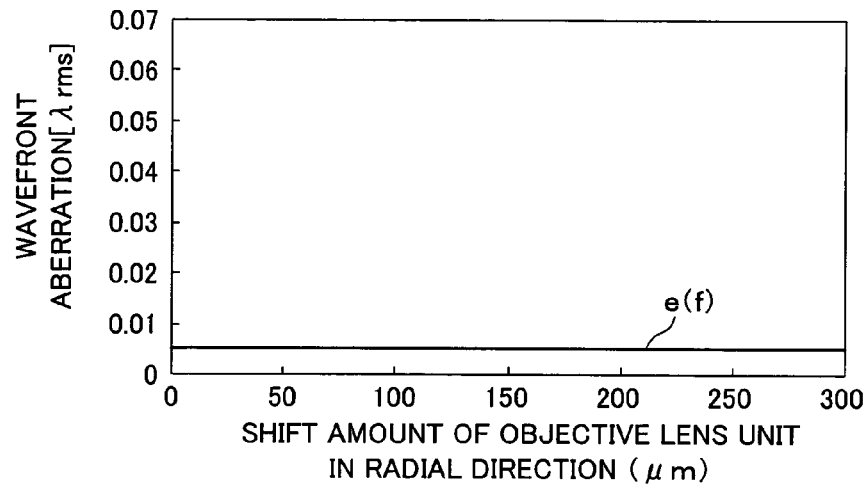
FIG. 34(a) through FIG. 34(c) are graphs representing a relationship between shift amount of objective shifting and wavefront aberration, comparing the Example shown in FIG. 30(a) through FIG. 30(c) with a comparative example.
Figure 34:
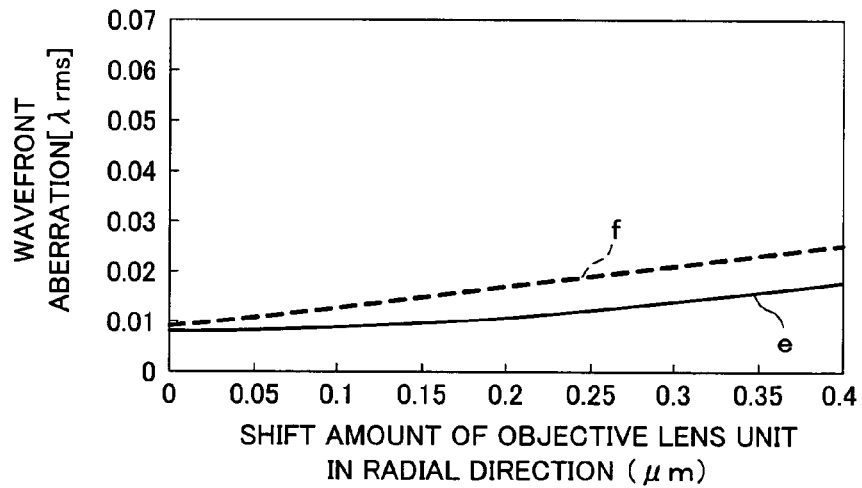
Figure 34:
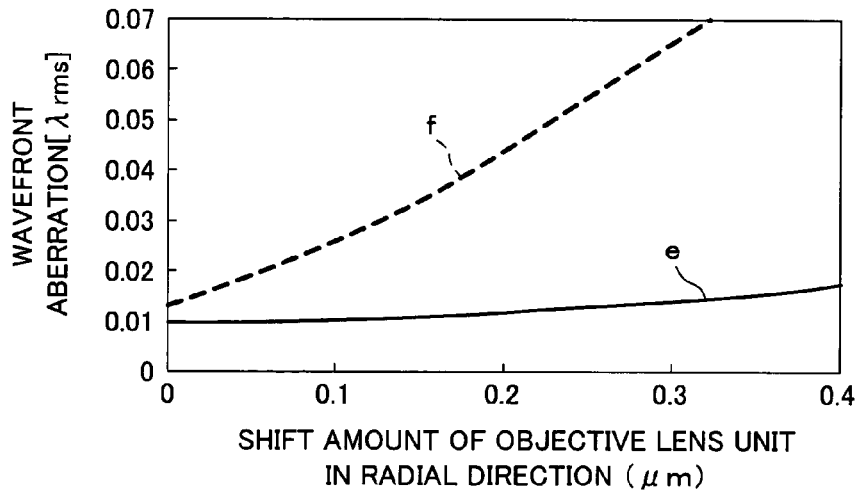
Figure 35:
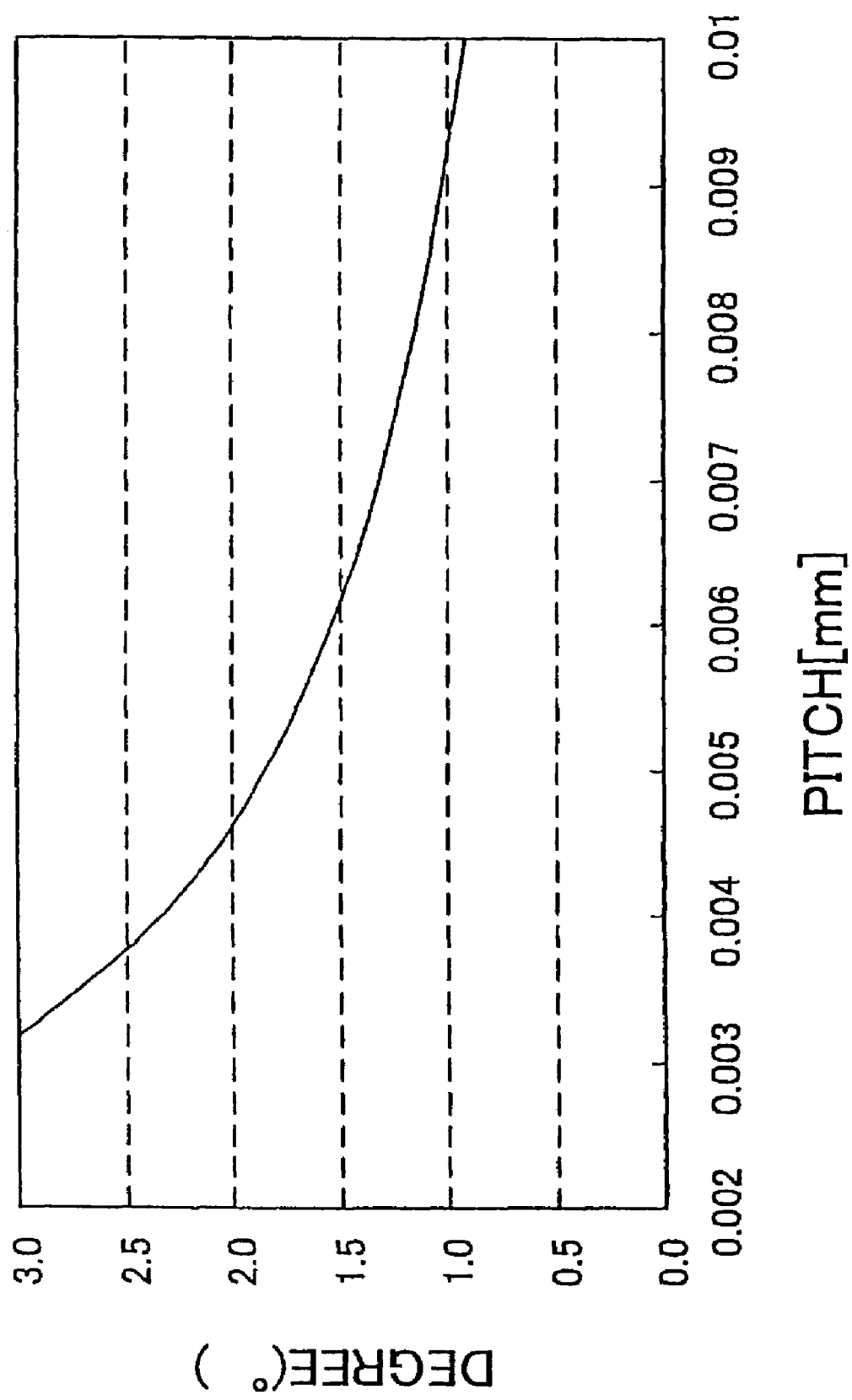
FIG. 35 is a graph representing a relationship between pitch of a diffraction grating of the diffraction optical element and diffraction angle difference of the diffraction optical element.
Figure 36:
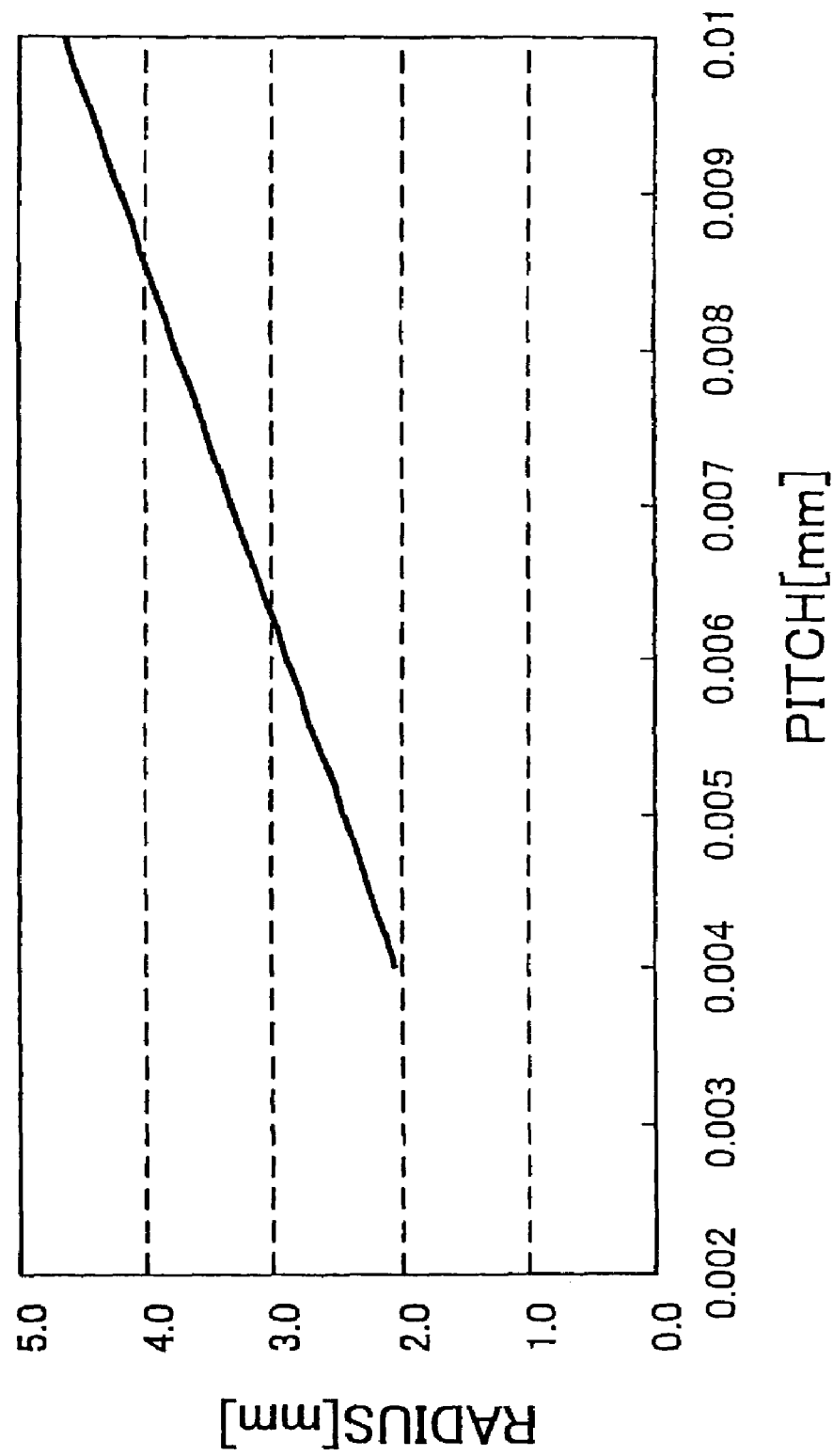
FIG. 36 is a graph representing a relationship between pitch of the diffraction grating and curvature of the refracting face of the diffraction optical element, when an incident parallel ray of blue light on the diffraction optical element emerges from the diffraction optical element as a parallel ray.

The following will explain another Example of the present invention with reference to FIGS. 32(a), (b), (c), FIGS. 33(a), (b), (c), and FIG. 34.

In this Example, as shown in FIG. 33(a), FIG. 33(b) and FIG. 33(c), the first light beam is incident on the diffraction optical element 311 as a parallel ray.

The optical pickup 300 of the present Example has such an arrangement that the first light beam L1 is incident on the diffraction optical element 311 as a parallel ray, so that the adverse effect of radial shifting of the objective lens unit 313 can be eliminated almost completely for the first light beam L1 which requires a more accurate light focusing characteristic. That is, the first light beam is incident on the diffraction optical element 311 with a degree of convergence or divergence $\phi \times \Phi inb=0$, as it is for Example 8. Note that, the present example uses an objective lens 312 with an effective diameter $\phi=3$ mm for the first light beam, as in Example 1.

The optical pickup 300 of this example is fabricated so that the first and second light beams are incident on a diffraction optical element 311 as parallel rays, while the third light beam is incident on the diffraction optical element 311 as a diverging ray. The diffracting face of the diffraction optical element 311 is designed such that the first order component of the diffracted light is used for all of the first, second, third light beams.

The diffraction optical element 311 is made with a convex face 311c (refracting face V) and a diffraction grating 311a, and is disposed on the side of the light source opposite the objective lens 312. The convex face is aspherical.

Here, with the aspherical convex face, shifting characteristics of the objective lens unit 313 in the radial direction can be improved.

In the optical pickup 300 of this Example, as shown in FIG. 33(a), for the first optical disk 14a, the first light beam L1 is incident on the diffraction optical element 311 as a parallel ray, and the light beam diffracted in a first order diffraction direction (converging direction with respect to the optical axis) on the diffracting face of the diffraction grating 311a is refracted in a diverging direction on the convex face 311c so that the light beam is incident on the objective lens 312 as a parallel ray and is focused on the first optical disk 14a having a 0.1 mm thick light transmissive layer. In this way, a desirable light focusing characteristic is obtained.

For the second optical disk 14b, as shown in FIG. 33(b), when the second light beam L2 is incident on the diffraction optical element 311 as a substantial parallel ray, the light beam diffracted on the diffraction face of the diffraction grating 311a in a first order diffraction direction (diverging direction with respect to the optical axis) is refracted in a diverging direction on the convex face 311c, so that the light beam is incident on the objective lens 312 with a predetermined degree of divergence ($\phi \times \Phi outr=-0.03$ in this Example 9). In this way, a desirable light focusing characteristic is obtained for the second optical disk 14b having a 0.6 mm thick light transmissive layer. In addition, the spherical aberration that persists despite the aspherical convex face 311c can be compensated for, and impairment of shifting characteristics of the objective lens unit 313 can be suppressed, thereby obtaining desirable light focusing characteristics.

Here, the provision of the diffraction optical element 311 enables the second light beam L2 to be incident on the objective lens 312 with a predetermined degree of divergence, even when the second light beam is incident on the objective lens unit 313 as a substantial parallel ray, thereby reducing the adverse effect of radial shifting of the objective lens unit 313.

For the third optical disk 14c, as shown in FIG. 33(c), when the third light beam L3 is incident on the diffraction optical element 311 as a diverging ray, the light beam that was diffracted on the diffraction face of the diffraction grating 311a in a first order diffraction direction (diverging direction with respect to the optical axis) is refracted in the converging direction on the convex face 311c, so that the light beam is incident on the objective lens 312 with a predetermined degree of divergence ($\phi \times \Phi outIr=-0.07$ in this Example 9). In this way, a desirable light focusing characteristic is obtained with respect to the third optical disk 14c having a 1.2 mm thick light transmissive layer. In addition, the spherical aberration that persists despite the aspherical concave face 311c can be compensated for, and impairment of radial shifting characteristics of the objective lens unit 313 can be suppressed, thereby obtaining desirable light focusing characteristics.

Here, the provision of the diffraction optical element 311 enables the light beam to be incident on the objective lens unit 313 with a smaller degree of divergence than when it is incident on the objective lens 312, thereby reducing the adverse effect of radial shifting of the objective lens unit 313.

Further, in the optical pickup 300 of the present Example, the diffracting face of the diffraction optical element 311 is designed such that the first order component of the diffracted light is used for the first, second, and third light beams. In this way, an optical pickup that can record and erase information requiring high power can easily be realized. In addition, the power of the light source can be reduced to suppress power consumption.

Further, in the present Example, the provision of the diffraction optical element 311 made with the diverging diffracting face and the convex face enables a light beam to be incident on the objective lens 312 with a predetermined degree of divergence even when the light beam is incident on the objective lens unit 313 as a weak diverging ray. Accordingly, the adverse effect of radial shifting of the objective lens unit 313 can be reduced. In addition, the semiconductor lasers 1a, 1b, and 1c can be provided at a distant position from the objective lens unit 313, allowing the semiconductor lasers 1a, 1b, and 1c to be disposed more flexibly.

FIG. 34(a), FIG. 34(b) and FIG. 34(c) represent changes in wavefront aberration λrms on an image surface with respect to an amount of shifting (objective shifting) of the objective lens unit 313 in the radial direction, as indicated by solid line, when the first, second and third light beams are respectively focused on the first, second and third disks 14a, 14b, and 14c using the optical pickup 300 prepared in this Example. Further, broken line in FIG. 34(a), FIG. 34(b) and FIG. 34(c) indicates the results when an optical pickup ("comparative optical pickup") prepared for comparison was used. Note that, FIG. 34(a) shows the result when the first light beam was focused on the first optical disk 14a, and FIG. 34(b) shows the result when the second light beam was focused on the second optical disk 14b, and FIG. 34(c) shows the result when the third light beam was focused on the third optical disk 14c.

The comparative optical pickup was prepared to optimize wavefront aberration in such a manner that the first light beam is incident on the objective lens as a parallel ray, and the second and third light beams are incident on the objective lens as predetermined diverging rays so as to compensate for the spherical aberration caused by the thickness difference of the light transmissive layers. Further, in order to optimize wavefront aberration, an aspherical lens is inserted in the optical paths of the diverging rays so as to prevent impairment of shifting characteristics of the objective lens.

As can be seen from FIG. 34(a), the use of the optical pickup 300 of the present example makes it possible to suppress the adverse effect of radial shifting of the objective lens unit 313, in addition to forming a desirable focused light spot on the first optical disk 14a.

Further, by causing the second light beam to be incident on the diffraction optical element 311 as a substantial parallel ray, the optical pickup 300 of the present Example makes it possible to suppress the adverse effect of radial shifting of the objective lens unit 313 more effectively than the comparative optical pickup, as shown in FIG. 34(b).

Further, as can be seen FIG. 34(c), with the optical pickup 300 of the present example, the adverse effect of radial shifting of the objective lens unit 313, which is caused when the third light beam is incident on the diffraction optical element 311 as a diverging ray, can be reduced more effectively than the comparative optical pickup.

As described, with the optical pickup 300 of the present example, the wavefront aberration caused on the second and third optical disks 14b and 14c can be reduced more desirably over the comparative optical pickup.

Note that, in the foregoing Examples, the first order component of the diffracted light is used for the first light beam, and the zeroth order or first order component of the diffracted light is used for the second and third beams. However, the second and third light beams are not necessarily required to have the same diffraction order, provided that the diffraction orders of the second and third light beams are the same or higher order than the diffraction order of the first light beam.

For example, the optical pickup 300 may be adapted so that the first order component is used for both the first and second light beams, and the zeroth order component is used for the third light beam. In this way, it is possible to increase the efficiency of using light for each of the first, second, and third light beams.

Fourth Embodiment

An optical pickup prepared for the present Embodiment has the same schematic structure as that of the Third Embodiment illustrated in FIG. 17. As in the Third Embodiment, the description of the present embodiment will be given based on an optical pickup that is compatible with a next-generation high-density optical disk (first optical disk 14a, first recording medium), a conventional DVD (second optical disk 14b, second recording medium), and a conventional CD (third optical disk 14c, third recording medium).

Figure 37:
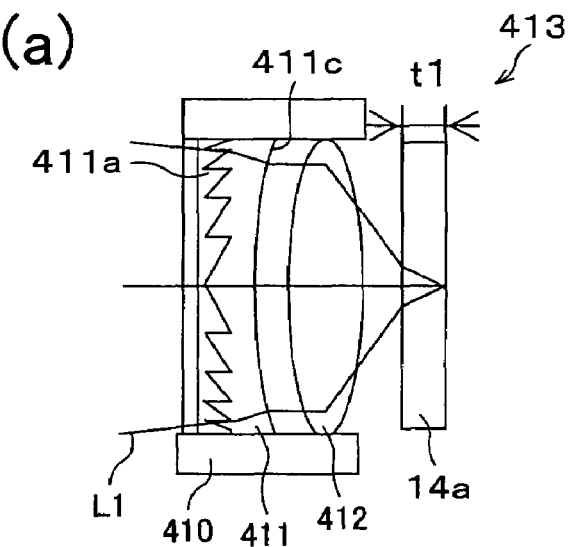
Figure 37:
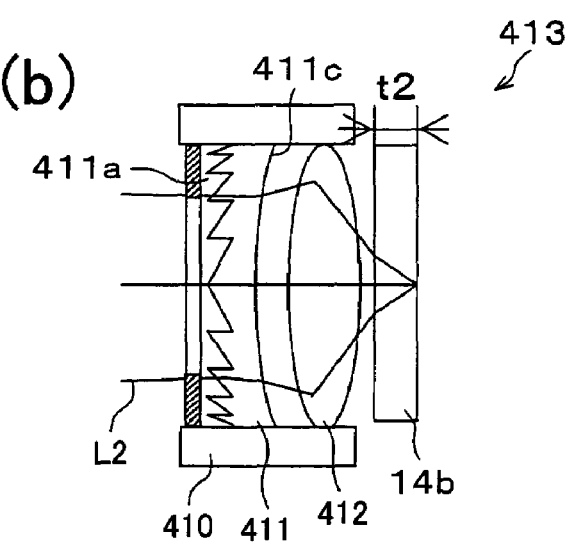
Figure 37:
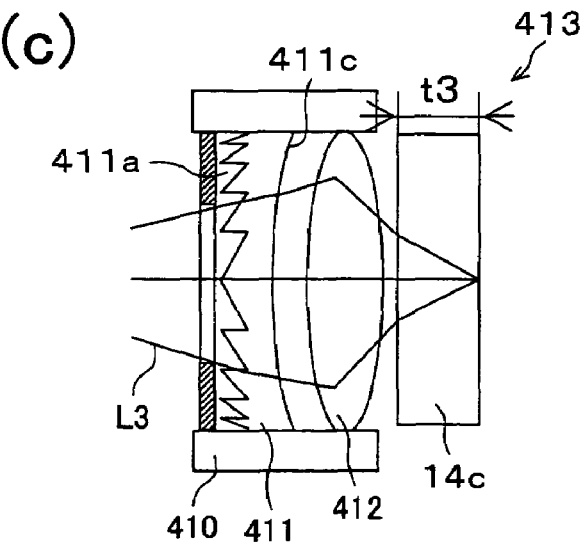

Note that, the optical pickup according to the present Embodiment includes an objective lens unit 413 shown in FIGS. 37(a), 37(b) and 37(c), instead of the objective lens unit 313 of the optical pickup of the Third Embodiment. In the present Embodiment, the first optical disk 14a uses blue light (first light beam) of a short wavelength in the vicinity of 405 nm (first wavelength λ1), and has a light transmissive layer with a thickness t1=0.6 mm. The second optical disk 14b uses red light (second light beam) of a long wavelength in the vicinity of 650 nm (second wavelength λ2), and has a light transmissive layer with a thickness t2=0.6 mm. The third optical disk 14c uses infrared light (third light beam) of a long wavelength in the vicinity of 780 nm (third wavelength λ3), and has a light transmissive layer with a thickness t3=1.2 mm. Here, the objective lens is optimized for the first optical disk.

Further, in the present Embodiment, a wavelength-selective aperture filter 410 controls aperture so that a numerical aperture NA1 (0.65 to be specific), a numerical aperture NA2 (0.6 to be specific), and a numerical aperture NA3 (0.45 to be specific) are obtained for the light beams of the first, second and third wavelengths λ1, λ2, and λ3, respectively.

EXAMPLE 10

As shown in FIG. 37(a), FIG. 37(b) and FIG. 37(c), in this Example, the first light beam is incident on the diffraction optical element 411 as a converging ray.

The optical pickup of this Example is fabricated so that the first light beam is incident on the diffraction optical element 411 as a converging ray, the second light beam as a converging or diverging ray, and the third light beam as a diverging ray. The diffracting face of the diffraction optical element 411 is designed such that the second order component of the diffracted light is used for the first light beam, and the first order component of the diffracted light is used for the second and third light beams.

The diffraction optical element 411 is made with a concave face 411b and a diffraction grating 411a, and is disposed on the side of the light source opposite the objective lens 412. The concave face 411b is spherical.

Here, the concave face 411b is spherical because it is easier to fabricate. However, the concave face may be aspherical to improve the shifting characteristic of the objective lens unit 413 in the radial direction.

In the optical pickup of this Example, as shown in FIG. 37(a), for the first optical disk 14a, the first light beam L1 is incident on the diffraction optical element 411 as a converging ray, and the light beam diffracted in a second order diffraction direction (converging direction with respect to the optical axis) on the diffracting face of the diffraction grating 411a is refracted in a diverging direction on the concave face 411b so that the light beam is incident on the objective lens 412 as a parallel ray and is focused on the first optical disk 14a having a 0.6 mm thick light transmissive layer. In this way, a desirable light focusing characteristic is obtained.

For the second optical disk 14b, as shown in FIG. 37(b), the second light beam is incident on the diffraction optical element 411 as a converging or diverging ray, and the light beam diffracted in a first order diffraction direction (converging direction with respect to the optical axis) on the diffraction face of the diffraction grating 411a is refracted in a diverging direction on the concave face 411b, so that the light beam is incident on the objective lens 412 with a predetermined degree of divergence. In this way, a desirable light focusing characteristic is obtained for the second optical disk 14b having a 0.6 mm thick light transmissive layer. As used herein, "a predetermined degree of divergence" is the extent to which the incident light beam on the objective lens needs to be diverged in order to compensate for the spherical aberration caused by the differences in the wavelengths.

For the third optical disk 14c, as shown in FIG. 37(c), when the third light beam is incident on the diffraction optical element 411 as a diverging ray, the light beam that was diffracted in a first order diffraction direction (converging direction with respect to the optical axis) is refracted in the diverging direction on the concave face 411b, so that the light beam is incident on the objective lens 412 with a predetermined degree of divergence. In this way, a desirable light focusing characteristic is obtained with respect to the third optical disk 14c having a 1.2 mm thick light transmissive layer. As used herein, "a predetermined degree of divergence" is the extent to which the incident light beam on the objective lens needs to be diverged in order to compensate for the spherical aberration caused by the differences in the wavelengths or the differences in thickness of the light transmissive layers.

Here, the provision of the diffraction optical element 411 enables the light beam to be incident on the objective lens unit 413 with a smaller degree of divergence than when it is incident on the objective lens 412, thereby reducing the adverse effect of radial shifting of the objective lens unit 413.

Figure 38:
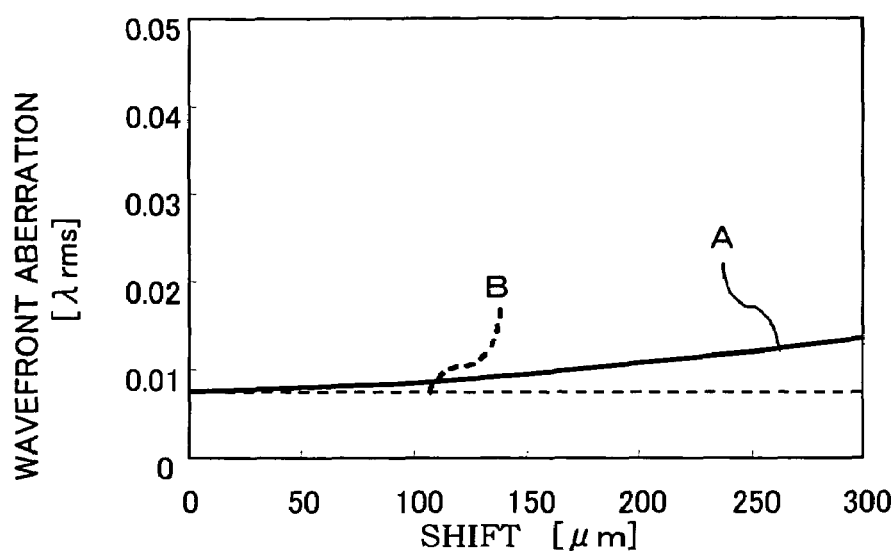
FIG. 38(a) through FIG. 38(c) are graphs representing a relationship between shift amount of objective shifting and wavefront aberration, comparing the Example shown in FIG. 33(a) through FIG. 33(c) with a comparative example.
Figure 38:
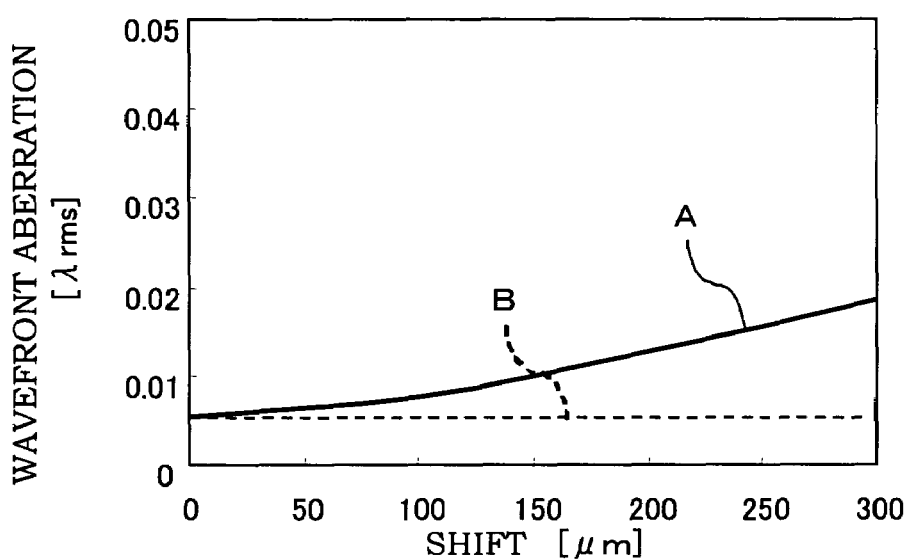
Figure 38:
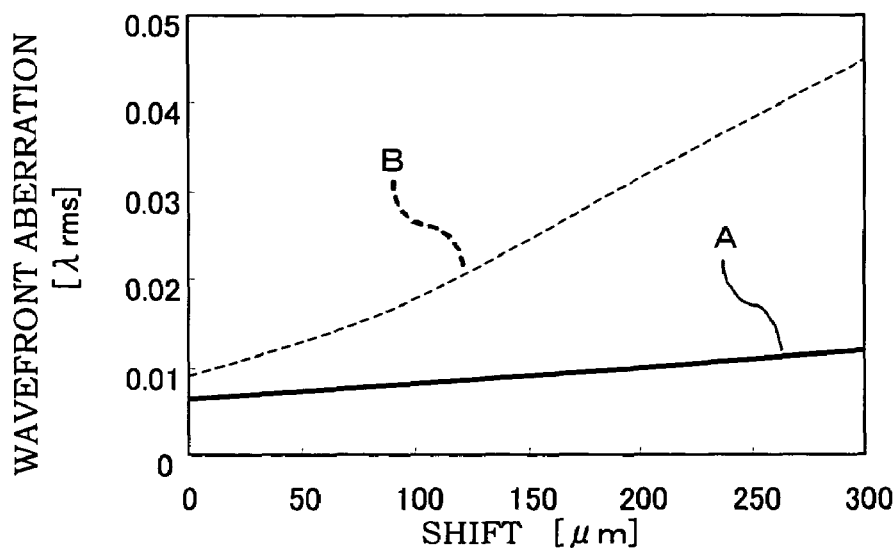

FIG. 38(a), FIG. 38(b) and FIG. 38(c) represent changes in wavefront aberration λrms on an image surface with respect to an amount of shifting (objective shifting) of the objective lens unit 413 in the radial direction, as indicated by solid line (A), when the first, second and third light beams are respectively focused on the first, second and third disks 14a, 14b, and 14c using the optical pickup prepared in this Example. Further, broken line (B) in FIG. 38(a), FIG. 38(b) and FIG. 38(c) indicates the results when an optical pickup ("comparative example") prepared for comparison was used. Note that, FIG. 38(a) shows the result when the first light beam was focused on the first optical disk 14a, and FIG. 38(b) shows the result when the second light beam was focused on the second optical disk 14b, and FIG. 38(c) shows the result when the third light beam was focused on the third optical disk 14c.

The wavefront aberrations of the comparative example are the results obtained when the first light beam was incident on the objective lens as a parallel ray, and when the second and third light beams were incident on the objective lens as predetermined diverging rays in order to compensate for the chromatic aberration or spherical aberration caused by the differences in the wavelengths or the differences in thickness of the light transmissive layers.

As can be seen from FIG. 38(a), the use of the optical pickup of the present example makes it possible to suppress the adverse effect of radial shifting of the objective lens unit 413, in addition to forming a desirable focused light spot on the first optical disk 14a.

Further, as can be seen from FIG. 38(b), the use of the optical pickup of the present example makes it possible to form a desirable focused light spot on the second optical disk 14b. The extent of wavefront aberration is less in the present Example than in the comparative example, even though there is an area where the adverse effect of radial shifting of the objective lens unit 413, which is caused when the second light beam is incident on the diffraction optical element 411 as a diverging ray, is greater.

Further, as can be seen FIG. 38(c), with the optical pickup of the present example, the adverse effect of radial shifting of the objective lens unit 413, which is caused when the third light beam is incident on the diffraction optical element 411 as a diverging ray, can be reduced more effectively than the comparative example.

As described, with the optical pickup of the present Example, the wavefront aberration caused on the first, second and third optical disks 14a, 14b and 14c can be reduced more desirably over the comparative example.

Figure 39:
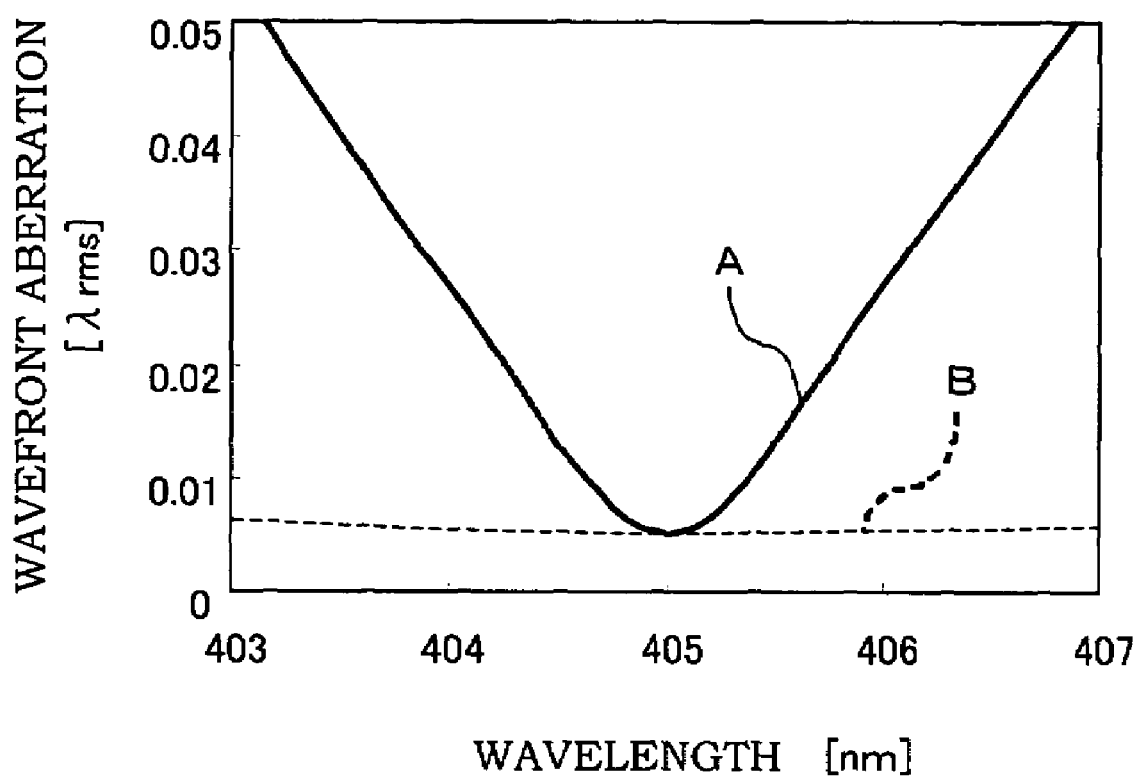
FIG. 39 is a graph representing a relationship between wavelength shifting of blue light and wavefront aberration according to the Example shown in FIG. 37(a) through FIG. 37(c).

FIG. 39 represents changes in wavefront aberration λrms with respect to shifting of the wavelength of the first light beam, as indicated by solid line (A), when the first light beam is focused on the first disk 14a using the optical pickup of the present Example. Further, broken line (B) in FIG. 32 indicates the result when an optical pickup (comparative example) prepared for comparison was used. The comparative example was prepared to include an objective lens unit solely made up of the objective lens 412 (objective lens 412 designated for the first light beam) used in the optical pickup of the present Example. It should be noted here that the wavefront aberration for each wavelength is the smallest wavefront aberration that provides the best focusing with a given wavelength ($\lambda$=405 in the example).

As shown in FIG. 39, the optical pickup of the present Example has a wider range of available wavelengths than the comparative example. This is because the optical pickup of the present Example includes the diffraction optical element 411 made with the converging diffraction grating and the planoconcave lens. The wavelength dependant characteristics can thus be improved over the case of solely using the objective lens designated for the first light beam. Further, with the optical pickup of the present Example, a desirable focused light spot can be formed even in the presence of wavelength fluctuations caused by, for example, mode hopping.

Further, in the optical pickup of the present Example, the diffracting face of the diffraction optical element 411 is designed such that the second order component of the diffracted light is used for the first light beam, and the first order component of the diffracted light is used for the second and third light beams. Thus, as can be seen from FIG. 39, the depth of the diffraction grating can be set so that all of the first, second and third light beams can be used with a 90% or higher efficiency. In this way, an optical pickup that can record and erase information requiring high power can easily be realized. In addition, the power of the light source can be reduced to suppress power consumption. Further, it also is possible to prevent unnecessary light other than the diffracted light from entering the detector, thereby suppressing degradation of signals.

As has been described, the optical pickup of the present invention is capable of recording and reproducing information with respect to different types of recording media whose light transmissive layers have different thicknesses, and whose optimum light beam wavelengths for reproduction are different. The optical pickup can also suppress impairment of light focusing characteristics, which occurs when the objective lens shifts in the radial direction, for an optical dick (CD to be specific) having a thick light transmissive layer requiring a large degree of divergence for the incident light on the objective lens. The optical pickup of the present invention can achieve these effects with a simple structure.

Figure 46:
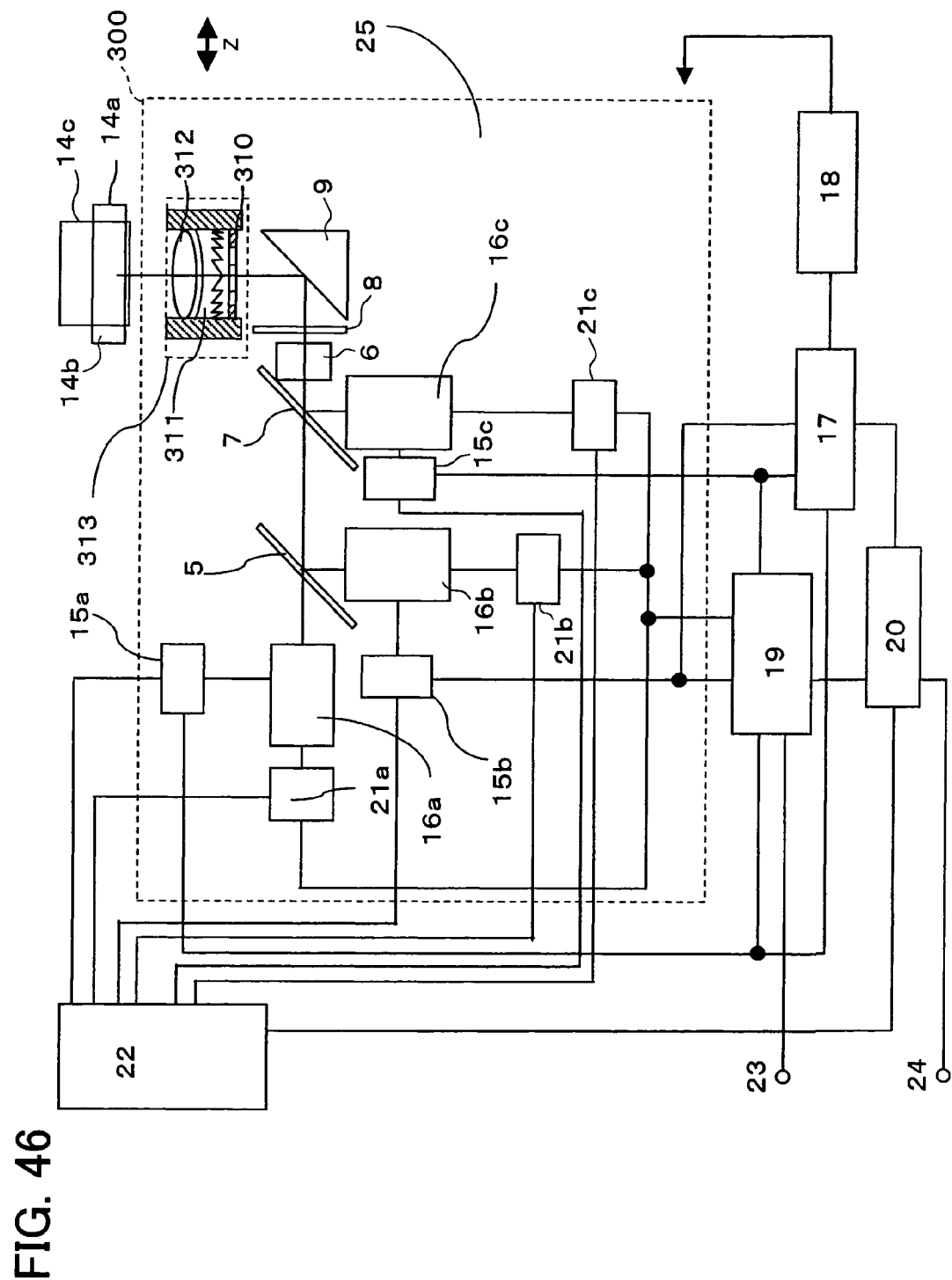
FIG. 46 is a schematic drawing showing one example of a recording and reproducing device with the optical pickup of the present invention.

The optical pickup of any of the foregoing embodiments is applicable to, for example, an information recording/reproducing apparatus illustrated in FIG. 46. FIG. 46 is a block diagram schematically showing the information recording/reproducing apparatus using the optical pickup 300 shown in FIG. 17.

As illustrated in FIG. 46, the information recording/reproducing apparatus of the embodiment has the configuration as described below, in addition to the optical pickup 300 shown in FIG. 17.

The reproduced signal detecting optical systems 15a, 15b, and 15c are connected to a demodulating circuit 19 and an error detecting circuit 17. The error detecting circuit 17 is connected to a driving circuit 18 that drives a tracking control and a focus control mechanism for the objective lens unit 313. A photodetector supplies an electrical signal according to a light spot image to the demodulating circuit 19 and the error detecting circuit 17. The demodulating circuit 19 generates a recording signal based on the electrical signal. Based on the electrical signal, the error detecting circuit 17 generates various signals such as a focus error signal, a tracking error signal, and a servo signal, and supplies these driving signals via the driving circuit 18 so as to drive the objective lens unit 313 and other elements according to the driving signals.

An optical pickup unit 25 includes the optical pickup 300 shown in FIG. 1. The optical pickup 300 is coupled to semiconductor laser driving circuits 21a, 21b, and 21c for respectively driving semiconductor lasers 1a, 1b, and 1c, which are light sources for emitting the light of the first, second, and third wavelengths, respectively.

An input/output terminal 23 is connected to the modulating/demodulating circuit 19, so as to input recording data from the central devices to the modulating/demodulating circuit 19, and to output the reproduced data of the information recording/reproducing apparatus from the modulating/demodulating circuit 19 to the central devices.

A control signal input/output terminal 24 is connected to a control circuit 20, so as to input a control signal from the central devices to the control circuit 20, and to output the control result of the information recording/reproducing apparatus to the central devices. The control circuit 20 is connected to the error detecting circuit 17, the modulating/demodulating circuit 19, and a switching circuit 22, so as to control recording and reproducing operations based on the control signal from the control signal input/output terminal 24.

The modulating/demodulating circuit 19 supplied recording signals according to recording data to the semiconductor laser driving circuits 21a, 21b, and 21c, and receives reproduced signals from the reproduced signal detecting optical systems 15a, 15b, and 15c. The error detecting circuit 17 receive the reproduced signals from the reproduced signal detecting optical systems 15a, 15b, and 15c. Based on the reproduced signals, the error detecting circuit 17 generates various signals such as a focus error signal, a tracking error signal, and a servo signal, and outputs these driving signals to the driving circuit 18. Based on the driving signals from the error detecting circuit 17, the driving circuit 18 drives the optical pickup unit 25 by servo control.

Under the instructions of the control circuit 20, the switching circuit 22 switches between (a) the semiconductor laser driving circuit 21a and the reproduced signal detecting optical system 15a for the first light beam, (b) the semiconductor laser driving circuit 21b and the reproduced signal detecting optical system 15b for the second light beam, and (c) the semiconductor laser driving circuit 21c and the reproduced signal detecting optical system 15c for the third light beam. In addition, the switching circuit 22 supplies power to the respective semiconductor lasers for recording and reproducing. Here, in the case where the stray light entering the reproduced signal detecting optical systems 15a, 15b, and 15c are essentially negligible, the switching circuit 22 is not required to switch between the reproduced signal detecting optical systems 15a, 15b, and 15c.

Referring to FIG. 46, the recording and reproducing operations are described below.

In recording, the central devices supply recording data to the input/output terminal 23, while the control input/output terminal 24 receives a recording control signal and a light beam switching signal according to the type of optical disk inserted in the information recording/reproducing apparatus. The following assumes that the input light beam switching signal is the first light beam L1.

Under the instructions of the control circuit 20, the switching circuit 22 turns ON the semiconductor laser driving circuit 21a and the reproduced signal detecting optical system 15a for the first light beam L1, while the other semiconductor laser driving circuits (21b, 21c) and the reproduced signal detecting optical systems (15b, 15c) remain OFF. In addition, the switching circuit 22 drives the semiconductor laser driving circuit 21a, so as to drive the semiconductor laser 1a with a recording power stronger than the reproducing power.

Under the instructions of the control circuit 20, the modulating/demodulating circuit 19 outputs a recording signal from the recording data supplied from the input/output terminal 23. The recording signal is supplied to the semiconductor laser driving circuit 1a, so as to project the first light beam L1 on the first optical disk 14a according to the recording signal. The error detecting circuit 17 via the reproduced signal detecting optical system 15a receives an output signal according to a light spot image formed by the projection of the first light beam L1 on the first optical disk 14a. Based on the output signal, the error detecting circuit 17 supplies the driving signals to the driving circuit 18 under the instructions of the control circuit 20, so as to servo control the optical pickup unit 25. In this manner, the information recording/reproducing apparatus of the embodiment drives the optical pickup unit 25 by servo control in such a manner that the first light beam L1 according to the recording signal is projected on the first optical disk 14a with a recording power, so that the recording data from the central devices are recorded on the first optical disk 14a.

In reproducing, the control input/output terminal 24 receives a reproducing control signal and a light beam switching signal according to the type of optical disk inserted in the information recording/reproducing apparatus. The following assumes that the input light beam switching signal is the first light beam L1.

Under the instructions of the control circuit 20, the switching circuit 22 turns ON the semiconductor laser driving circuit 21a and the reproduced signal detecting optical system 15a for the first light beam L1, while the other semiconductor laser driving circuits (21b, 21c) and the reproduced signal detecting optical systems (15b, 15c) remain OFF. In addition, the switching circuit 22 drives the semiconductor laser driving circuit 21a, so as to drive the semiconductor laser 1a with a reproducing power weaker than the recording power.

When the semiconductor laser 1a projects the first light beam L1 of a reproducing power on the first optical disk 14a, the reproduced signal detecting optical system 15a supplies an output signal according to a light spot image formed on the first optical disk to the modulating/demodulating circuit 19 and the error detecting circuit 17. Based on the output signal, the error detecting circuit 17 supplies the driving signals to the driving circuit 18 under the instructions of the control circuit 20, so as to servo control the optical pickup unit 25. Based on the output signal, the modulating/demodulating circuit 19 outputs reproduced data to the input/output terminal 23 and to the central devices, under the instructions of the control circuit 20.

In this manner, the information recording/reproducing apparatus of the embodiment drives the optical pickup unit 25 by servo control in such a manner that the first light beam L1 is projected on the first optical disk 14a with a reproducing power, so as to reproduce the recorded signal in the first optical disk 14a and output the reproduced data to the central devices.

In the case where the input light beam switching signal is the second light beam L2, the switching circuit 22 turns ON the semiconductor laser driving circuit 21b and the reproduced signal detecting optical system 15b. In the same manner, when the input light beam switching signal is the third light beam L3, the switching circuit 22 turns ON the semiconductor laser driving circuit 21c and the reproduced signal detecting optical system 15c. That is, when the inserted disk is the second optical disk, the semiconductor laser driving circuit 21b and the reproduced signal detecting optical system 15b for the second light beam L2 are used to record or reproduce information with respect to the second optical disk. When the inserted disk is the third optical disk, the semiconductor laser driving circuit 21c and the reproduced signal detecting optical system 15c for the third light beam L3 are used to record or reproduce information with respect to the third optical disk.

FIG. 46 described the information recording/reproducing apparatus with three light sources. However, not limiting to this, an optical pickup with two light sources, for example, such as the optical pickup 100 shown in FIG. 1, is also applicable to the information recording/reproducing apparatus.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The present invention provides an optical pickup for recording or reproducing information with respect to a first recording medium having a light transmissive layer of a thickness t1 on an information recording face, the optical pickup recording or reproducing information by forming a first light spot on the information recording face by focusing a first light beam of a wavelength λ1 on the information recording face, the optical pickup including: a diffraction optical element including a diffracting face and a refracting face for diffracting and refracting the first light beam so as to emit the first light beam; an objective lens for causing a diffracted ray of a predetermined diffraction order of the first light beam emitted from the diffraction optical element to focus on the information recording face of the first recording medium so as to form the first light spot; and a collimator lens, provided between the first light source and the diffraction optical element, for causing the first light beam from the first light source to be incident on the diffraction optical element as a parallel ray, the diffracting face of the diffraction optical element having such a diffraction characteristic that the first light beam is diffracted toward an optical axis, and the refracting face being a concave face.

With this configuration, shifting of a focal point caused by wavelength fluctuations can be suppressed more effectively, even when the optical pickup is specifically designated for the next-generation high-density optical disk.

It is preferable in the optical pickup of the present invention that the diffraction optical element satisfies $$\Phi = \Phi_D + \Phi_L = 0$$

where $\Phi$ is the power of the diffraction optical element, $\Phi_D$ is the power of the diffracting face of the diffraction optical element, and $\Phi_L$ is the power of the refracting face of the diffraction optical element.

With this configuration, the first light beam that emerges from the first optical system as a parallel ray can emerge from the diffraction optical element also as a parallel ray after the passage through the diffraction optical element. In this way, the aberration caused by misalignment with the objective lens can be suppressed. Here, the diffraction optical element may be disposed anywhere between the first optical system and the objective lens.

The present invention provides an optical pickup for recording or reproducing information with respect to (a) a first recording medium having a light transmissive layer of a thickness t1 on an information recording face and (b) a second recording medium having a light transmissive layer of a thickness t2 greater than t1 on an information recording face, the optical pickup recording or reproducing information with respect to the first recording medium by forming a first light spot on the information recording face of the first recording medium by focusing a first light beam of a wavelength λ1 on the information recording face, and the optical pick up recording or reproducing information with respect to the second recording medium by forming a second light spot on the information recording face of the second recording medium by focusing a second light beam of a wavelength λ2 greater than λ1 on the information recording face, the optical pickup including: a diffraction optical element for diffracting and refracting incident rays of the first and second light beams so as to emit the first and second light beams; and an objective lens for causing respective diffracted rays of predetermined diffraction orders of the first and second light beams emitted from the diffraction optical element to focus on the respective information recording faces of the first and second recording media so as to form the first and second light spots, the first light beam and the second light beam being incident on the diffraction optical element as light beams with different degrees of convergence or divergence.

In the configuration where diffracted rays of the first and second light beams of different wavelengths are focused through the common objective lens to form the first and second light spots on the respective information recording faces of the first and second recording media respectively having light transmissive layers of different thicknesses, the degrees of convergence and/or divergence of the respective diffracted rays of the first and second light beams incident on the objective lens must provide a sufficiently large angle difference in order to sufficiently reduce the wavefront aberrations in the respective diffracted rays of the focused light and to thereby obtain a desirable light focusing characteristic.

Causing the first and second light beams to be incident on the diffraction optical element as light beams with different degrees of convergence and/or divergence helps to increase the angle difference. This enables the required diffracting and refracting characteristics for the diffraction optical element to be set more freely, allowing for more flexible design for the diffraction optical element. As a result, using the diffraction optical element, which is easy to fabricate, it is possible to realize the optical pickup which can sufficiently reduce wavefront aberration in the diffracted rays of the focused light.

Note that, when the first and second light beams enter the diffraction optical element as light beams with different degrees of convergence or divergence, the incident ray of one of the first and second light beams may be a converging ray while the other is a diverging ray. Alternatively, the incident ray of one of the first and second light beams may be a parallel ray while the other is a converging ray or a diverging ray. Further, the incident rays of both the first light beam and the second light beams may be converging rays or diverging rays with different degrees of convergence or divergence.

It is preferable in the optical pickup of the present invention that the diffraction optical element includes a converging diffraction grating and a diverging lens.

With this configuration, the wavefront aberration in response to wavelength fluctuations can be suppressed, and a desirable light focusing characteristic can be obtained even in the presence of wavelength fluctuations.

It is preferable in the optical pickup of the present invention that the first light beam is incident on the diffraction optical element as a converging ray, and the second light beam is incident on the diffraction optical element as a diverging ray.

With this configuration, the wavefront aberration can be suppressed over a relatively wide shift range, even when the diffraction optical element and the objective lens shift in the direction of the optical axes of the first and second light beams.

It is preferable in the present invention that the objective lens causes the second order component of the diffracted light for the first light beam emitted from the diffraction optical element and the first order component of the diffracted light for the second light beam emitted from the diffraction optical element to focus on the respective information recording faces of the first and second recording media so as to form the first and second light spots.

It is also preferable in the present invention that the objective lens causes the third order component of the diffracted light for the first light beam emitted from the diffraction optical element and the second order component of the diffracted light for the second light beam emitted from the diffraction optical element to focus on the respective information recording faces of the first and second recording media so as to form the first and second light spots.

With this configuration, among the diffracted rays produced by the diffraction optical element, those with high diffraction efficiency can be used. This enables the first and second light beams to be efficiently used, allowing high power laser beams to be projected onto the first and second recording media without increasing the power consumed by the light sources for the first and second light beams.

The present invention provides an optical pickup for recording or reproducing information with respect to the first, second, and third recording media having information recording faces and light transmissive layers, the light transmissive layers of the first, second, and third recording media being formed on the respective information recording faces and respectively having thicknesses t1, t2, and t3, which are related to one another by t1<t2<t3, the optical pickup recording or reproducing information by focusing first, second, and third light beams of wavelengths λ1, λ2, and λ3, which are related to one another by λ1<λ2<λ3, on the respective information recording faces, the optical pickup including: an objective lens, movable in a substantially orthogonal direction with respect to respective optical axes of the first, second, and third light beams, for focusing the first, second, and third light beams on the respective information recording faces of the first, second, and third recording media; and a diffraction optical element, provided on an incident side of the first, second, and third light beams and movable with the objective lens, for diffracting and refracting the first, second, and third light beams so as to cause the first, second, and third light beams to be incident on the objective lens as diffracted rays of predetermined diffraction orders, the diffraction optical element causing the second and third light beams to be incident on the objective lens as diverging rays, and the diffraction optical element satisfying $$=\Phi inr|<|\Phi outr|, \text{ and } |\Phi inIr|<|\Phi outIr|$$

where Φinr and ΦinIr are degrees of convergence and/or divergence of incident rays of the second and third light beams, respectively, on the diffraction optical element, and Φoutr and ΦoutIr are degrees of convergence and/or divergence of incident rays of the second and third light beams, respectively, on the objective lens.

In the configuration of the optical pickup recording or reproducing the first, second, and third optical disks using the first, second, and third light beams of different wavelengths, the objective lens used compensates for the aberration that is caused when the first light beam of the shortest wavelength is focused on the first recording medium.

Using the objective lens to focus the second and third light beams on the second and third recording media respectively having light transmissive layers of different thicknesses from that of the first recording medium increases spherical aberration in the second and third light beams. Such an increase of spherical aberration can be suppressed by compensating for the aberration by generating aberration of the opposite direction. This can be carried out by causing the second and third light beams to be incident on the objective lens as diverging rays.

Here, in order to sufficiently reduce the spherical aberration, the second and third light beams must enter the objective lens with large degrees of divergence. However, increasing the degrees of divergence of incident light beams on the objective lens increases coma aberration that affects the aperture spot on the recording medium when the objective lens moves in the radial direction (direction substantially orthogonal to the optical axes of the first, second, and third light beams incident on the objective lens) during tracking or other operations, with the result that the light focusing characteristic is greatly impaired.

To avoid this problem, the foregoing configuration uses the diffraction optical element that is movable with the objective lens, so as to cause the second and third light beams to be incident on the objective lens as diverging rays. The diffraction optical element functions to satisfy $$|\Phi inr|<|\Phi outr|, \text{ and } |\Phi inIr|<|\Phi outIr|.$$

That is, the degrees of convergence and/or divergence have larger absolute values for the second and third light beams emerging from the diffraction optical element than for the second and third light beams incident on the diffraction optical element.

This enables the second and third light beams to be incident on the unit made up of the objective lens and the diffraction optical element (objective lens unit) with degrees of convergence and/or divergence of small absolute values. That is, the second and third light beams can be made incident as near parallel rays. As a result, the foregoing configuration is able to suppress impairment of the light focusing characteristic caused by radial shifting (objective shifting) of the objective lens unit, more effectively than the configuration without the diffraction optical element.

Thus, with the foregoing configuration, a single objective lens is used to form desirable light spots on the recording media with light transmissive layers of different thicknesses, so as to record or reproduce information. In addition, the light focusing characteristic is not severely impaired even when the objective lens unit shifts in the radial direction.

It is preferable in the optical pickup of the present invention that the diffraction optical element causes the first light beam to be incident on the objective lens as a parallel ray.

With this configuration, by causing the first light beam, which requires the most accurate light focusing characteristic, to be incident on the objective lens unit as a parallel ray, the aberration due to misalignment of the diffraction optical element with the objective lens can be suppressed when using the first light beam.

It is preferable in the optical pickup of the present invention that the diffraction optical element according to the foregoing configuration causes the first, second, and third light beams to be incident on the objective lens as diffracted rays of the second order, first order, and first order, respectively, the diffraction optical element having the highest diffraction efficiency for the second order component of the diffracted light for the first light beam, the first order component of the diffracted light for the second light beam, and the first order component of the diffracted light for the third light beam.

With this configuration, diffraction efficiency can be improved for all of the first, second, and third light beams. This enables the power of the light source producing each light beam to be reduced, thereby reducing the power consumption of the light source. The foregoing configuration is particularly effective for the optical pickup that records or erases information requiring high power beams. Preferably, the diffraction optical element produces the second order component of the diffracted light with a diffraction efficiency of 90% or greater for the first light beam.

It is preferable in the optical pickup of the present invention that the third light beam according to the foregoing configuration is incident on the diffraction optical element as a diverging ray.

With this configuration, by causing the third light beam, which requires the largest degree of divergence, to be incident on the diffraction optical element as a diverging ray in order to suppress spherical aberration, the first and second light beams can be made incident on the diffraction optical element with small degrees of divergence.

It is preferable in the optical pickup of the present invention that the first and second light beams according to the foregoing configuration are incident on the diffraction optical element as a parallel ray and a diverging ray, respectively.

With this configuration, the second and third light beams can be made incident on the diffraction optical element with relatively small degrees of divergence (see FIG. 20), while the first light beam is incident on the diffraction optical element as a parallel ray. As a result, impairment of the light focusing characteristic caused by radial shifting of the objective lens unit can be suppressed more effectively.

It is preferable in the optical pickup of the present invention that the first light beam according to the foregoing configuration is incident on the diffraction optical element as a converging ray, and the second light beam is incident on the diffraction optical element as a converging, parallel, or diverging ray.

With this configuration, the first, second, and third light beams can be made incident on the diffraction optical element with degrees of convergence and/or divergence of relatively small absolute values (see FIG. 20). As a result, impairment of the light focusing characteristic caused by radial shifting of the objective lens unit can be suppressed more effectively.

For example, it is preferable that the first, second, and third light beams are incident on the diffraction optical element with degrees of convergence and/or divergence that satisfy $$0 \leq \phi \times \Phi inb \leq 0.11$$

$$-0.048 \leq \phi \times \Phi inr \leq 0.04$$

$$-0.18 \leq \phi \times \Phi inIr \leq -0.1$$

where $\phi$ is an effective diameter of the objective lens for the first light beam.

In other words, the diffraction optical element should preferably satisfy $$-0.11 \leq \phi \times \Phi b < 0$$

$$-0.2 \leq \phi \times \Phi r \leq -0.002$$

$$-0.16 \leq \phi \times \Phi Ir \leq 0.03$$

where $\Phi b$, $\Phi r$, $\Phi Ir$ are powers of the diffraction optical element for the first, second, and third light beams, respectively.

It is preferable in the optical pickup of the present invention that the diffraction optical element includes a diverging diffracting face and a concave refracting face.

With this configuration, the range of available wavelengths can be made wider than that for the optical pickup designated for the first recording medium, thereby improving the wavelength dependent characteristic over the case of solely using the objective lens designated for the first recording medium. Thus, with the foregoing configuration, a desirable light focusing characteristic can be maintained even in the presence of wavelength fluctuations caused by, for example, mode hopping. Further, the minimum pitch on the diffracting face of the diffraction optical element can be increased, making it easier to fabricate the diffraction optical element.

It is preferable in the present invention that the diffraction optical element according to the foregoing configuration has a spherical refracting face.

With this configuration, the diffraction optical element can be fabricated more easily, providing the optical pickup inexpensively.

It is preferable in the optical pickup of the present invention that the diffraction optical element according to the foregoing configuration has a refracting face whose power is not less than −0.1 for the first light beam.

With this configuration, impairment of the light focusing characteristic caused by radial shifting of the objective lens unit can be suppressed more effectively.

The present invention provides an optical pickup including first, second, and third light sources (for example, semiconductor lasers) for respectively emitting first, second, and third light beams of wavelengths $\lambda1$, $\lambda2$, and $\lambda3$, which are related to one another by $\lambda1<\lambda2<\lambda3$, the optical pickup recording or reproducing information with respect to first, second, and third recording media respectively having light transmissive layers of different thicknesses, by focusing the first, second, and third light beams on respective information recording faces of the first, second, and third recording media using common focusing means (for example, objective lens), the optical pickup further including: a diffraction optical element, provided in a common optical path between the first, second, and third light sources and an objective lens and including a diffracting face and a refracting face, for causing the first, second, and third light beams to diverge or converge according to the wavelengths of the first, second, and third light beams, and causing the first, second, and third light beams to diffract on the diffracting face so that the first light beam is incident on the focusing means as a diffracted ray of the first order and the second and third light beams are incident on the focusing means as diffracted rays of the first or lower order, the diffracting face of the diffraction optical element having a diffraction grating whose depth is set so that diffraction efficiency for one diffraction order is higher than that for other diffraction orders with respect to the diffracted rays of each of the first, second, and third light beams incident on the focusing means.

In the configuration of the optical pickup recording or reproducing the first, second, and third recording media using the first, second, and third light beams of different wavelengths, the focusing means used compensates for the aberration caused when the first light beam of the shortest wavelength is focused on the first recording medium. However, directly using the same focusing means to focus the second and third light beams on the second and third recording media respectively having light transmissive layers of different thicknesses from that of the first recording medium increases the spherical aberration in the second and third light beams.

In the foregoing configuration, however, by the provision of the diffraction optical element in the optical path between the first, second, and third light sources and the objective lens, the respective light spots of the focused first, second, and third light beams of different wavelengths through the focusing means can be formed in different positions on the respective information recording faces of the first, second, and third recording media having the light transmissive layers of different thicknesses. Thus, with the foregoing configuration, a single focusing means can be used to focus the first, second, and third light beams of different wavelengths on the respective information recording faces of the first, second, and third recording media respectively having light transmissive layers of different thicknesses. In addition, the degrees of divergence with respect to the diffraction optical element can be reduced for the second and third light beams, making it possible to suppress the adverse effect of radial shifting of the focusing means during tracking or other operations.

The diffraction efficiency of the diffraction optical element for the diffracted rays of the respective light beams are determined by the depth of the diffraction grating on the diffracting face of the diffraction optical element. The inventors of the present invention have found that a loss of light quantity of incident light on the respective recording media can be reduced for any of the diffracted rays when the diffracting face of the diffraction optical element is so designed that the first order component of the diffracted light is used for the first light beam, and the first or lower order component of the diffracted light is used for the second and third light beams, and when the depth of the diffraction grating on the diffracting face is set so that the diffraction efficiency for one diffraction order is higher than that for other diffraction orders with respect to the diffracted light of each of the first, second, and third light beams incident on the focusing means. As a result, an optical pickup is realized that is compatible with three kinds of recording media with light transmissive layers of different thicknesses, and that provides high diffraction efficiency for the incident diffracted light on the information recording face of the respective recording medium (i.e., the light beams are used efficiently), and that can record or erase information requiring a high power light beam. Further, with the foregoing configuration, the power of the respective light beams can be reduced to prevent increase of power consumption in the light source.

In the optical pickup of the present invention, the diffraction optical element causes the first light beam to be incident on the focusing means as a diffracted ray of the first order, and causes the second and third light beams to be incident on the focusing means as diffracted rays of the zeroth order. Further, the depth of the diffraction grating on the diffracting face of the diffraction optical element is set so that the diffraction optical element has the highest diffraction efficiency for the first order component of the diffracted light for the first light beam, and has the highest diffraction efficiency for the zeroth order component of the diffracted light for the second and third light beams.

With this configuration, the diffraction optical element causes the first light beam to be incident on the focusing means as a diffracted ray of the first order, and causes the second and third light beams to be incident on the focusing means as diffracted rays of the zeroth order. In addition, the depth of the diffraction grating on the diffracting face of the diffraction optical element is set so that the diffraction optical element has the highest diffraction efficiency for the first order component of the diffracted light yields for the first light beam, and has the highest diffraction efficiency for the zeroth order component of the diffracted light for the second and third light beams. As a result, a loss of light quantity of incident light on the respective recording media can be reduced for any of the diffracted rays, and the same focusing means can be used to form desirable light spots on the recording media respectively having light transmissive layers of different thicknesses. Further, with the foregoing configuration, the degrees of divergence with respect to the diffraction optical element can be reduced for the second and third light beams, making it possible to suppress the adverse effect of radial shifting of the focusing lens during tracking or other operations. As a result, an optical pickup is realized that is compatible with three kinds of recording media with light transmissive layers of different thicknesses, and that provides high diffraction efficiency for the incident diffracted light on the information recording face of the respective recording medium (i.e., the light beams are used efficiently), and that can record or erase information requiring a high power light beam. Further, with the foregoing configuration, the power of the respective light beams can be reduced to prevent increase of power consumption in the light source.

In the optical pickup of the present invention, the diffracting face and the refracting face of the diffraction optical element are a converging diffracting face and a concave refracting face, respectively.

With this configuration, the range of available wavelengths can be made wider than that for the optical pickup designated for the first recording medium, thereby improving the wavelength dependent characteristic over the case of solely using the objective lens designated for the first recording medium. Thus, with the foregoing configuration, a desirable light focusing characteristic can be maintained even in the presence of wavelength fluctuations caused by, for example, mode hopping. Further, the minimum pitch on the diffracting face of the diffraction optical element can be increased, making it easier to fabricate the diffraction optical element.

Further, with the foregoing configuration, the light beams can be made incident on the focusing means with predetermined degrees of divergence even when the incident light beams on the focusing means are weak diverging rays. Accordingly, the adverse effect of radial shifting of the focusing means can be reduced. In addition, the light sources can be provided at a distant position from the focusing means, allowing the light sources to be disposed more flexibly.

In the optical pickup of the present invention, the depth of the diffraction grating on the diffracting face of the diffraction optical element is set so that the diffraction optical element has a 90% or greater diffraction efficiency for the first order component of the diffracted light for the first light beam.

With this configuration, the diffraction efficiency can be improved for the diffracted light of all of the first, second, and third light beams. This enables the power of the respective light beams to be reduced, thereby reducing power consumption of the light source. Further, with the foregoing configuration, an optical pickup is realized that can provide high diffraction efficiency for the first light beam, for which fabrication of a high power laser is difficult.

In the optical pickup of the present invention, the diffraction optical element satisfies $|\Phi outr|>|\Phi inr|$, and $|\Phi outIr|>|\Phi inIr|$ where $\Phi inr$ and $\Phi inIr$ are degrees of convergence and/or divergence of incident rays of the second and third light beams, respectively, on the diffraction optical element, and $\Phi outr$ and $\Phi outIr$ are degrees of convergence and/or divergence of incident rays of the second and third light beams, respectively, on the focusing means.

With this configuration, the degrees of convergence and/or divergence have greater absolute values for the incident rays of the second and third light beams entering the diffraction optical element than for the emergent rays of the second and third light beams leaving the diffraction optical element. This enables the second and third light beams to be incident on the diffraction optical element with degrees of convergence and/or divergence of small absolute values, while suppressing the spherical aberration caused by the thickness difference of the light transmissive layers. That is, the second and third light beams can be made incident as near parallel rays. Thus, with the optical pickup of the present invention, the third light beam can be incident on the diffraction optical element with a small degree of convergence and/or divergence.

In the optical pickup of the present invention, the diffraction optical element causes the first, second, and third light beams to be incident on the focusing means as diffracted rays of the first order, and the depth of the diffraction grating on the diffracting face of the diffraction optical element is set so that the diffraction optical element has the highest diffraction efficiency for the first order component of the diffracted light for all of the first, second, and third light beams.

With this configuration, the diffraction optical element causes the first, second, and third light beams to be incident on the focusing means as diffracted rays of the first order, and the depth of the diffraction grating on the diffracting face of the diffraction optical element is set so that the diffraction optical element has the highest diffraction efficiency for the first order component of the diffracted light for all of the first, second, and third light beams. As a result, a loss of light quantity of incident light on the respective recording media can be reduced for any of the diffracted rays, and the same focusing means can be used to form desirable light spots on the recording media respectively having light transmissive layers of different thicknesses. Further, with the foregoing configuration, the degrees of divergence with respect to the diffraction optical element can be reduced for the second and third light beams, making it possible to suppress the adverse effect of radial shifting of the focusing lens during tracking or other operations. As a result, an optical pickup is realized that is compatible with three kinds of recording media with light transmissive layers of different thicknesses, and that provides high diffraction efficiency for the incident diffracted light on the information recording face of the respective recording medium (i.e., the light beams are used efficiently), and that can record or erase information requiring a high power light beam. Further, with the foregoing configuration, the power of the respective light beams can be reduced to prevent increase of power consumption in the light source.

In the optical pickup of the present invention, the diffracting face and the refracting face of the diffraction optical element are a diverging diffracting face and a convex refracting face.

With this configuration, the same focusing means can be used to form desirable light spots on the recording media respectively having light transmissive layers of different thicknesses. Further, with the foregoing configuration, the light beams can be made incident on the focusing means with predetermined degrees of divergence even when the incident light beams on the focusing means are weak diverging rays. Further, with the foregoing configuration, the degrees of divergence with respect to the diffraction optical element can be reduced for the second and third light beams, making it possible to more effectively suppress the adverse effect of radial shifting of the focusing lens during tracking or other operations. In addition, the light sources can be provided at a distant position from the focusing means, allowing the light sources to be disposed more flexibly.

In the optical pickup of the present invention, the refracting face of the diffraction optical element is aspherical.

With the foregoing configuration, the spherical aberration caused by the thickness difference of the respective light transmissive layers of the recording media can be reduced more effectively, and impairment of shifting characteristic of the focusing means can be suppressed. As a result, a desirable light focusing characteristic can be obtained.

It is preferable in the optical pickup of the present invention having the foregoing configurations that the diffracting face of the diffraction optical element is formed on a refracting face.

With this configuration, the refracting face and the diffracting face of the diffraction optical element need not be aligned, making it easier to fabricate the diffraction optical element.

It is preferable in the optical pickup of the present invention having the foregoing configurations that the diffracting face of the diffraction optical element includes a diffraction grating that is serrated or stepped.

With this configuration, the diffraction optical element can improve diffraction efficiency for the respective light beams. This reduces the power of the light source of the respective light beam, thereby reducing the power consumption of the light source. The foregoing configuration is particularly effective for an optical pickup that records or erases information requiring a high power beam.

The present invention provides an optical pickup for focusing first, second, and third light beams of wavelengths $\lambda 1$, $\lambda 2$, and $\lambda 3$, which are related to one another by $\lambda 1 < \lambda 2 < \lambda 3$, on information recording faces of first, second, and third recording media respectively having light transmissive layers, the light transmissive layers being formed on the information recording faces and respectively having thicknesses t1, t2, and t3, which are related to one another by $t1 = t2 < t3$, the optical pickup including: an objective lens for respectively focusing the first, second, and third light beams on the respective information recording faces of the first, second, and third recording media; and a diffraction optical element, provided on an incident side of the first, second, and third light beams and provided as an integral unit with the objective lens, for diffracting and refracting the first, second, and third light beams so as to cause the first, second, and third light beams to be incident on the objective lens as diffracted rays of predetermined diffraction orders, the diffraction optical element causing the third light beam to be focused on the objective lens as a diverging ray, and the diffraction optical element satisfying $|\Phi in3| < |\Phi out3|$ where $\Phi in3$ is a degree of convergence or divergence of an incident ray of the third light beam on the diffraction optical element, and $\Phi out3$ is a degree of convergence or divergence of an incident ray of the third light beam on the objective lens.

In the configuration of the optical pickup recording or reproducing the first, second, and third optical disks using the first, second, and third light beams of different wavelengths, the objective lens used compensates for the aberration that is caused when the first light beam of the shortest wavelength is focused on the first recording medium.

Using the objective lens to focus the second and third light beams on the second and third recording media respectively having light transmissive layers of different thicknesses from that of the first recording medium and using different wavelengths from that of the first recording medium increases chromatic aberration or spherical aberration in the second and third light beams. Such an increase of spherical aberration can be suppressed by compensating for the aberration by generating aberration of the opposite direction.

This can be carried out by causing the second and third light beams to be incident on the objective lens as diverging rays.

Here, in order to sufficiently reduce the spherical aberration, the third light beams must enter the objective lens with a large degree of divergence. However, increasing the degree of divergence for the incident light beam on the objective lens increases the coma aberration that affects the aperture spot on the recording medium, when the objective lens moves in the radial direction (direction substantially orthogonal to the optical axes of the first, second, and third light beams incident on the objective lens) during tracking or other operations, with the result that the light focusing characteristic is greatly impaired.

To avoid this problem, the foregoing configuration uses the diffraction optical element that is movable with the objective lens, so as to cause the third light beam to be incident on the objective lens as a diverging ray. The diffraction optical element functions to satisfy $|\Phi inIr| < |\Phi outIr|$.

That is, the degree of convergence and/or divergence has a larger absolute value for the third light beam emerging from the diffraction optical element than for the third light beam incident on the diffraction optical element.

This enables the third light beam to be incident on the unit made up of the objective lens and the diffraction optical element (objective lens unit) with a degree of convergence and/or divergence of a small absolute value. That is, the third light beam can be made incident as a near parallel ray. As a result, the foregoing configuration is able to suppress impairment of the light focusing characteristic caused by radial shifting (objective shifting) of the objective lens unit, more effectively than the configuration without the diffraction optical element.

Thus, with the foregoing configuration, a single objective lens is used to form desirable light spots on the recording media with light transmissive layers of different thicknesses, so as to record or reproduce information. In addition, the light focusing characteristic is not severely impaired even when the objective lens unit shifts in the radial direction.

It is preferable in the optical pickup of the present invention that the diffraction optical element according to the foregoing configuration causes the first light beam to be incident on the objective lens as a parallel ray.

With this configuration, the first light beam of a short wavelength, which requires the most accurate light focusing characteristic, is incident on the objective lens as a parallel ray. This suppresses the aberration caused by misalignment of the diffraction optical element with the objective lens.

It is preferable in the optical pickup of the present invention that the first light beam according to the foregoing configuration is incident on the diffraction optical element as a parallel ray or a converging ray.

With this configuration, the third light beam can be made incident on the diffraction optical element with a degree of convergence and/or divergence of a relatively small absolute value. As a result, impairment of the light focusing characteristic caused by radial shifting of the objective lens unit can be suppressed more effectively.

It is preferable in the optical pickup of the present invention having the foregoing configuration that the diffraction optical element causes the first light beam to be incident on the objective lens as a diffracted ray of the second order, and causes the second and third light beams to be incident on the objective lens as diffracted rays of the first order, the diffraction optical element having a higher diffraction efficiency for the second order component of the diffracted light of the first light beam than for the diffracted rays of any other diffraction orders of the first light beam, the diffraction optical element having a higher diffraction efficiency for the first order component of the diffracted light of the second light beam than for the diffracted rays of any other diffraction orders of the second light beam, and the diffraction optical element having a higher diffraction efficiency for the first order component of the diffracted light of the third light beam than for the diffracted rays of any other diffraction orders of the third light beam.

With this configuration, the diffraction efficiency can be improved for all of the first, second, and third light beams. This reduces the power of the light sources for the respective light beams, thereby reducing the power consumption of the light sources. The foregoing configuration is particularly effective in an optical pickup that records or erases information requiring a high power beam. Preferably, the diffraction optical element is designed to have a 90% or greater diffraction efficiency for the second order component of the diffracted light for the first light beam.

It is preferable in the optical pickup of the present invention that the diffraction optical element according to the foregoing configuration includes a converging diffracting face and a concave refracting face.

With this configuration, the range of available wavelengths can be made wider than that for the optical pickup designated for the first recording medium, thereby improving the wavelength dependent characteristic over the case of solely using the objective lens designated for the first recording medium. Thus, with the foregoing configuration, a desirable light focusing characteristic can be maintained even in the presence of wavelength fluctuations caused by, for example, mode hopping. Further, the minimum pitch on the diffracting face of the diffraction optical element can be increased, making it easier to fabricate the diffraction optical element.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup for recording or reproducing information with respect to first, second, and third recording media having information recording faces and light transmissive layers, the light transmissive layers of the first, second, and third recording media being formed on the respective information recording faces and respectively having thicknesses t1, t2, and t3, which are related to one another by t1<t2<t3, the optical pickup recording or reproducing information by focusing first, second, and third light beams of wavelengths λ1, λ2, and λ3, which are related to one another by λ1<λ2<λ3, on the respective information recording faces, said optical pickup comprising:

an objective lens, movable in a substantially orthogonal direction with respect to respective optical axes of the first, second, and third light beams, for tracking the first, second, and third light beams on the respective information recording faces of the first, second, and third recording media; and a diffraction optical element, provided on an incident side of the first, second, and third light beams and movable with the objective lens, for diffracting and refracting the first, second, and third light beams so as to cause the first, second, and third light beams to be incident on the objective lens as diffracted rays of predetermined diffraction orders, said diffraction optical element causing the second and third light beams to be incident on the objective lens as diverging rays, and said diffraction optical element satisfying $$|\Phi inr| < |\Phi outr|, \text{and} |\Phi inIr| < |\Phi outIr|$$

where $\Phi inr$ and $\Phi inIr$ are degrees of convergence and/or divergence of incident rays of the second and third light beams, respectively, on the diffraction optical element, and $\Phi outr$ and $\Phi outIr$ are degrees of convergence and/or divergence of incident rays of the second and third light beams, respectively, on the objective lens, and where the third light beam is incident on the diffraction optical element as a diverging ray.

2. The optical pickup as set forth in claim 1, wherein the diffraction optical element causes the first light beam to be incident on the objective lens as a parallel ray.

3. The optical pickup as set forth in claim 1, wherein the diffraction optical element causes the first, second, and third light beams to be incident on the objective lens as a second order diffracted ray, a first order diffracted ray, and a first order diffracted ray, respectively, the diffraction optical element having highest diffraction efficiency for the second order diffracted ray of the first light beam, for the first order diffracted ray of the second light beam, and for the first order diffracted ray of the third light beam.

4. The optical pickup as set forth in claim 3, wherein the diffraction optical element has diffraction efficiency of 90% or greater for the second order diffracted ray of the first light beam.

5. The optical pickup as set forth in claim 3, wherein the first and second light beams are incident on the diffraction optical element as a parallel ray and a diverging ray, respectively.

6. The optical pickup as set forth in claim 5, wherein the first, second, and third light beams are incident on the diffraction optical element with degrees of convergence and/or divergence that satisfy $$0 < \phi \times \Phi inb \leq 0.11$$

$$-0.048 \leq \phi \times \Phi inr \leq 0.04$$

$$-0.18 \leq \phi \times \Phi inIr \leq -0.1$$

where $\phi$ is an effective diameter of the objective lens for the first light beam and $\Phi inb$ represents a degree of convergence and/or divergence of the first light beam incident on the diffraction optical element.

7. The optical pickup as set forth in claim 5, wherein the diffraction optical element satisfies $$0.11 \leq \phi \times \Phi b \leq 0$$

$$-0.2 \leq \phi \times \Phi r \leq -0.002$$

$$-0.16 \leq \phi \times \Phi Ir \leq 0.03$$

where $\Phi b$, $\Phi r$, $\Phi Ir$ are powers of the diffraction optical element for the first, second, and third light beams, respectively and $\phi$ represents an effective diameter of the objective lens for the first light beam.

8. The optical pickup as set forth in claim 3, wherein the first light beam is incident on the diffraction optical element as a converging ray, and the second light beam is incident on the diffraction optical element as a converging, parallel, or diverging ray.

9. The optical pickup as set forth in claim 8, wherein the first, second, and third light beams are incident on the diffraction optical element with degrees of convergence and/or divergence that satisfy $$0 \leq \phi \times \Phi inb \leq 0.11$$

$$-0.048 \leq \phi \times \Phi inr \leq 0.04$$

$$-0.18 \leq \phi \times \Phi inIr \leq -0.1$$

where $\Phi_{inb}$ represents a degree of convergence and/or divergence of the first light beam incident on the diffraction optical element, and where $\phi$ is an effective diameter of the objective lens for the first light beam.

10. The optical pickup as set forth in claim 8, wherein the diffraction optical element satisfies $$-0.11 \leq \phi \times \Phi b \leq 0$$

$$-0.2 \leq \phi \times \Phi r \leq -0.002$$

$$-0.16 \leq \phi \times \Phi Ir \leq 0.03$$

where $\phi$ is an effective diameter of the objective lens for the first light beam, and where $\Phi b$, $\Phi r$, $\Phi Ir$ are powers of the diffraction optical element for the first, second, and third light beams, respectively.

11. The optical pickup as set forth in claim 3, wherein the diffraction optical element includes a diverging diffracting face and a concave refracting face.

12. The optical pickup as set forth in claim 3, wherein the diffraction optical element has a spherical refracting face.

13. The optical pickup as set forth in claim 3, wherein the diffraction optical element has a refracting face whose power is not less than −0.1 for the first light beam.

\* \* \* \* \*